(12) United States Patent
Sisto

(10) Patent No.: US 11,857,075 B2
(45) Date of Patent: Jan. 2, 2024

(54) WALL-MOUNTABLE ACCESSORY

(71) Applicant: Salto, LLC, Philadelphia, PA (US)

(72) Inventor: Salvatore Sisto, East Brunswick, NJ (US)

(73) Assignee: Salto, LLC

( * ) Notice: Subject to any disclaimer, the term of this patent is extended or adjusted under 35 U.S.C. 154(b) by 0 days.

(21) Appl. No.: 17/671,883

(22) Filed: Feb. 15, 2022

(65) Prior Publication Data

US 2022/0257015 A1    Aug. 18, 2022

Related U.S. Application Data

(60) Provisional application No. 63/150,462, filed on Feb. 17, 2021.

(51) Int. Cl.
*A47B 96/06* (2006.01)
*F16B 5/06* (2006.01)
(Continued)

(52) U.S. Cl.
CPC ............ *A47B 96/06* (2013.01); *F16B 5/0614* (2013.01); *F16B 13/0808* (2013.01);
(Continued)

(58) Field of Classification Search
CPC ..... A47B 96/06; A47B 96/063; A47B 96/066; A47B 96/061; F16B 5/0614;
(Continued)

(56) References Cited

U.S. PATENT DOCUMENTS 3,311,435 A * 3/1967 Heritage .............. A47B 95/008
248/542
3,606,508 A * 9/1971 Burnes ............... B29D 99/0039
312/140.3
(Continued)

FOREIGN PATENT DOCUMENTS

CN          101214525 A       7/2008
CN          101050347 B       8/2010
(Continued)

OTHER PUBLICATIONS

Alejandro Carrasco-Pena, Mechanical Properties of Brittle Ceramics: Case Study of Boron Rich Ceramics and Acropora Cervicornis Coral Skeleton, Published 2019, retrieved Oct. 30, 2020 pp. 1-141.
(Continued)

*Primary Examiner* — Ko H Chan
(74) *Attorney, Agent, or Firm* — BELLES KATZ LLC

(57) ABSTRACT

A wall-mountable accessory such as one which is intended for hanging in a bathroom. The wall-mountable accessory may be a robe hook, a towel bar, a grab bar, a toilet paper holder, a ledge, or the like. The wall-mountable accessory may include a solid body that is at least partially formed from a brittle material. The solid body may have a hole that extends to an opening in its outer surface. The wall-mountable accessory may also include a mounting assembly for mounting the solid body to a wall. The mounting assembly may include a standoff configured to be coupled to the wall and a fastening pin that is coupled to the standoff and has a portion that nests within the hole in the solid body. The mounting assembly may apply a compressive force onto the solid body to prevent fracture.

19 Claims, 58 Drawing Sheets

(51) Int. Cl.
*F16B 35/00* (2006.01)
*F16B 41/00* (2006.01)
*F16B 13/08* (2006.01)
*F16M 13/02* (2006.01)

(52) U.S. Cl.
CPC .......... *F16B 35/005* (2013.01); *F16B 41/002* (2013.01); *F16M 13/02* (2013.01)

(58) Field of Classification Search
CPC .. F16B 13/0808; F16B 35/005; F16B 41/002; F16B 9/054; F16B 7/042; F16B 11/008; F16M 13/02
See application file for complete search history.

(56) References Cited

U.S. PATENT DOCUMENTS

| | | | | |
|---|---|---|---|---|
| 5,301,823 | A * | 4/1994 | Kingery | A47F 5/0876 211/175 |
| 5,452,666 | A * | 9/1995 | Peters | A47B 77/06 312/140.4 |
| 5,944,466 | A | 8/1999 | Rudnicki | |
| 6,007,285 | A | 12/1999 | Sisto et al. | |
| 6,220,677 | B1 * | 4/2001 | Ancel | A47B 77/022 312/140.4 |
| 6,398,149 | B1 * | 6/2002 | Hines | G02B 6/4457 242/399 |
| 7,070,157 | B2 | 7/2006 | Huprikar et al. | |
| 7,437,857 | B1 | 10/2008 | Maguire et al. | |
| 9,291,304 | B1 * | 3/2016 | Tu | F16M 13/02 |
| 10,059,076 | B2 * | 8/2018 | Torriani | B32B 3/08 |
| 2009/0229713 | A1 | 9/2009 | Ernst | |
| 2010/0116762 | A1 * | 5/2010 | Piersant | A47B 95/008 211/90.01 |
| 2012/0119046 | A1 | 5/2012 | Hsu | |
| 2014/0123468 | A1 | 5/2014 | Sisto | |
| 2016/0095437 | A1 * | 4/2016 | Crandall | A47B 96/024 211/90.01 |
| 2019/0053623 | A1 | 2/2019 | Sisto | |
| 2019/0186686 | A1 | 6/2019 | Sisto | |
| 2020/0221871 | A1 | 7/2020 | Sisto | |

FOREIGN PATENT DOCUMENTS

| | | |
|---|---|---|
| CN | 109722521 A | 5/2019 |
| CN | 209109988 U | 7/2019 |
| CN | 209350462 U | 9/2019 |
| CN | 209408794 U | 9/2019 |
| JP | 2014047490 A * | 3/2014 |
| JP | 2015059378 A * | 3/2015 |
| JP | 2017042272 A * | 3/2017 |
| JP | 2018102468 A * | 7/2018 |

OTHER PUBLICATIONS

Bed Bath & Beyond Website: https://www.bedbathandbeyond.com/store/product/allied-brass-foxtrot-robe-hook/5166418?keyword=robe-hooks, Allied Brass Foxtrot Robe Hook, retrieved Oct. 30, 2020, pp. 1-3.
Houzz Website: https://www.houzz.com/products/stone-sch-wall-matte-black-hanging-hook-towel-hanger-solid-surface-prvw-vr~161524366, Stone Sch Wall Matte BlackHanging Hook Towel Hanger,Solid Surface., retrieved Oct. 30, 2020 pp. 1-3.
Foter Website: https://foter.com/modern-curtain-holdbacks, Modern Curtain Holdbacks—Ideas on Foter, retrieved Oct. 30, 2020, pp. 1-15.
Kohler Website: https://www.us.kohler.com/us/purist-robe-hook/productDetail/robe-hooks/421804.htm?skuId=381666&brandId=1152540, Purist Robe Hook, retrieved Oct. 30, 2020, pp. 1-2.
Amara Website: https://www.amara.com/de/produkte/weisser-marmor-und-messinghaken-gross, Stone Hooks White Marble & Brass—Large, retrieved Oct. 30, 2020, pp. 1-7.
Amazon Website: https://www.amazon.com/eForwish-Brass-Single-Chrome-Finish/dp/B01HOS62IE, eForwish Brass Robe Hooks Wall Mounted Towel Hooks Coat Hooks Wall Hooks Hat Hangers (Polished Finish,2-Piece), retrieved Oct. 30, 2020 pp. 1-8.
Archiproducts Website: https://www.archiproducts.com/en/products/rexa-design/corian-towel-hook-smooth-towel-hook_312950, Smooth Towel Hook by Rexa Design, retrieved Oct. 30, 2020, pp. 1-2.
Etsy Website: https://www.etsy.com/listing/609851327/solid-brass-hook-heavy-duty-wall-hooks?ga_order=most_relevant&ga_search_type=all&ga_view_type=galler . . . , Solid Brass Hook • Heavy-Duty Wall Hooks • Brass Home Decor • Brass Robe Hook • Brass Details, retrieved Oct. 30, 2020, pp. 1-10.
Amazon Website: https://www.amazon.com/Hansgrohe-HG41537820-Cloth-Brushed-Nickel/dp/B000HAS2R6, AXOR Hook Luxury 1-inch Modern Towel Holder in Brushed Nickel, retrieved Oct. 30, 2020, pp. 1-7.
Archiproducts Website: https://www.archiexpo.com/prod/insilvis/product-49975-813272.html, Wall-mounted coat rack Stones, retrieved Oct. 30, 2020, pp. 1-6.
Archiproducts Website: https://www.archiexpo.com/prod/insilvis/product-49975-666940.html, Wall-mounted coat rack Stones Friuli, retrieved Oct. 30, 2020, pp. 1-6.

* cited by examiner

WALL-MOUNTABLE ACCESSORY

CROSS-REFERENCE TO RELATED APPLICATIONS

The present application claims priority to United States Provisional Patent Application Ser. No. 63/150,462, filed Feb. 17, 2021, the entirety of which is incorporated herein by reference.

BACKGROUND

Bathroom accessories such as towel bars, robe hooks, grab bars, toilet paper holders, and various ledges and shelves are often found in a home, hotel, office space, and other building types. Often these accessories are formed from wood which must be stained to create a desired aesthetic or metal which must be painted if it is desired to have a non-metallic color thereon for aesthetic purposes. Materials such as stone, glass, concrete, ceramics, gray cast iron, and solid surface have previously been avoided for use as accessories of the type noted above due to the brittleness of those materials which renders them susceptible to cracking or breaking. In particular, brittle materials like those noted above lack ductility and when placed under stress they tend to snap or break rather than stretch and deform. Thus, a need exists for a wall-mountable accessory that can be formed, at least in part, from a brittle material while extracting maximum force efficiencies therefrom in order to avoid breakage when under stress.

SUMMARY

The present invention is directed to a wall-mountable accessory such as one which is intended for hanging in a bathroom. The wall-mountable accessory may be a robe hook, a towel bar, a grab bar, a toilet paper holder, a shelf, a ledge, or the like. The wall-mountable accessory may include a solid body that is at least partially formed from a brittle material. The solid body may have a hole that extends to an opening in its outer surface. The wall-mountable accessory may also include a mounting assembly for mounting the solid body to a wall. The mounting assembly may include a standoff configured to be coupled to the wall and a fastening pin that is coupled to the standoff and has a portion that nests within the hole in the solid body. The mounting assembly may apply a stable compressive force onto the solid body to prevent fracture.

In one aspect, the invention may be a wall-mountable accessory comprising: a solid body at least partially formed from a brittle material, the solid body comprising a first through-hole; and a mounting assembly for mounting the solid body to a wall, the mounting assembly comprising: a standoff configured to be coupled to the wall; and a fastening pin extending through the first through-hole in the solid body and being coupled to the standoff; and wherein the solid body is sandwiched between the standoff and the fastening pin such that the mounting assembly applies a compressive force onto the solid body.

In another aspect, the invention may be wall-mountable accessory comprising: a solid body comprising a front surface, a rear surface opposite the front surface, and a through-hole extending from the front surface to the rear surface; a mounting assembly for mounting the solid body to a wall, the mounting assembly comprising: a standoff configured to be coupled to the wall, the standoff comprising: a plate portion comprising a rear surface that abuts the wall and a front surface opposite the rear surface; and a stem portion protruding from the front surface of the plate portion, the stem portion comprising an internal passageway and terminating at a distal end that abuts the rear surface of the solid body; and a fastening pin comprising a tubular portion that extends through the through-hole of the solid body and into the internal passageway of the stem portion of the standoff and a flange portion extending radially from an end of the tubular portion that abuts the front surface of the solid body; and wherein the solid body is sandwiched between the flange portion of the fastening pin and the distal end of the stem portion of the standoff.

In yet another aspect, the invention may be a wall-mountable accessory comprising: a solid body forming a ledge comprising a top surface, a bottom surface opposite the top surface, and a through-hole extending from the top surface to the bottom surface; and a mounting assembly for mounting the solid body to a wall, the mounting assembly comprising: a standoff configured to be coupled to the wall, the standoff comprising a plate portion comprising a rear surface that abuts the wall and a front surface opposite the rear surface and a stem portion protruding from the front surface of the plate portion, the stem portion comprising an internal passageway; and a fastening pin comprising: an elongated member having a first portion positioned within the internal passageway of the stem portion and a second portion that protrudes from a distal end of the stem portion, the solid body positioned atop of and supported by the second portion of the elongated member; and a fastener extending through the through-hole in the solid body and into an opening in the elongated member to couple the solid body to the elongated member.

In still another aspect, the invention may be a wall-mountable accessory comprising: a solid body forming a ledge and comprising a front edge, a rear edge opposite the front edge, and a blind hole extending from an opening in the rear edge in a direction towards the front edge; and a mounting assembly for mounting the solid body to a wall, the mounting assembly comprising: a standoff configured to be coupled to the wall, the standoff comprising a plate portion comprising a rear surface that abuts the wall and a front surface opposite the rear surface and a stem portion protruding from the front surface of the plate portion, the stem portion comprising an internal passageway; and a fastening pin comprising a first portion that is positioned within the internal passageway of the stem portion of the standoff and a second portion, wherein at least a portion of the second portion is disposed within the blind hole of the solid body to couple the fastening pin to the solid body.

In a further aspect, the invention may be a wall-mountable accessory comprising: a solid body at least partially formed from a brittle material, the solid body comprising an outer surface having an ornamental appearance and a hole that extends to an opening in the outer surface; and a mounting assembly for mounting the solid body to a wall, the mounting assembly comprising: a standoff configured to be coupled to the wall; and a fastening pin coupled to the standoff, wherein at least a portion of the fastening pin nests within the hole in the solid body; and wherein the solid body comprises a rear surface that faces the wall and an opposite front surface, the solid body being compressed between a portion of the standoff and a portion of the fastening pin in a direction extending between the front and rear surfaces.

In a still further aspect, the invention may be a wall-mountable accessory comprising: a solid body at least partially formed from a brittle material, the solid body comprising an outer surface having an ornamental appearance and a hole; and a mounting assembly configured to be mounted to the wall, the mounting assembly coupled to the solid body such that the mounting assembly compresses the solid body in a direction of the axis.

In another aspect, the invention may be a wall-mountable accessory comprising: a standoff comprising a plate portion configured to be in contact with a wall and a stem portion extending from the plate portion, the standoff defining an internal passageway; a solid body formed from a brittle material, the solid body comprising a front surface, a rear surface opposite the front surface, and a blind hole formed into the rear surface; a rod member formed from the brittle material, the rod member comprising a first portion that is positioned within the internal passageway of the stem portion of the standoff and a second portion that is positioned within the blind hole of the solid body; and wherein the rod member is detachably coupled to the standoff with a set screw and permanently coupled to the solid body with a reactive epoxy adhesive.

In yet another aspect, the invention may be a wall-mountable accessory comprising: a solid body at least partially formed from a first brittle material, the solid body comprising a front surface, a rear surface, and a first through-hole extending between the front and rear surfaces; and a standoff configured to be coupled to a wall, the standoff comprising: a plate component formed from a second brittle material, the plate component comprising a rear surface that abuts against the wall and a front surface opposite the rear surface; and a stem component that is separate and distinct from the plate component, the stem component comprising a first end that is in abutting contact with the front surface of the plate portion, a second end that is in abutting contact with the rear surface of the solid body, and an internal passageway extending from a first opening in the first end to a second opening in the second end; and a fastening pin comprising a tubular portion that extends through the first through-hole in the solid body and into the internal passageway of the stem component and a flange portion that abuts against the front surface of the solid body, the tubular portion of the fastening pin being coupled to the stem component with a set screw.

In a further aspect, the invention may be a wall-mountable accessory comprising: a solid body that is elongated along a first axis, the solid body comprising a main body portion formed from a brittle material and a structural insert formed from a non-brittle material embedded within an interior of the main body portion, the solid body comprising a front surface, a rear surface, and a through-hole extending between the front and rear surfaces; and a mounting assembly for mounting the solid body to a wall, the mounting assembly comprising: a standoff configured to be coupled to the wall, the standoff comprising a distal end that abuts the rear surface of the solid body and an internal passageway; and a fastening pin comprising a tubular portion extending through the through-hole in the solid body and into the internal passageway of the standoff and a flange portion that abuts the front surface of the solid body to sandwich the solid body between the standoff and the fastening pin.

In a yet further aspect, the invention may be a wall-mountable accessory comprising: a solid body that is elongated along a first axis, the solid body comprising a main body portion formed from a brittle material and a structural insert formed from a non-brittle material embedded within an interior of the main body portion; and a mounting assembly for mounting the solid body to a wall.

In a still further aspect, the invention may be a wall-mountable shelf comprising: an apron comprising a rear surface configured to abut against a wall and a front surface opposite the rear surface; a ledge comprising a rear edge configured to abut against a wall, an upper surface, and a lower surface, the lower surface comprising a recess that extends from the rear edge to an end wall; and wherein an upper portion of the apron nests within the recess in the lower surface of the ledge and is adhesively bonded to the ledge.

In another aspect, the invention may be a wall-mountable shelf comprising: a first component formed from a first brittle material and comprising a first surface having a recess that is defined by an interface surface; a second component formed from a second brittle material and comprising an engagement surface; a reactive adhesive located on at least one of the interface surface of the first component and the engagement surface of the second component; and wherein the engagement surface of the second component is positioned within the recess of the first component to adhesively bond the engagement surface of the second component to the interface surface of the recess, thereby coupling the first component to the second component.

In yet another aspect, the invention may be a wall-mountable shelf comprising: an apron comprising a rear surface configured to abut against a wall and a front surface opposite the rear surface, the front surface comprising a recess that extends from a bottom edge of the apron to an end wall; a ledge comprising a rear edge and an upper surface, the rear edge positioned within the recess of the apron so that a rear-most portion of the upper surface of the ledge interfaces with the end wall of the recess; wherein the apron and the ledge are formed from a brittle material; and wherein interfacing surfaces of the ledge and the apron are adhesively bonded together with a reactive adhesive.

In still another aspect, the invention may be a method of manufacturing a wall-mountable shelf comprising: forming a first component from a first brittle material, the first component comprising a recess defined by a floor and an end wall surface; forming a second component from a second brittle material, the second component comprising an engagement surface portion; milling a portion of at least one of the floor and the end wall surface of the recess of the first component; milling at least a portion of the engagement surface portion of the second component; applying a reactive adhesive to at least one of: (1) the floor and the end wall surface of the recess; and (2) the engagement surface portion of the second component; and positioning the engagement surface portion of the second component into the recess of the first component to adhesively bond the first and second components together.

In a further embodiment, the invention may be a wall-mountable shelf comprising: an apron comprising a rear surface configured to abut against a wall, a front surface opposite the rear surface, and a lower edge, the apron formed from a brittle material; a ledge configured to protrude from the wall and comprising an upper surface, a lower surface, a rear edge, and a front edge, the ledge formed from a brittle material; wherein either: (1) the apron comprises a recess within which a rear-most portion of the ledge nests; or (2) the ledge comprises a recess within which an upper-most portion of the apron nests; and an epoxy adhesive coating located on exposed surfaces of the recess to adhesively bond the apron and the ledge to one another.

In other embodiments, the invention may be a wall-mountable shelf comprising: an apron comprising a first exposed surface lying in a first plane and a second exposed surface lying in a second plane that intersects the first plane; a ledge comprising a first exposed surface lying in a third plane and a second exposed surface lying in a fourth plane that intersects the third plane; an epoxy adhesive coating located on at least one of: (1) the first and second exposed surfaces of the apron; and (2) the first and second exposed surfaces of the ledge; and wherein the first and second exposed surfaces of the apron are interface with the first and second exposed surfaces of the ledge, respectively, to couple the apron to the ledge.

In other embodiments, the invention may be a wall-mountable shelf comprising: an apron; a ledge; wherein the apron and the ledge are configured to be coupled together along a multiplane interface; and wherein an epoxy adhesive coating is applied onto at least one of the apron and the ledge along the multiplane interface.

In still another embodiment, the invention may be a wall-mountable accessory comprising: a solid body comprising: a main body component having a front surface, a rear surface, and a through-hole extending from the front surface to the rear surface; and an end cap; and a mounting assembly for mounting the solid body to a wall, the mounting assembly comprising: a standoff configured to be coupled to the wall, the standoff comprising an internal passageway; and a fastening pin comprising a flange portion that abuts against a portion of the front surface of the main body component of the solid body and a tubular portion that extends through the through-hole in the main body component of the solid body, a portion of the tubular portion protruding from the rear surface of the main body component of the solid body and; and wherein the end cap is bonded to the main body component so that the flange portion of the fastening pin is hidden from view within an interior of the solid body; and wherein the portion of the tubular portion of the fastening pin is disposed within the internal passageway of the standoff to couple the fastening pin to the standoff.

In yet another embodiment, the invention may be a wall-mountable accessory comprising: a solid body comprising: a main body component comprising a through-hole; and an end cap bonded to the main body component; and a mounting assembly for mounting the solid body to a wall, the mounting assembly comprising: a standoff configured to be coupled to the wall, the standoff comprising an internal passageway; and a fastening pin comprising a flange portion that is sandwiched between the main body component and the end cap of the solid body and a tubular portion that extends through the through-hole in the main body component of the solid body, a portion of the tubular portion protruding from the main body component of the solid body; and wherein the portion of the tubular portion of the fastening pin is disposed within the internal passageway of the standoff to couple the fastening pin to the standoff.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 1:
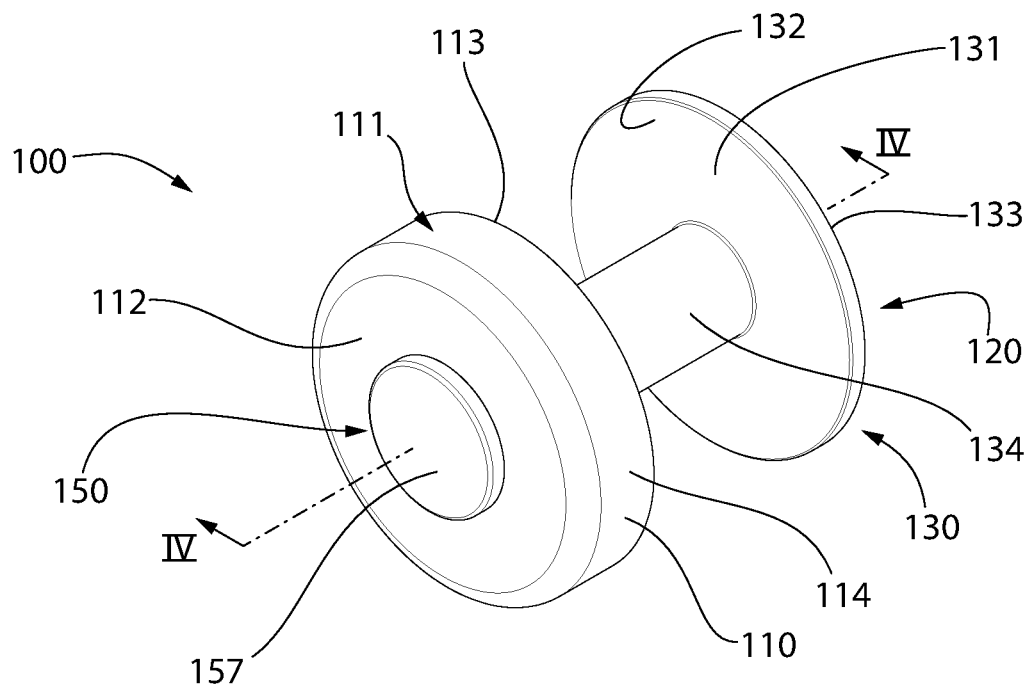
FIG. 1 is a front perspective view of a wall-mountable accessory in accordance with an embodiment of the present invention.
Figure 2:
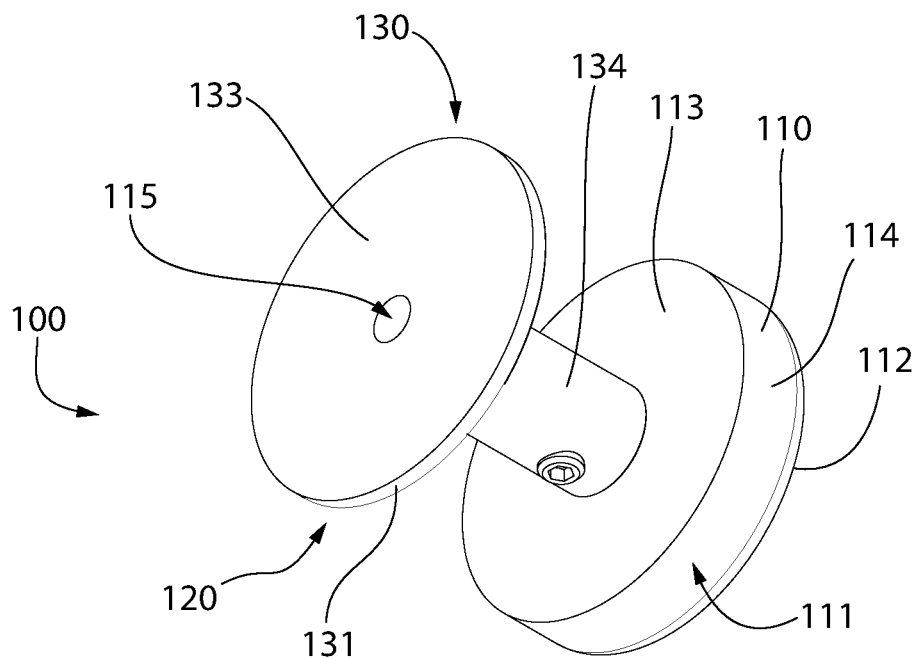
FIG. 2 is a rear perspective view of the wall-mountable accessory of FIG. 1.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION OF THE INVENTION

The following description of the preferred embodiment(s) is merely exemplary in nature and is in no way intended to limit the invention, its application, or uses.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "connected," "coupled," "interconnected," and similar refer to a relationship wherein structures are secured or attached to one another either directly or indirectly through intervening structures, as well as both movable or rigid attachments or relationships, unless expressly described otherwise. The term "fixed" refers to two structures that cannot be separated without damaging one of the structures. The term "filled" refers to a state that includes completely filled or partially filled.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

The present invention relates generally to accessories that are mounted to a wall and serve a functional purpose. In particular, the accessories may be those typically found in a bathroom, such as a towel bar, a toilet paper holder, a grab bar, a robe hook, or the like. In other embodiments described herein, the accessory may be a ledge or shelf which can be mounted to a wall in a bathroom or in any other room of an interior space without any specific limitation. Other uses for the inventive techniques described herein are also possible and may fall within the scope of the claimed invention.

As will be described in greater detail below with specific reference to the figures, the wall-mountable accessories include a solid body which forms an ornamental and functional part of the wall-mountable accessory. That is, the solid body may have a surface ornamentation or design which can appeal to consumers aesthetically. The surface ornamentation may take on many different forms and the specific design of the surface ornamentation is not to be limiting of the invention described herein. The surface ornamental may be a solid color, multiple colors, or designs that are formed from or intended to look like granite, marble, quartz, or the like.

The solid body of the wall-mountable accessories may be formed, at least in part, from a brittle material. The term "brittle material" is a term of art that is well known to and readily understood by persons of ordinary skill in the art. In particular, a brittle material is a material which has a low ductility and a high hardness value such that the material breaks without significant deformation when under stress. That is, such brittle materials absorb very little, if any, energy before fracture. Brittle materials fail when subjected to stress with little elastic deformation and without significant plastic deformation. Thus, brittle materials go from a first state or shape to complete fracture without much, or in many cases any, deformation. This characteristic allows brittle materials to be pieced back together after fracture because the individual pieces have not plastically deformed. A benefit associated with brittle materials is that if an application can be designed for the brittle material where the brittle material will be subject to applied stress/pressure that is well under its limits, then the material will not deform or break, which provides a much more consistent dimensional performance (there will be no deformation occurring over time which could lead to shape changes and loose hardware). The materials described herein as being brittle are generally brittle at ambient temperature.

Examples of brittle materials as used herein includes solid surface, glass, concrete, ceramic, cast marble, quartz, graphite, and acrylic. In some embodiments, the term brittle material may specifically exclude wood and metal. Materials such as concrete are composite materials that have two or more constituent materials (e.g., polymer+ceramic; ceramic 1+ceramic 2, cement+sand aggregate. In some embodiments, the brittle material is specifically intended to be solid surface material. One major benefit of utilizing solid surface material is that the colors and color combinations that can be used are infinite. Solid surface material can be made in solid colors, mixed colors, and any design imaginable. Solid surface material can mimic the appearance of granite, marble, stone, and other naturally occurring materials. Thus, using solid surface material for wall-mountable accessories enables transformation of an interior space in accordance with a designer's preferences and desires. However, due to the brittle nature of solid surface material (and the other brittle materials mentioned herein), such solid surface material (and other brittle material) accessories that are intended to be wall-mounted must interact with other components in certain ways as described herein in order to prevent failure. The invention described herein utilizes brittle materials such as solid surface material in ways not previously considered by understanding the properties and characteristics of the brittle materials and supporting them or interfacing them with other components of the same or different material in specific ways.

Solid surface material is a man-made material formed from alumina trihydrate, acrylic, epoxy or polyester resins, and pigments. Solid surface material is non-porous which lends itself nicely to being useful in many applications, including in commercial kitchens and the like.

Figure 3:
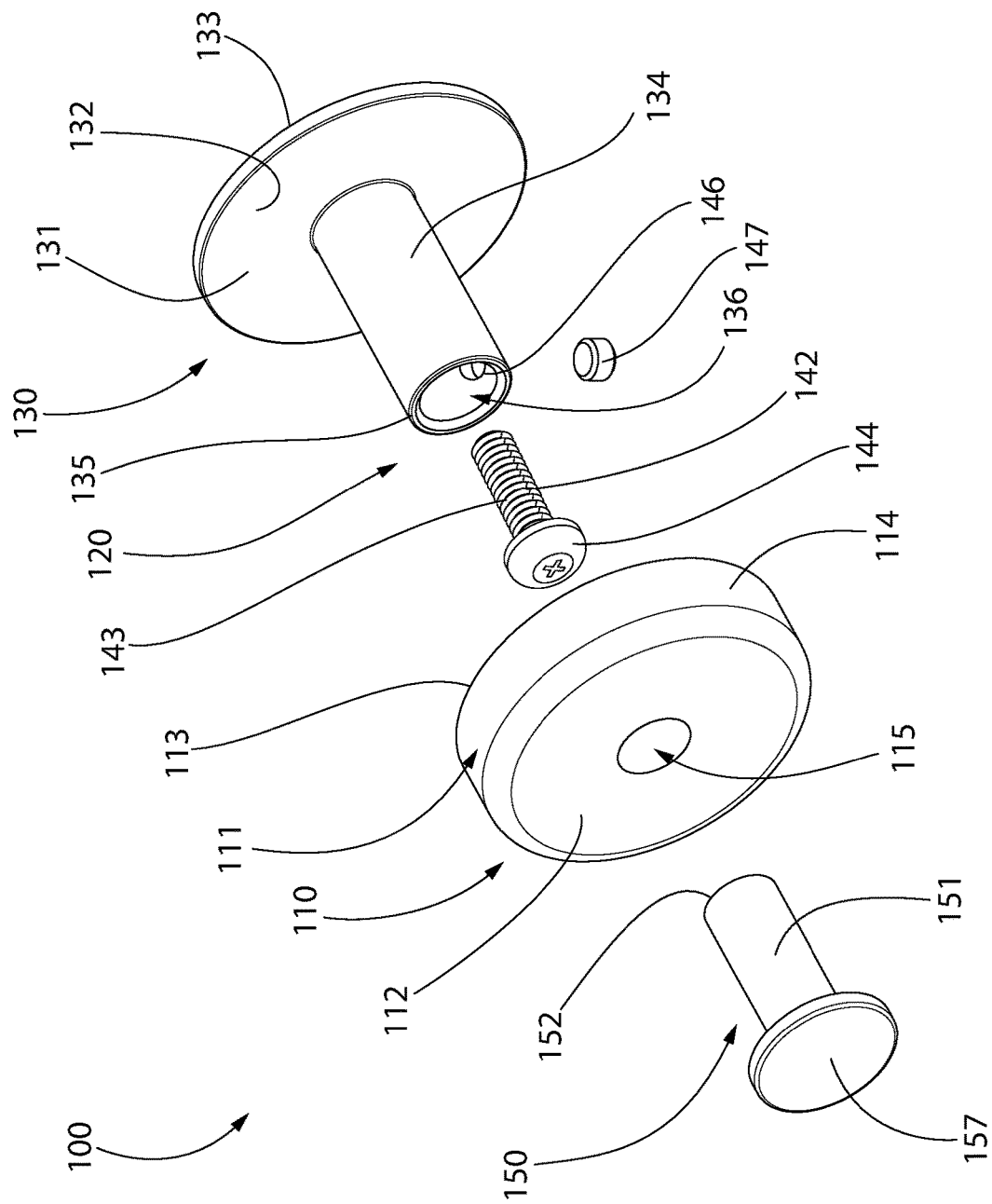
FIG. 3 is an exploded front perspective view of the wall-mountable accessory of FIG. 1.
Figure 4:
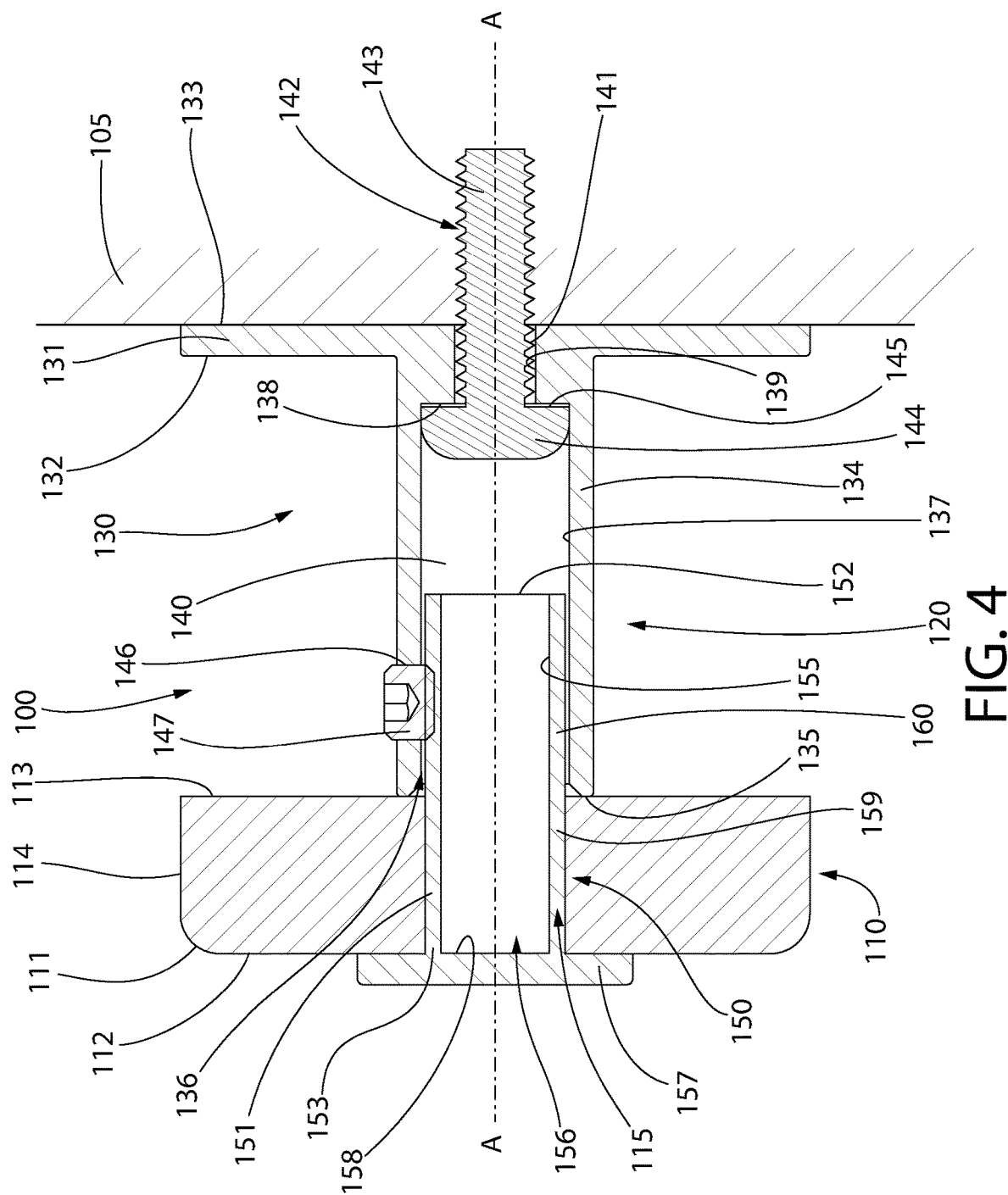
FIG. 4 is a cross-sectional view taken along line IV-IV of FIG. 1, illustrating the wall-mountable accessory mounted to a wall.
Figure 5:
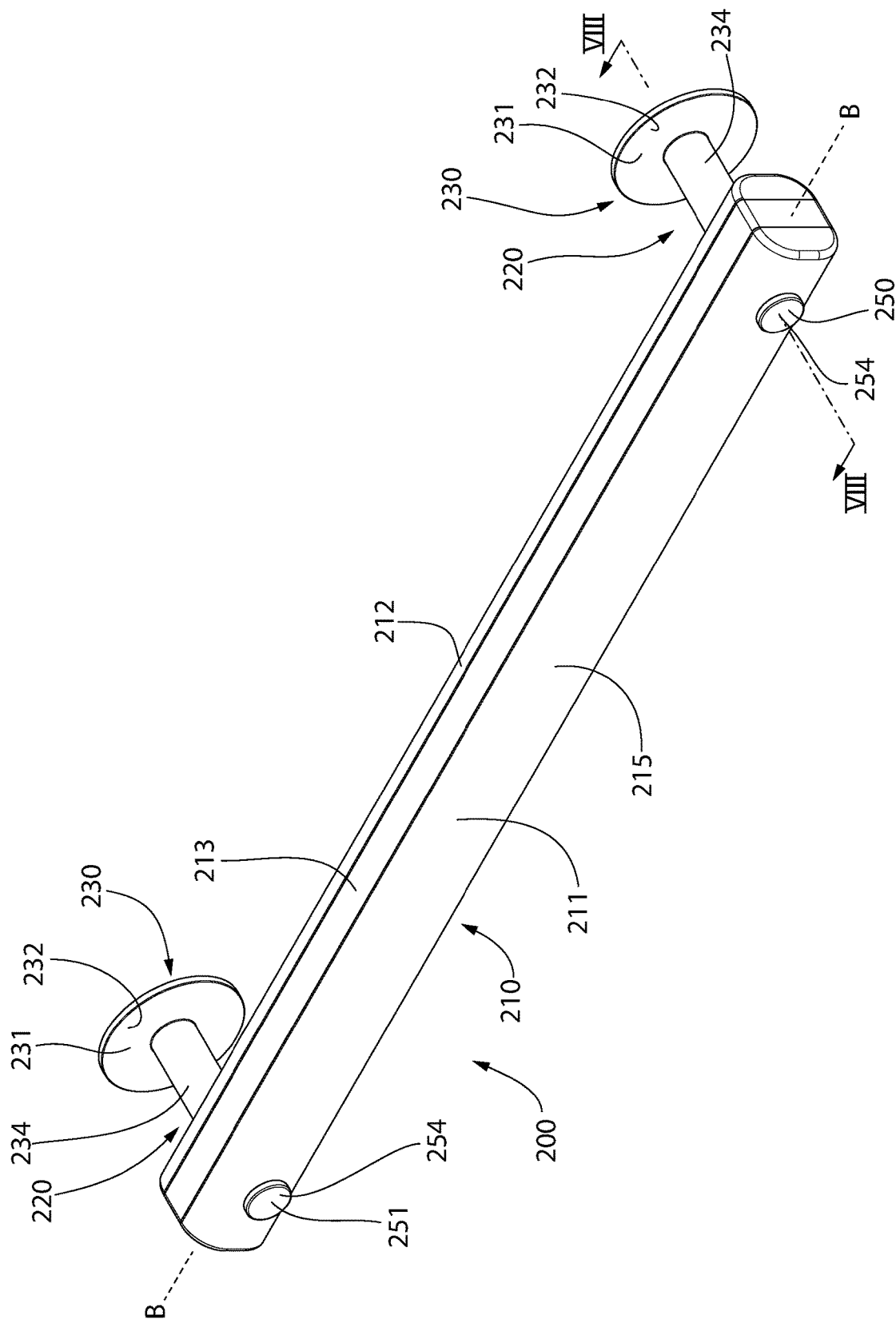
FIG. 5 is a front perspective view of a wall-mountable accessory in accordance with another embodiment of the present invention.
Figure 6:
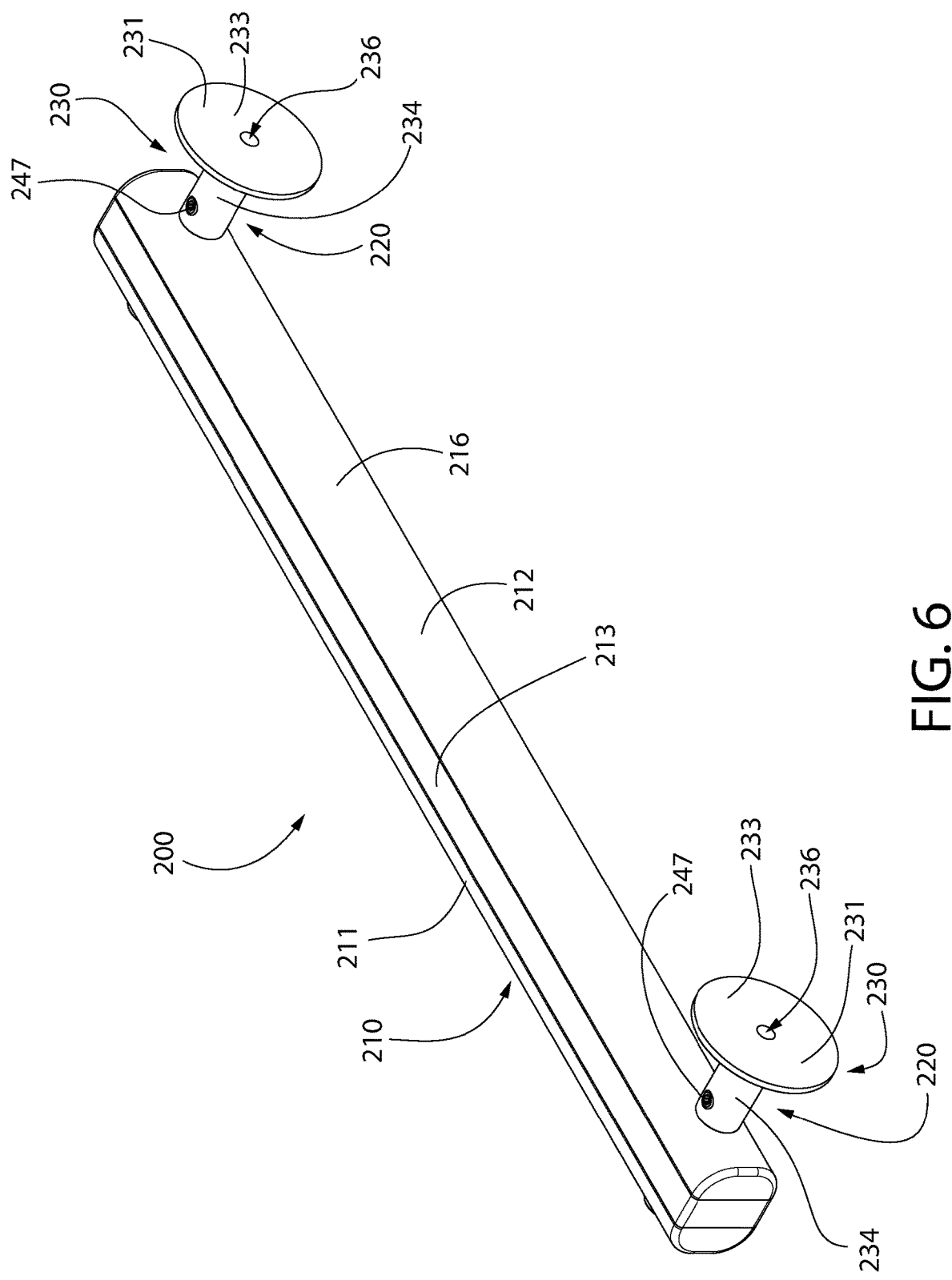
FIG. 6 is a rear perspective view of the wall-mountable accessory of FIG. 5.
Figure 7:
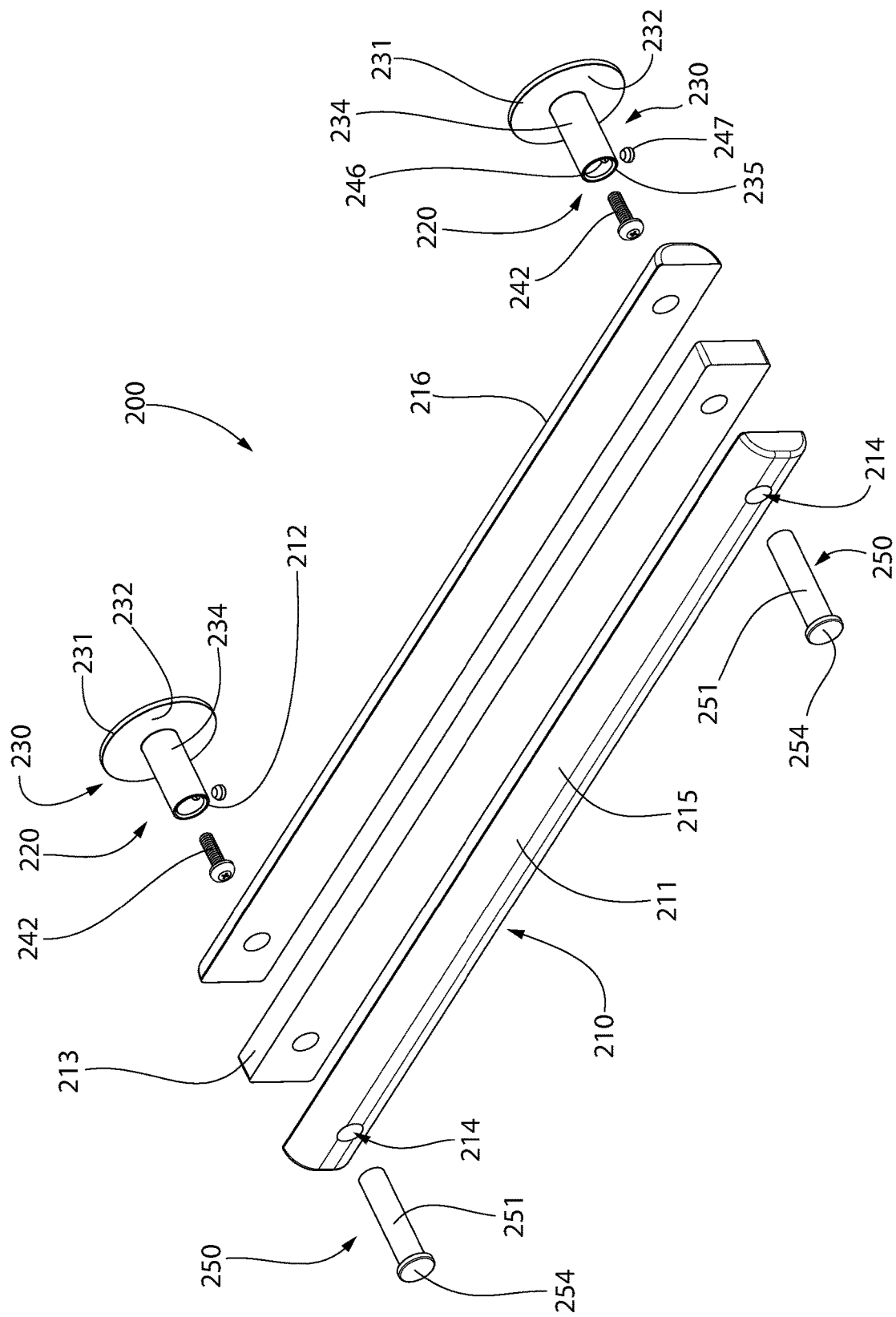
FIG. 7 is an exploded front perspective view of the wall-mountable accessory of FIG. 5.

Referring to FIGS. 1-4, a wall-mountable accessory 100 will be described in accordance with an embodiment of the present invention. The wall-mountable accessory 100 is configured to be mounted to a wall (as shown in FIG. 4) and to serve a functional purpose when mounted on the wall. In the exemplified embodiment, the wall-mountable accessory 100 is a robe hook. However, the concepts described herein can be used for other types of wall-mountable accessories, such as towel bars, grab bars, toilet paper holders, ledges, shelves, and the like, some of which will be described below with respect to alternative embodiments of the present invention.

The wall-mountable accessory 100 generally comprises a solid body 110 and a mounting assembly 120. The solid body 110 comprises an outer surface 111 which may have some type of ornamentation thereon to provide a desired aesthetic. Thus, as noted above, the solid body 110 may contain any one of various different ornamental designs on its outer surface 111 which makes the solid body 110 suitable for use in different interior spaces. The solid body 110 may be formed from a brittle material. The brittle material may be solid and hard in some embodiments. As noted above, brittleness describes the property of a material that fractures when subjected to stress but has a little tendency to deform (either plastic deformation or elastic deformation) before fracture. Brittle materials are characterized by little deformation, poor capacity to resist impact and vibration of load, high compressive strength, low tensile strength, low, ductility, and high hardness. Examples of brittle materials from which the solid body 110 may be formed include solid surface, glass, concrete, ceramic, acrylic and others either described herein or known in the art as being brittle materials. Moreover, when describing a brittle material herein, the description relates to a material that is brittle at ambient or room temperature, which is approximately 72° F.

The outer surface 111 of the solid body 110 comprises a front surface 112, a rear surface 113 that is opposite the front surface 112, and a peripheral surface or outer edge surface 114 which extends between the front and rear surfaces 112, 113. When the wall-mountable accessory 100 is mounted upon a wall 105 as shown in FIG. 4, the rear surface 113 faces the wall and the front surface 112 faces away from the wall 105. However, the solid body 110 is maintained spaced from the wall 105 by the mounting assembly 120 or portions thereof. In the exemplified embodiment, the solid body 110 comprises a through-through-hole 115 that extends from the front surface 112 to the rear surface 113. Thus, in this embodiment the through-hole 115 extends through the entire thickness of the solid body 110 from the front surface 112 to the rear surface 113. The solid body 110 therefore has the shape of a ring or donut with the through-hole 115 extending through a center of the solid body 110. Other than the through-hole 115, the solid body 110 is solid and non-hollow in the exemplified embodiment. In the exemplified embodiment the front and rear surfaces 112, 113 of the solid body 110 are planar and parallel to the wall 105 upon which the wall-mountable accessory 100 is mounted. However, the specific characteristics of the front and rear surfaces 112, 113 is not to be limiting of the invention and in other embodiments they could be wavy or have patterns or indentations. In still other embodiments, the solid body 110 could be maintained in an angled configuration such that the front and rear surfaces 112, 113 are oriented obliquely relative to the wall 105.

The solid body 110 is mounted to the wall 105 via the mounting assembly 120. In that regard, the mounting assembly 120 comprises a standoff 130 and a fastening pin 150. The standoff 130 comprises a plate portion 131 having a front surface 132 and a rear surface 133 and a stem portion 134 that protrudes from the front surface 132. In the exemplified embodiment, the standoff 130 is depicted as a unitary construct such that the plate portion 131 and the stem portion 134 are integrally formed. However, the invention is not to be so limited in all embodiments and in alternative embodiments (such as the one described below with reference to FIGS. 35-37) the plate portion 131 and the stem portion 134 may be separate components that are coupled together with fasteners or the like as will be described below. In the exemplified embodiment the standoff 130 may be formed from metal. In other embodiments the stem portion 134 of the standoff 130 may be formed from metal and the plate portion 131 of the standoff 130 may be formed from other materials, including brittle materials such as solid surface materials or any other brittle material described herein. When the standoff 130 is mounted to the wall 105, the rear surface 133 of the plate portion 131 faces the wall. More specifically, when the standoff 130 is mounted to the wall 105, the rear surface 133 of the plate portion 131 abuts against the wall 105. In the exemplified embodiment, the plate portion 131 of the standoff 130 has a circular shape, but the invention is not to be so limited in all embodiments and the plate portion 131 can take on any other shape, including polygon shapes and non-polygonal shapes, as may be desired. Moreover, the thickness of the plate portion 131 may be greater than that shown in other embodiments, particularly in embodiments where the plate portion 131 is formed from a brittle material such as solid surface.

The stem portion 134 protrudes from the front surface 132 of the plate portion 131 and terminates in a distal end 135. In the exemplified embodiment, the stem portion 134 is tubular and has a circular cross-sectional shape. However, the invention is not to be so limited in all embodiments and the stem portion 134 may have other shapes, such as being square or rectangular in cross-section, or the like. Thus, the invention is not to be limited by the shape of the stem portion 134 of the standoff 130 in all embodiments. Moreover, while the stem portion 134 is hollow in the exemplified embodiment, it could be solid or at least partially solid in other embodiments.

In the exemplified embodiment, the standoff 130 comprises an internal passageway 136 that extends from the distal end 135 of the stem portion 134 to the rear surface 133 of the plate portion 131. The internal passageway 136 is elongated along a passageway axis A-A that extends from the distal end 135 of the stem portion 134 to the rear surface 133 of the plate portion 131. The internal passageway 136 is defined by a first inner surface portion 137, a ledge portion 138 and a second inner surface portion 139. The first inner surface portion 137 extends from the distal end 135 of the stem portion 134 to the ledge portion 138 and the second inner surface portion 139 extends from the ledge portion 138 to the rear surface 133 of the plate portion 131. The first and second inner surface portions 137, 139 extend in a direction parallel to the passageway axis A-A. In the exemplified embodiment, the ledge portion 138 extends in a direction perpendicular to the passageway axis A-A, although in other embodiments the ledge portion 138 may extend in a direction that is oblique to the passageway axis A-A. A first axial portion 140 of the internal passageway 136 that is defined by (surrounded by) the first inner surface portion 137 has a greater diameter than a second axial portion 141 of the internal passageway 136 that is defined by (surrounded by) the second inner surface portion 138.

Although in the exemplified embodiment the internal passageway 136 extends form the distal end 135 of the stem portion 134 to the rear surface 133 of the plate portion 131, the invention is not to be so limited in all embodiments. Specifically, in other embodiments the elongated passageway 136 may extend from an opening in the distal end 135 of the stem portion 134 but may not extend all the way to the rear surface 133 of the plate portion 131. In such embodiments, the internal passageway 136 may be configured to receive a portion of the fastening pin 150 as described in greater detail below, but it may not be used to receive a fastener for mounting the standoff 130 to the wall 105. Rather, in such an alternative implementation, there may be holes in the plate portion that receive fasteners which are used for coupling the standoff 130 to the wall 105.

As seen in FIGS. 3 and 4, the mounting assembly 120 further comprises a fastener 142 that is configured to be inserted into the internal passageway 136 of the standoff 130 through the opening in the distal end 135 of the stem portion 134 for purposes of coupling the standoff 130 to the wall 105. In the exemplified embodiment, the fastener 142 is a screw comprising a threaded portion or shank portion 143 and a head portion 144. The head portion 144 has a greater diameter than the threaded portion 143. Thus, the fastener 142 is inserted into the internal passageway 136 of the standoff 130 with the threaded portion 143 first. The threaded portion 143 eventually protrudes from the rear surface 133 of the plate portion 131 and may enter into a pre-drilled hole in the wall 105. The fastener 142 is then screwed to the wall 105 until a lower surface 145 of the head portion 144 from which the threaded portion 143 extends abuts against the ledge portion 138 of the internal passageway 136. The head portion 144 has a greater diameter than the second portion 141 of the internal passageway 136, which prevents the head portion 144 from passing into the second portion 141 of the internal passageway 136. Stated another way, the head portion 144 is permitted to enter into the first portion 140 of the internal passageway 136 but prevented from entering into the second portion 141 of the internal passageway 136 due to the relative dimensions of the head portion 144 of the fastener 142 and the first and second portions 140, 141 of the internal passageway 136.

Although in the exemplified embodiment the fastener 142 is disposed within the internal passageway 136 to couple the standoff 130 to the wall 105, the invention may not be so limited in all embodiments. In particular, in an alternative embodiment there may be fastener receiving holes formed through the plate portion 131 of the standoff 130 at locations external to the stem portion 134 of the standoff 130. One or more fasteners may extend into and through such fastener receiving holes in the plate portion 131 of the standoff 130 to couple or mount the standoff 130 to the wall 105 in some alternative embodiments (and this may be done in combination with the fastener 142 in the internal passageway 136 as described above, although in such embodiments the internal passageway 136 could be omitted and the stem portion 134, or at least a portion thereof, could be solid).

The stem portion 134 of the standoff 131 also comprises an opening 146 that extends from an outer surface of the stem portion 134 to an inner surface of the stem portion 134 along the first portion 140 of the internal passageway 136. The opening 146 extends from the outer surface to the inner surface of the stem portion 134 in a direction that is perpendicular to the passageway axis A-A. In the exemplified embodiment, the opening 146 is located closer to the distal end 135 of the stem portion 134 than to the plate portion 131. The opening 146 is configured to receive a set screw 147 for purposes of coupling the fastening pin 150 of the mounting assembly 120 to the standoff 130 of the standoff 120, as discussed in greater detail below. The set screw 147 may have a pointed tip in some embodiments, although such a pointed tip is not depicted in the drawings.

The fastening pin 150 of the mounting assembly 120 comprises a tubular portion 151 that extends from a first end 152 to a second end 153 and a flange portion 157 that extends radially from the tubular portion 151 at the second end 153. The tubular portion 151 is elongated in a direction extending from the first end 152 to the second end 153. Moreover, in the exemplified embodiment the tubular portion 151 is hollow such that it includes an inner surface 155 that defines a hollow passageway 156. However, the tubular portion 151 may be solid in other embodiments, although less material is used when the tubular portion 151 is hollow, thereby reducing costs. The hollow passageway 156 extends to an opening at the first end 152 of the tubular portion 151, but the second end 153 of the tubular portion 151 is closed by the flange portion 157. Thus, even if the hollow passageway 156 exists, a user cannot see into the hollow passageway 156 when the product is assembled as described herein.

In some embodiments, the fastening pin 150 and the standoff 130 may be formed from metal. In one particular embodiment, the fastening pin 150 and the standoff 130 may be formed from stainless steel. Of course, other metals may be used in other embodiments. Moreover, in other embodiments the standoff 130, or at least the stem portion 134 thereof, may be made from metal and the fastening pin 150 may be made from non-metal materials, such as any of the brittle materials described herein. The stem portion 134 of the standoff 130 is preferably formed from metal (or possibly plastic) to enable it to receive the set screw 147 as described herein.

In the exemplified embodiment, the tubular portion 151 of the fastening pin 150 has a circular transverse cross-sectional shape, which matches the shape of the through-hole 115 in the solid body 110 and the shape of the internal passageway 136 of the standoff 130. This allows for these parts to nest within each other, as described herein. Of course, it should be appreciated that the aforementioned parts or components need not be circular in all embodiments, but could have other shapes so long as they are similar shapes or shapes that are configured to allow for the interaction between the components as described herein below. Thus, the tubular portion 151, the through-hole 115 and the internal passageway 136 of the stem portion 134 may all be square, or rectangular, or triangular in cross-section in various different embodiments, for example, without affecting the overall function as described herein.

Figures 3A, 3B:
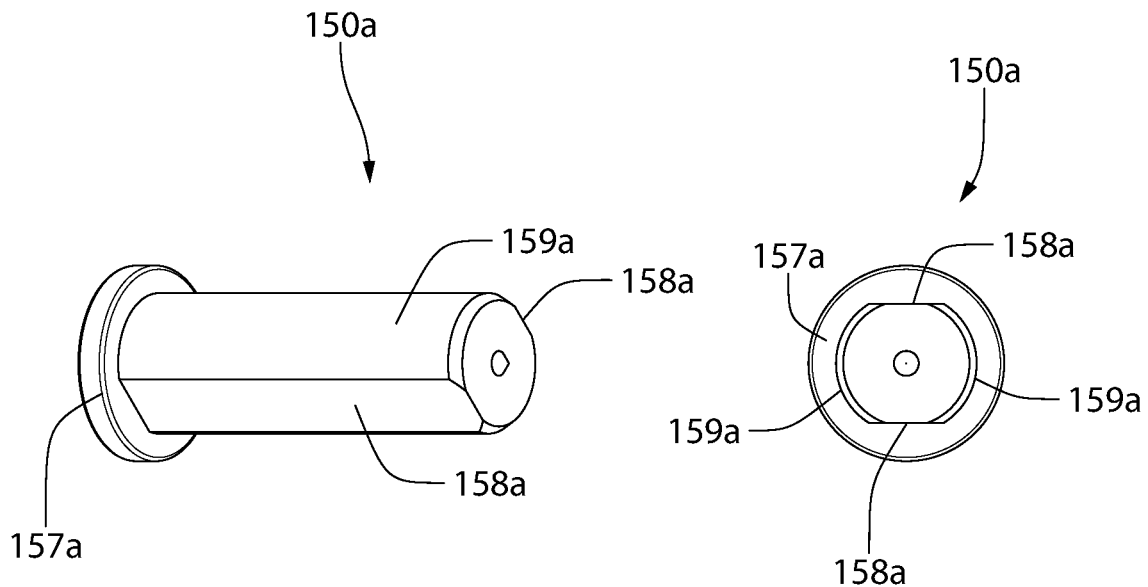
FIG. 3A is a perspective view of a fastening pin of the wall-mountable accessory of FIG. 1 in accordance with another embodiment.
FIG. 3B is a rear view of the fastening pin of FIG. 3A.

Referring to FIGS. 3A and 3B, another embodiment of the fastening pin 150a is illustrated. The fastening pin 150a is the same as the fastening pin 150 except with regard to the shape of the tubular portion thereof. In particular, the tubular portion of the fastening pin 150a is not entirely round and does not have a circular transverse cross-sectional shape. Rather, the tubular portion of the fastening pin 150a comprises two flat portions 158a that are circumferentially spaced apart by two curved portions 159a. The two flat portions 158a are spaced approximately 180° apart from one another in the exemplified embodiment, although the invention is not to be so limited in all embodiments. When the fastening pin 150a is received within the standoff 130, the set screw 147 may be configured to engage one of the flat portions 158a.

Figure 3C:
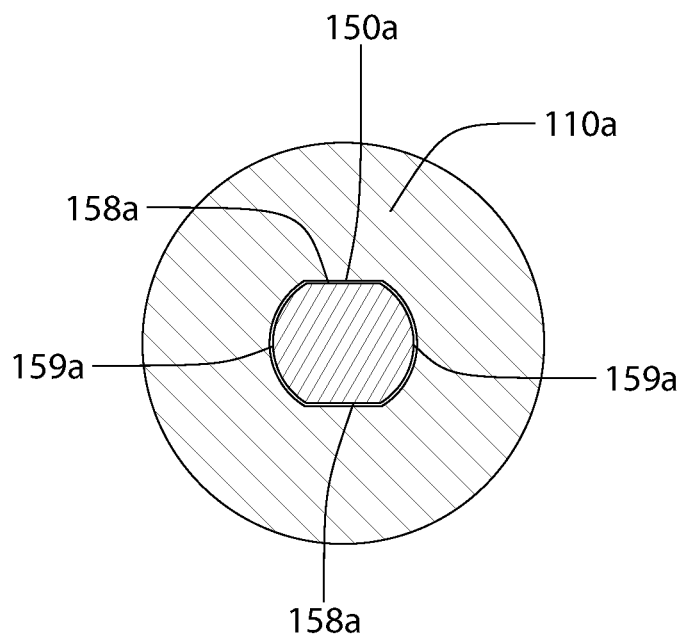
FIG. 3C is a cross-sectional view illustrating engagement between the fastening pin of FIG. 3A with a solid body of the wall-mountable accessory.

FIG. 3C is a cross-sectional view illustrating the engagement of the tubular portion of the fastening pin 150a with the interior of the solid body 110a which defines the through-hole in the solid body 110a. In particular, in this embodiment the through-hole in the solid body 110a is defined by a wall having two flat portions and two curved portions that correspond and interact with the two flat portions 158a and the two curved portions 159a of the tubular portion of the fastening pin 150a. Due to this engagement, the fastening pin 150a is prevented from rotating relative to the solid body 110a, and the solid body 110a is similarly prevented from rotating relative to the fastening pin 150a. Of course, other engagement surfaces may be used in other embodiments to pursue this anti-rotation feature. In fact, in one embodiment the tubular portion of the fastening pin 150a may include only one flat portion and this may still successfully prevent relative rotation between the fastening pin 150a and the solid body 110a. In some embodiments, the tubular portion of the fastening pin 150a and the through-hole in the solid body 110a may be shaped or otherwise designed to have anti-rotation features to prevent relative rotation between those components. In other embodiment the tubular portion of the fastening pin 150a and the through-hole in the solid body 110a may be non-circular to achieve this anti-rotation feature, such as being oval shaped, square shaped, triangular shaped, or any other non-circular shape which forces the surfaces to engage one another and prevents relative rotation between the components.

The wall-mountable accessory 100 is assembled in the following manner. First, the standoff 130 is coupled to the wall 105. In particular, the standoff 130 is positioned so that the rear surface 133 of the plate portion 131 abuts against the outer surface of the wall 105. Then, the fastener 142 is inserted into the internal passageway 136 of the standoff 130 until the threaded portion 143 extends into a pre-drilled hole in the wall 105 (or the threaded portion 143 may be forced through the wall 105 to form a hole in the wall 105 within which the threaded portion 143 will be embedded). A wall anchor may also be used if so desired to provide a more secure and stronger attachment/coupling of the standoff 130 to the wall 105.

Next, the tubular portion 151 of the fastening pin 150 is inserted through the through-hole 115 in the solid body 110 until an underside 158 of the flange portion 157 of the fastening pin 150 abuts against the front surface 112 of the solid body 110. It should be appreciated that there may be a recess formed into the front surface 112 and the flange portion 157 of the fastening pin 150 may abut against the floor of such recess. However, for purposes of the invention described herein, the floor of a recess in the front surface 112 also forms a part of the front surface 112. Thus, the front surface 112 is any exposed part of the solid body 110 along the front viewing region thereof.

When the fastening pin 150 is positioned with the flange portion 157 abutting the front surface 112 of the solid body 110, a first portion 159 of the tubular portion 151 of the fastening pin 150 nests within the through-hole 115 and a second portion 160 of the tubular portion 151 of the fastening pin 150 protrudes from the rear surface 113 of the solid body 110. This is due to the fact that a length of the tubular portion 151 of the fastening pin 150 is greater than a thickness of the solid body 110 measured from the front surface 112 to the rear surface 113. The flange portion 157 of the fastening pin 150 covers and closes the opening of the through-hole 115 which is located on the front surface 112 of the solid body 110 so that the through-hole 115 is no longer visible when viewed from the front surface 112 of the solid body 110.

Next, the fastening pin 150 is translated/moved so that the second portion 160 of the tubular portion 151 of the fastening pin 150 is inserted into the internal passageway 136 of the stem portion 134 of the standoff 130. The fastening pin 150 is continued to be moved towards the standoff 130 until the distal end 135 of the stem portion 134 of the standoff 130 abuts against the rear surface 113 of the solid body 110. At this point, the solid body 110 is sandwiched between the flange portion 157 of the fastening pin 150 and the distal end 135 of the stem portion 134 of the standoff 130, as best shown in FIG. 4. While applying a force F onto the support portion 150 in the direction of the wall 105, the set screw 147 is inserted into the opening 146 and tightened until it presses against the second portion 160 of the tubular portion 151 of the fastening pin 150 which is nesting within the internal passageway 136 of the standoff 130. In the exemplified embodiment, there is no pre-drilled hole in the tubular portion 151 of the fastening pin 150. Thus, the set screw 147 may be formed with a pointed tip so that it can tightly grip onto and potentially penetrate the outer surface of the tubular portion 151 of the fastening pin 150 to form a secure coupling between the fastening pin 150 and the standoff 130. In other embodiments, the tubular portion 151 may include an annular or partially annular recess within which the tip of the set screw 147 nests to lock the standoff 130 to the fastening pin 150.

The standoff 130 maintains the solid body 110 at a distance from the wall 105. That is, the rear surface 113 of the solid body 110 is maintained at a distance from the wall 105, which provides a space for a user to hang objects such as a robe from the solid body 110. The space between the rear surface 113 of the solid body 110 and the wall 105 is determined by the length of the standoff 130.

When the wall-mountable accessory 100 is fully assembled as described above and shown in FIG. 4, the mounting assembly 120 applies a stable compressive force onto the solid body 110. In particular, the flange portion 157 of the fastening pin 150 and the distal end 135 of the stem portion 134 of the standoff 130 apply a compressive force onto the solid body 110. That is, the solid body 110 is held under compression between the standoff 130 and the fastening pin 150. In the exemplified embodiment, the distal end 135 of the stem portion 134 of the standoff 130 and the underside 158 of the flange portion 157 of the fastening pin 150 are annular in shape, such that the distal end 135 is in contact with an annular portion of the rear surface 113 of the solid body 110 and the underside 158 of the flange portion 157 is in contact with an annular portion of the front surface 112 of the solid body 110. In the exemplified embodiment, the annular portions of the front and rear surfaces 112, 113 of the solid body 110 are aligned and they surround the through-hole 115 in the solid body 110. The solid body 110 is maintained in a consistent and stable compressive environment without any individual point forces acting thereon, which provides the brittle material of the solid body 110 with significant structural strength to prevent cracking, breaking, or other damage during normal use and wear and tear.

As noted above, the flange portion 157 of the fastening pin 150 covers the through-hole 115 in the solid body 110 and also covers a portion of the front surface 112 of the solid body 110. However, there remains a portion of the front surface 112 of the solid body 110 which is exposed and which surrounds the flange portion 157 of the fastening pin 150. Furthermore, along the rear surface 113 of the solid body 110, the distal end 135 of the stem portion 134 of the standoff 130 is the only portion of the mounting assembly 120 which contacts the rear surface 113 of the solid body 110. The remainder of the rear surface 113 of the solid body 110 remains exposed. This is preferable because the solid body 110 has an ornamental design thereon as noted above so having parts of the outer surface of the solid body 110 exposed serves an aesthetic purpose. The fastening pin 150 may also have an ornamental design thereon as it may also be formed from a brittle material such as solid surface material. Alternatively the fastening pin 150 may be formed from metal. In either case, a beautiful aesthetic may be created by the appearance of the flange portion 157 of the fastening pin 150 and the solid body 110.

Referring to FIGS. 5-8, another embodiment of a wall-mountable accessory 200 is illustrated in accordance with the present invention. The wall-mountable accessory 200 of FIGS. 5-8 is a towel bar or a grab bar, which is elongated. As a result, the wall-mountable accessory 200 comprises two standoffs and two fastening pins, which will be described in a bit more detail below. However, it is worth noting that the assembly of the wall-mountable accessory 200 is very similar to the assembly of the wall-mountable assembly 100 described above, with the addition of a second standoff and a second fastening pin to support the solid body. This will be better appreciated from the description that follows.

The wall-mountable accessory 200 comprises a solid body 210 and a mounting assembly 220. In this embodiment, the solid body 210 is elongated along a longitudinal axis B-B, which is perpendicular to an axis of the mounting assembly 220. Moreover, in this embodiment the solid body 210 comprises a first portion 211 formed from a brittle material, a second portion 212 formed from a brittle material, and a third portion 213 formed from metal such as stainless steel or the like. The third portion 213 may form a structural insert to provide structural integrity to the solid body 210. Furthermore, the third portion 213 is disposed between the first and second portions 211, 212, which provides for a different aesthetic. In particular, whereas the first and second portions 211, 212 may have an ornamental design thereon as has been noted above, the third portion 213 may have a metallic appearance (unless it is painted, which is also possible). The first, second, and third portions 211, 212, 213 of the solid body 210 may be coupled together using adhesives or fasteners, or they may be held together under compression by the mounting assembly 220 without requiring any adhesives or additional fasteners. Moreover, although the solid body 210 is formed from distinct first, second, and third portions 211, 212, 213 in the exemplified embodiment, the invention is not to be so limited. That is, in other embodiments the solid body 210 could be a singular, unitary structure formed from a brittle material similar to the solid body 110 of the wall-mountable accessory 100 described above. In still other embodiments, the solid body 210 may be formed from the brittle material with the structural metal insert embedded completely within the interior of the solid body 210.

Although only this embodiment shows the solid body 210 being formed from three distinct portions or components that are coupled together, it should be appreciated that all of the embodiments described herein may utilize this feature. Moreover, although in the exemplified embodiment the third portion 213 has similar dimensions to the first and second portions 211, 212, in other embodiments the third portion 213 may have a ring-like shape so long as its outer surface is flush with the outer surfaces of the first and second portions 211, 212. This will reduce costs due to reduction in material for the third portion 213, which still achieving the same desirable aesthetic.

Figure 8:
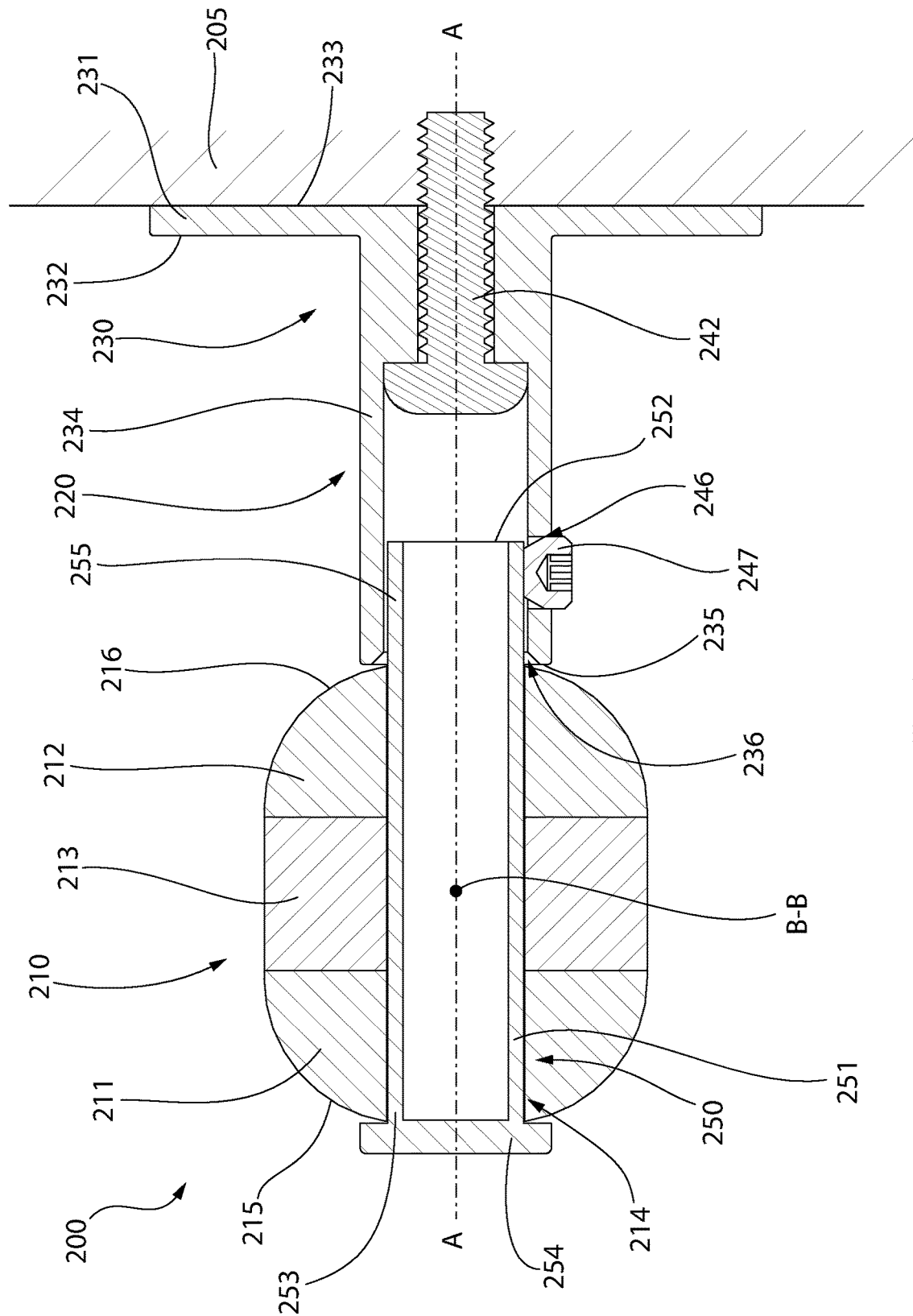
FIG. 8 is a cross-sectional view taken along line VIII-VIII of FIG. 5, illustrating the wall-mountable accessory mounted to a wall.

The solid body 210 comprises a through-hole 214 that extends through each of the first, second, and third portions 211, 212, 213. That is, each of the first, second, and third portions 211, 212, 213 of the solid body 210 comprises a hole and the various holes are aligned to form a through-hole 214 that extends through the solid body 210 from a front surface 215 of the solid body 210 to a rear surface 216 of the solid body 210. More specifically, because the solid body 210 is elongated along the axis B-B, in the exemplified embodiment the solid body 210 comprises two of the through-holes 214, each positioned adjacent to one of the opposing side edges/surfaces of the solid body 210. Two through-holes 214 may be needed in order to securely mount the solid body 210 to a wall 205 as described in greater detail below, although it may be possible for the solid body 210 to be mounted with just a single through-hole in alternative embodiments, with this being somewhat dependent on the length and weight of the solid body 210. The mounting assembly 220 interacts with/engages the through-holes 214 to mount the solid body 210 to the wall 205 as shown in FIG. 8.

In the exemplified embodiment, the solid body 210 has a curved front surface 215 and a curved rear surface 216 such that the solid body 210 has a somewhat oval cross-sectional shape. However, the invention is not to be particularly limited by the shape of the solid body 210 in all embodiments. That is, the solid body 210 may have a rectangular, circular, square, triangular, or other cross-sectional shape in other embodiments.

The mounting assembly 220 is identical to the mounting assembly 210 previously described, except that it is duplicated and includes two standoffs 230 and two fastening pins 250. However, each of the standoffs 230 is identical to the standoffs 130 described above, each of the fastening pins 250 is identical to the fastening pins 150 described above, and the interaction between the standoffs 230 and the fastening pins 250 both with each other and with the solid body 210 is identical to that which was described above. One of the standoffs 230 and fastening pins 250 is located adjacent to a first end of the solid body 210 and the other of the standoffs 230 and fastening pins 250 is located adjacent to the opposite second end of the solid body 210, the first and second ends of the solid body 210 being ends of the solid body 210 in the direction of its longitudinal axis.

The standoffs 230 each comprise a plate portion 231 having a front surface 232 and a rear surface 233 and a stem portion 234 extending from the front surface 232 to a distal end 235. The stem portion 234 may be a separate component from the plate portion 231 as noted above and described in more detail with reference to FIGS. 35-37. Furthermore, the standoffs 230 comprise an internal passageway 236 that extends from the distal end 234 of the stem portion 234 to the rear surface 232 of the plate portion 231. The internal passageway 236 is configured to receive a fastener 242 such as a screw for purposes of coupling the standoff 230 to the wall 205. Furthermore, the stem portion 234 comprises an opening 246 configured to receive a set screw 247 for coupling the standoff 230 to the fastening pin 250. The opening 246 extends from an outer surface of the stem portion 234 to an inner surface of the stem portion 234 which defines a portion of the internal passageway 236.

The fastening pins 250 each comprise a tubular portion 251 extending from a first end 252 to a second end 253 and a flange portion 254 located at the second end 253. The flange portion 254 extends radially outward from an outer surface of the tubular portion 251. In the exemplified embodiment, the tubular portion 251 is tubular with a hollow interior having openings at both of the first and second ends 252, 253, with the flange portion 254 closing the opening in the second end 253 of the tubular portion 251.

The assembly of the wall-mountable accessory 200 is similar to the assembly of the wall-mountable assembly 100 provided above. Specifically, first the standoffs 230 are mounted to the wall 205 using the fasteners 242. Next, the tubular portions 251 of the fastening pins 250 are inserted through the through-holes 214 of the solid body 210 until the flange portion 251 of the fastening pins 250 abuts against the front surface 215 of the solid body 210. When so positioned, a distal portion 255 of the tubular portions 251 of the fastening pins 250 protrude from the rear surface 216 of the solid body 210. As noted above, there are two through-holes 214 in the solid body 210 and two fastening pins 250 so that one fastening pin 250 is positioned in each of the two through-holes 214. Of course, more or less through-holes 214 and corresponding fastening pins 250 may be used in different embodiments depending on the length and weight of the solid body 210.

Next, the distal portion 255 of the tubular portion 251 of each of the fastening pins 250 is inserted into the internal passageway 236 of one of the standoffs 230 until the rear surface 216 of the solid body 210 abuts against the distal end 235 of the stem portion 234 of the standoff 230. Once so positioned, the set screw 247 is positioned within the opening 246 in the stem portion 234 of the standoff 230 and tightened until a tip end of the set screw 247 engages an outer surface of the distal portion 255 of the tubular portion 251 of the fastening pin 250. In this position, the solid body 210 is compressed between the flange portion 254 of the fastening pin 250 and the distal end 235 of the stem portion 234 of the standoff 230. The flange portion 254 of the fastening pin 250 and the distal end 235 of the stem portion 234 of the standoff 230 may apply a stable compressive force onto the solid body 210 to maximize the structural strength of the solid body 210. Once mounted on the wall 205, the axis B-B of the solid body 210 extends in a direction that is perpendicular to the passageway axis A-A of the internal passageway 236 of the standoff 230.

Figure 9:
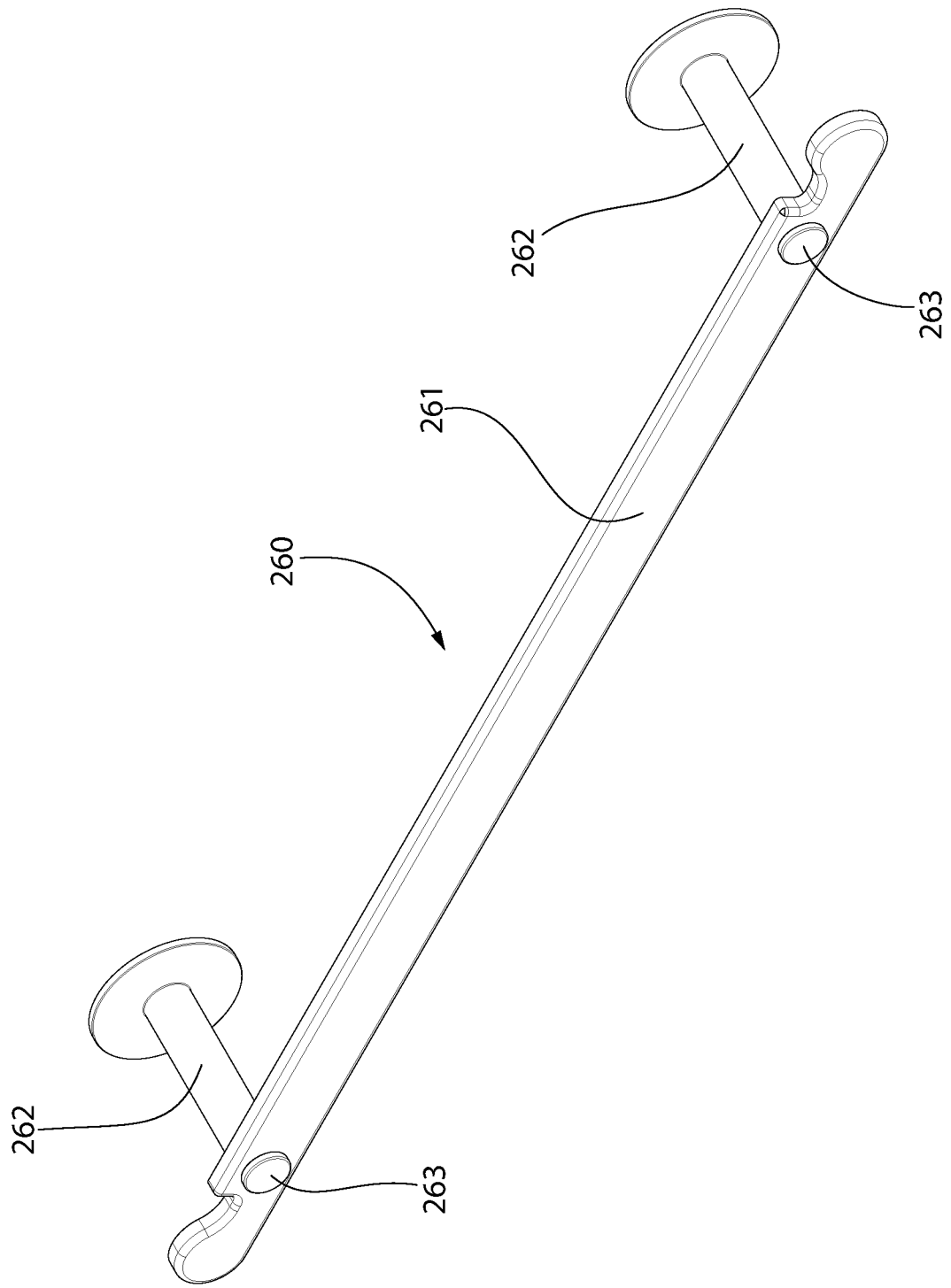
FIG. 9 is a front perspective view of a wall-mountable accessory in accordance with another embodiment of the present invention.

FIGS. 9-12 illustrate alterative wall-mountable accessories that can be mounted to a wall using the same components and techniques described herein. Specifically, FIG. 9 illustrates a wall-mountable accessory 260 in the form of a towel bar having an ornate design. The wall-mountable accessory 260 comprises a solid body 261 formed of a brittle material and a mounting assembly which comprises two standoffs 262 and two fastening pins 263. The details of the mounting assembly are identical to those described herein and will not be described with reference to FIG. 9 in the interest of brevity. The mounting assembly may apply stable compressive forces onto the solid body 261 as has been described above.

Figure 10:
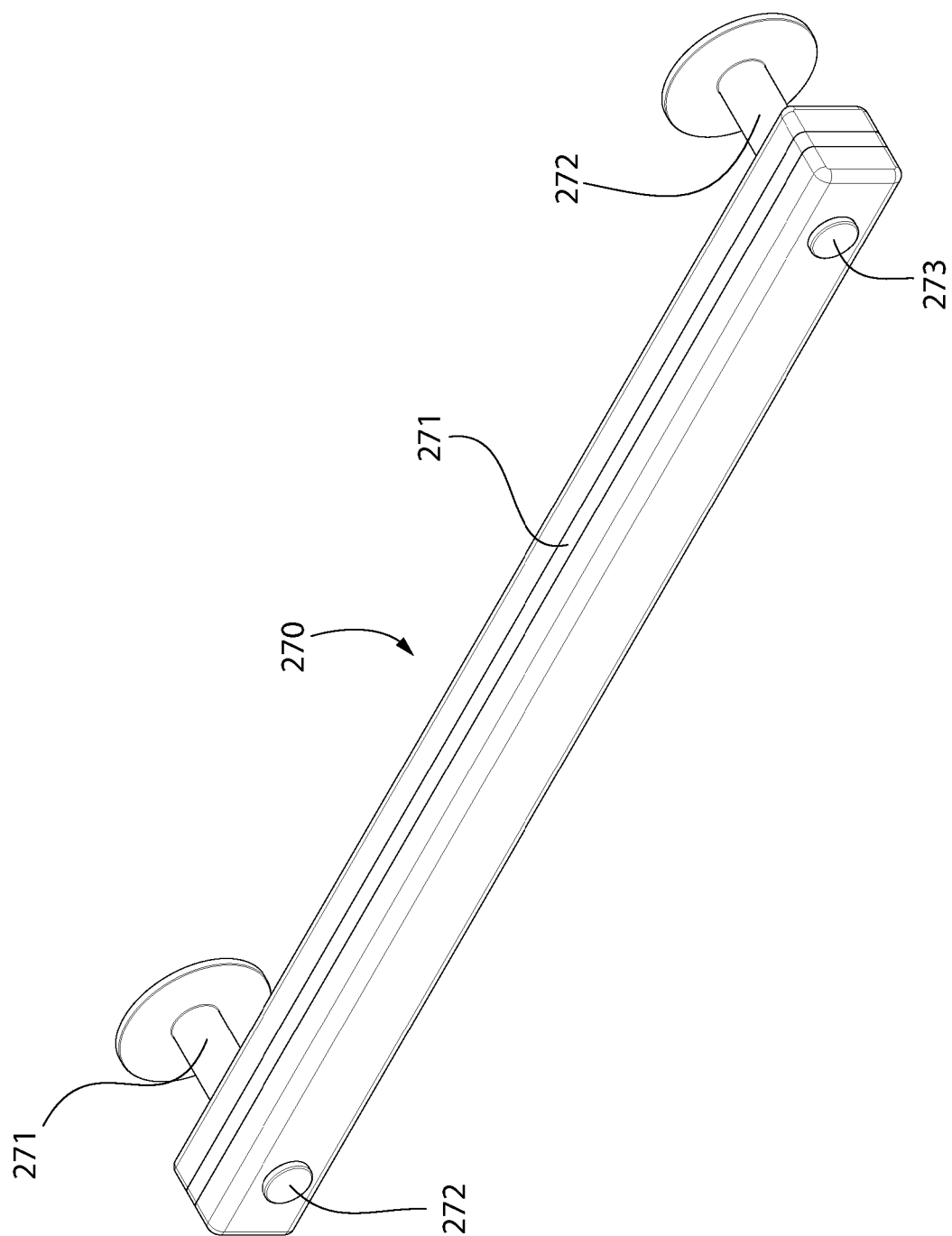
FIG. 10 is a front perspective view of a wall-mountable accessory in accordance with another embodiment of the present invention.

FIG. 10 illustrates yet another wall-mountable accessory 270 in the form of a towel bar or a grab bar. Again, the wall-mountable accessory 270 comprises a solid body 271 formed from a brittle material and a mounting assembly which comprises two standoffs 272 and two fastening pins 273. The details of these components as described above is fully applicable to this embodiment and therefore a more detailed description of the wall-mountable accessory 270 is being omitted in the interest of brevity.

Figure 11:
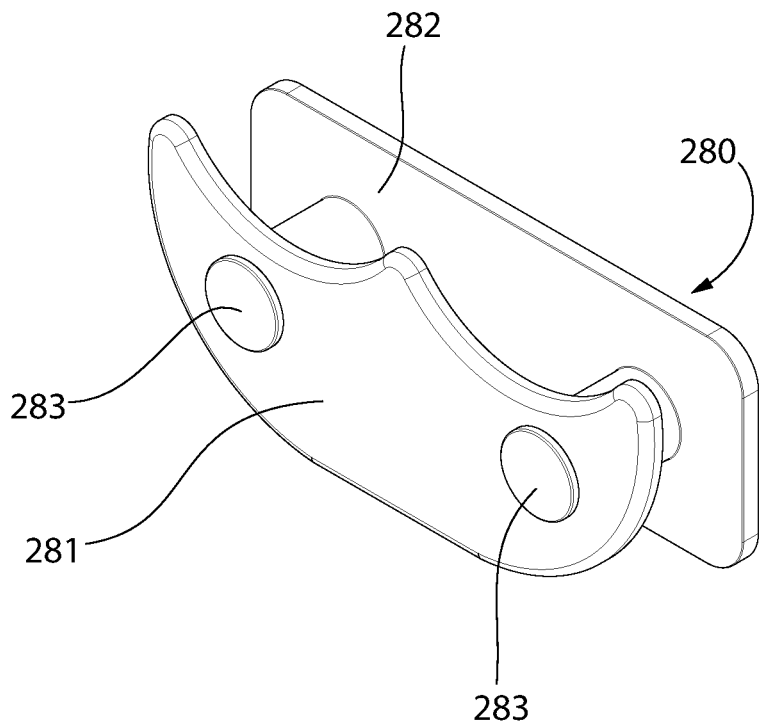
FIG. 11 is a front perspective view of a wall-mountable accessory in accordance with another embodiment of the present invention.
Figure 12:
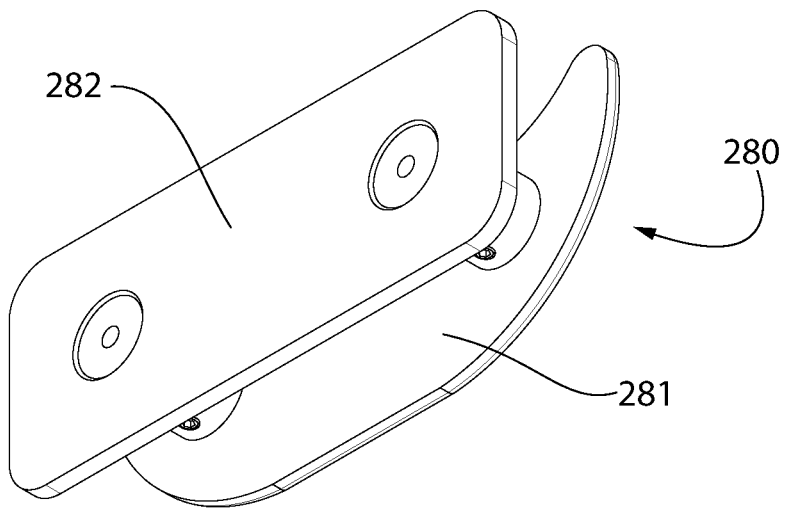
FIG. 12 is a rear perspective view of the wall-mountable accessory of FIG. 11.
Figure 13:
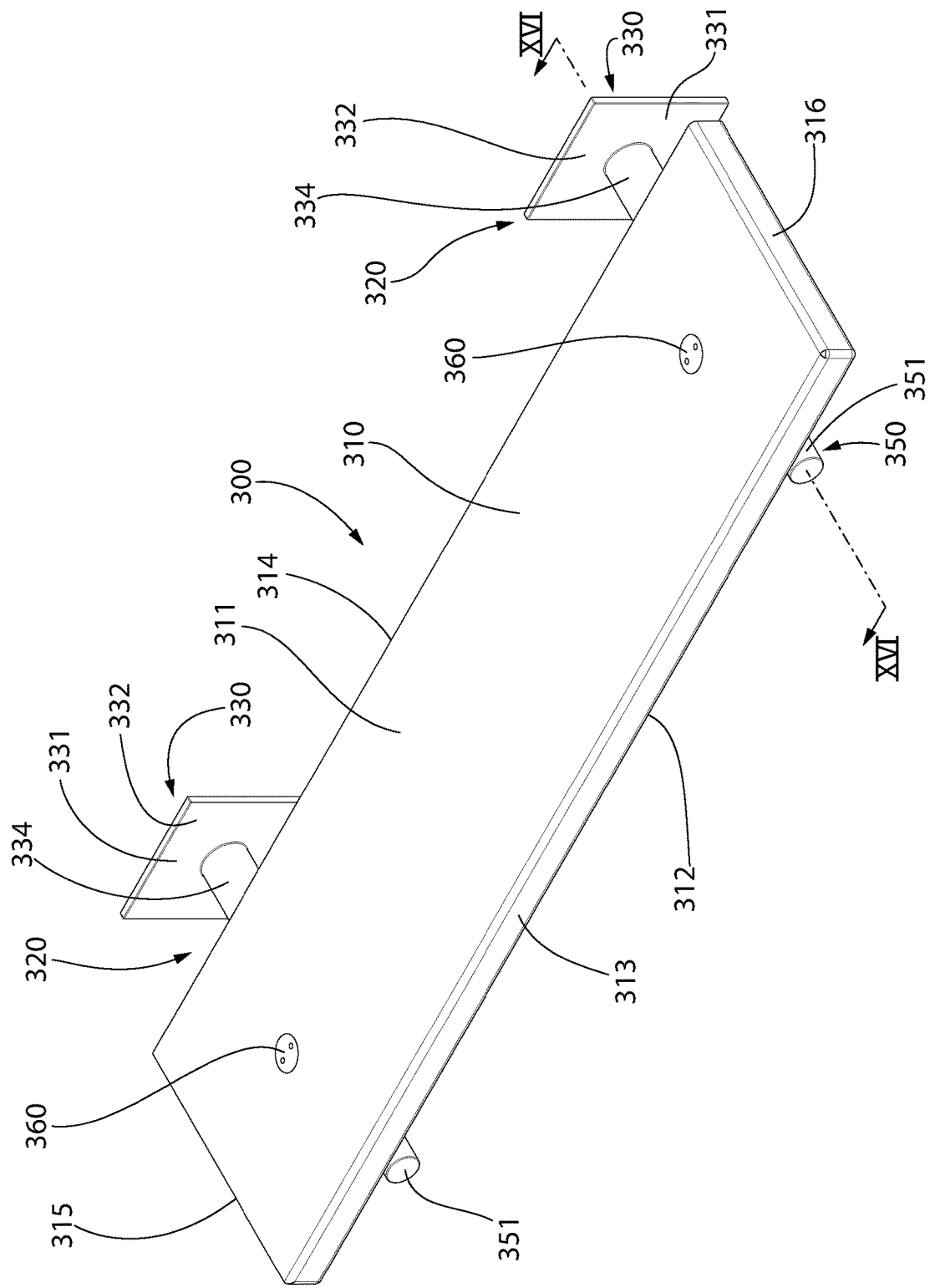
FIG. 13 is a front perspective view of a wall-mountable accessory in accordance with another embodiment of the present invention.
Figure 14:
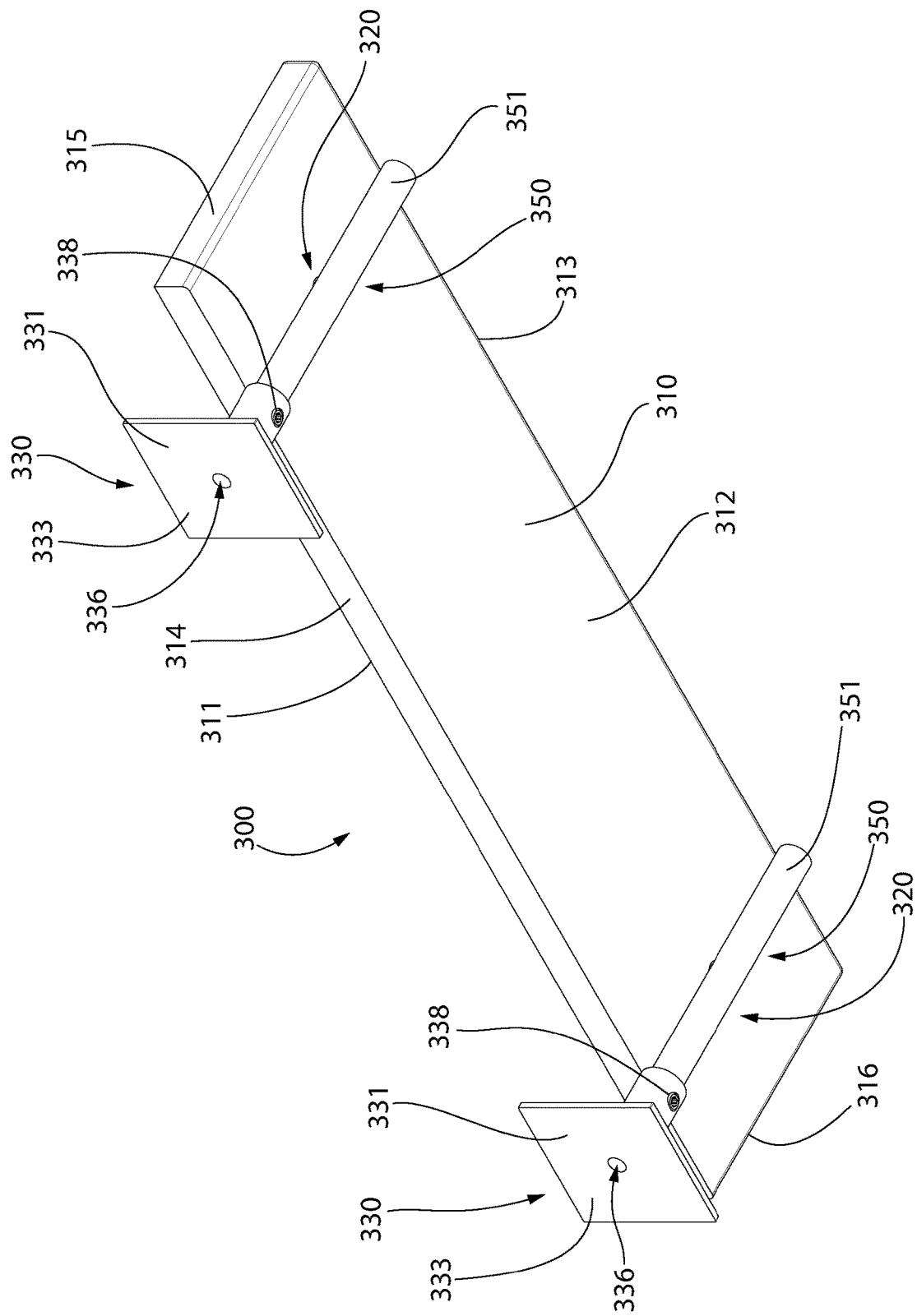
FIG. 14 is a rear perspective view of the wall-mountable accessory of FIG. 13.
Figure 15:
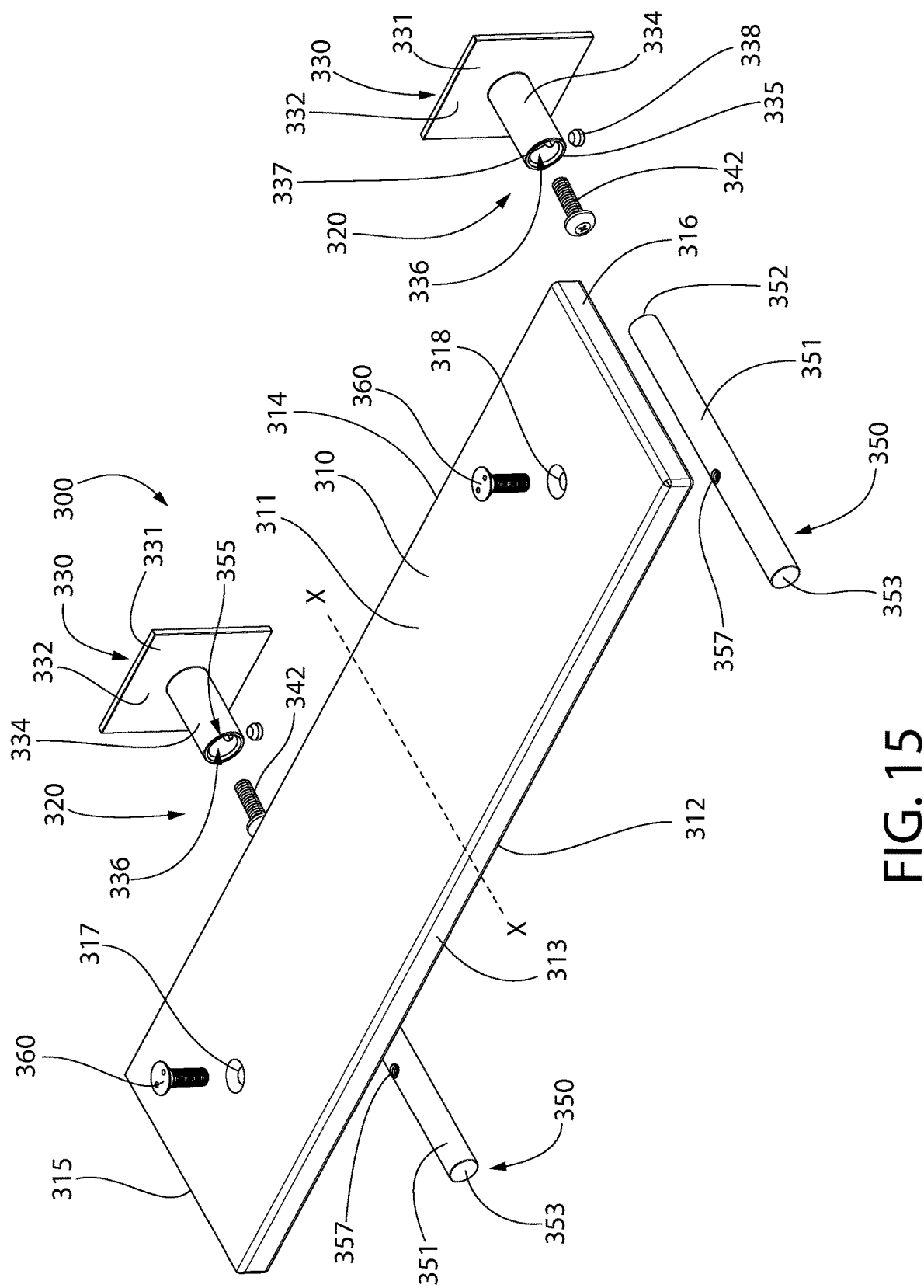
FIG. 15 is an exploded front perspective view of the wall-mountable accessory of FIG. 13.

FIGS. 11 and 12 illustrate yet another wall-mountable accessory 280, which can be used as a hook for hanging items, such as a double robe hook. The wall-mountable accessory 280 comprises a solid body 281 formed from a brittle material and a mounting assembly which comprises two standoffs 282 and two fastening pins 283. In the exemplary embodiment the standoffs 282 are both formed as part of a unitary structure on a single plate. However, the standoffs 282 could be separate components in other embodiments as with the embodiments previously described. The details of these components as described above is fully applicable to this embodiment and therefore a more detailed description of the wall-mountable accessory 270 is being omitted in the interest of brevity.

Referring to FIGS. 13-16, another embodiment of a wall-mountable accessory 300 will be described. The wall-mountable accessory 300 comprises a solid body 310 and a mounting assembly 320, as with the embodiments described previously. In this embodiment, the solid body 310 forms a ledge or shelf which is configured to be mounted to and protrude from a wall 305. Furthermore, in this embodiment, parts of the mounting assembly 320 are identical to the previously described mounting assemblies 120, 220 and other parts of the mounting assembly 120 are specific to the wall-mountable accessory 300. This will be explained in greater detail below.

The solid body 310 is formed from a brittle material as with the previously described embodiments. The term brittle material has been defined previously and the definition of brittle material remains consistent throughout this disclosure. One particular material that the solid body 310 may be formed from is solid surface material, which has also been explained above. The solid body 310 comprises a top surface 311, a bottom surface 312, and a peripheral edge extending between the top and bottom surfaces 311, 312. In the exemplified embodiment, the solid body 310 has a rectangular shape, and thus the peripheral edge comprises a front edge 313, a rear edge 314, a first side edge 315, and a second side edge 316. In other embodiments, the solid body 310 may have a circular shape, a triangular shape, a square shape, or any other desired shape and thus the configuration of the peripheral edge may be modified from that which is shown and described with reference to the exemplified embodiment.

As noted above, the solid body 310 forms a ledge or shelf. Thus, in the exemplified embodiment the top surface 311 of the solid body 310 is a flat, planar surface. Moreover, in the exemplified embodiment the bottom surface 312 is also a flat, planar surface, although this is not required in all embodiments. The solid body 310 may include a lip or raised wall protruding from the top surface 311 along any of one or more of the front edge 313, the rear edge 314, the first side edge 315, or the second side edge 316, although in the exemplified embodiment there is no such lip or raised wall. Such a raised lip or wall may be used to help maintain items on the ledge or shelf without them falling off.

The solid body 310 comprises a first through-hole 317 that extends from the top surface 311 to the bottom surface 312 and a second through-hole 318 that extends from the top surface 311 to the bottom surface 312. The first through-hole 317 is located equidistant between the front and rear edges 313, 314 and adjacent to the first side edge 315 and the second through-hole 318 is located equidistant between the front and rear edges 313, 314 and adjacent to the second side edge 316. Thus, the solid body 310 has a centerline X-X that is located centrally between the first and second side edges 315, 316, and the first and second through-holes 317, 318 are located on opposite sides of the centerline X-X. The first and second through-holes 317, 318 extend entirely through the thickness of the solid body 310 so that there are openings in both of the top and bottom surfaces 311, 312.

The mounting assembly 320 comprises a standoff 330 and a fastening pin 350. More specifically, the mounting assembly 320 comprises two of the standoffs 330 and two of the fastening pins 350. In other embodiments, the bracket may comprise one or more of the standoffs 330 and an equal number of one or more of the fastening pins 350. The standoff 330 is identical to the standoffs 130, 230 described previously. Thus, while a brief description of the standoff 330 will be provided herein, additional details about the standoff 330 are provided above with reference to the standoffs 130, 220 and will not be repeated herein in the interest of brevity. The standoff 330 comprises a plate portion 331 having a front surface 332 and a rear surface 333 and a stem portion 334 that protrudes from the front surface 332 to a distal end 335. The standoff 330 comprises an internal passageway 336 that extends from the distal end 335 of the stem portion 334 to the rear surface 333 of the plate portion 331. However, as noted above, in alternative embodiments the internal passageway 336 may not extend all the way to the rear surface 333 of the plate portion 331 but may be isolated within the stem portion 334 of the standoff 330. This is because while the internal passageway 336 is configured to receive a fastener 342 for coupling the standoff 330 to the wall 205 in the exemplified embodiment, in other embodiments fasteners may extend through openings in the plate portion 331 for this purpose.

The standoff 330 comprises an opening 337 along the stem portion 334 which extends from an outer surface to an inner surface of the stem portion 334. Thus, the opening 337 forms a passageway from an ambient environment into the internal passageway 336. The opening 337 is configured to receive a set screw 338 which is used to couple a portion of the fastening pin 350 to the standoff 330 as described in greater detail below.

The fastening pin 350 comprises an elongated member 351 that extends from a first end 352 to a second end 353 and a fastener 360 that is used to couple the solid body 310 to the elongated member 351. In the exemplified embodiment, the elongated member 351 is tubular and has a circular or round cross-sectional shape. However, the elongated member 351 may take on other shapes in other embodiments so long as it is configured to engage the standoff 330 and the fastener 360 as described herein. The elongated member 351 comprises an outer surface 354 and an inner surface 355, with the inner surface 355 defining a passageway 356. Thus, in the exemplified embodiment the elongated member 351 is a hollow tubular member, although in other embodiments the elongated member 351 may be solid and non-hollow. In the exemplified embodiment, the first end 352 of the elongated member 351 is open to the passageway 356 and the second end 353 of the elongated member 351 is closed. This is generally done for aesthetics because the second end 353 is exposed to a room in which it is mounted.

The elongated member 351 comprises a hole 357 that extends from the outer surface 354 to the inner surface 355. The hole 357 is configured to mate with the fastener 360 to couple the solid body 310 to the fastening pin 350, as described below.

The wall-mountable accessory 300 is mounted to the wall 305 in the following manner. First, the fastener 342 is inserted into the internal passageway 336 of the standoff 330 until a distal end portion of the fastener 342 is embedded within the wall 305. As discussed above, the internal passageway 336 includes a ledge portion 338 that prevents the head of the fastener 342 from passing entirely through the internal passageway 336. Moreover, in other embodiments various fasteners may extend through openings in the plate portion 331 of the standoff 330 to couple the standoff 330 to the wall 305.

Once the standoff 330 is mounted to the wall 305, the elongated member 351 of the fastening pin 350 is inserted into the internal passageway 336 of the stem portion 334 of the standoff 330, with the first end 352 of the elongated member 351 entering the internal passageway 336 first. In the exemplified embodiment, the elongated member 351 is positioned within the internal passageway 336 of the stem portion 334 with the first end 352 of the elongated member 351 in contact with the ledge portion 338 of the internal passageway 336. In this position, the head of the fastener 342 nests within the passageway 356 of the elongated member 351 of the fastening pin 350. The elongated member 351 should be positioned so that the hole 357 faces upwardly to ensure that the fastener 360 will be able to engage the hole 357 as described herein. The set screw 338 can be inserted into the hole 337 and tightened at this point to couple the standoff 330 to the elongated member 351 of the fastening pin 350. The set screw 338 may have a pointed tip to allow it to adequately engage the elongated member 351 to hold is securely within the internal passageway 336 of the stem portion 334 of the standoff 330.

As noted above, in the exemplified embodiment there are two of the standoff 330 and two of the fastening pins 350. The duplicative components may be needed to provide adequate support for the solid body 310. Moreover, although there are two standoffs 330 and two fastening pins 350 in the exemplified embodiment, it may be possible to use three or more of each of the standoffs 330 and the fastening pins 350 in other embodiments. The exact number of standoffs 330 and fastening pins 350 needed may be dictated based on the length and/or weight of the solid body 310.

Next, the solid body 310 is placed atop of the elongated members 351 so that the bottom surface 312 of the solid body 310 rests atop of the elongated members 351. In the exemplified embodiment the solid body 310 is positioned so that the rear edge 314 abuts the distal end 335 of the stem portion 334 of the standoff 330. However, this is not required in all embodiments and the solid body 310 may be positioned so that a space is maintained between the rear edge 314 of the solid body 310 and the distal end 335 of the stem portion 334 of the standoff 330 in other embodiments. However, it is important to ensure that the solid body 310 is positioned such that the first and second through-holes 317, 318 are aligned with the holes 357 in the elongated members 351 of the fastening pins 350.

Figure 16:
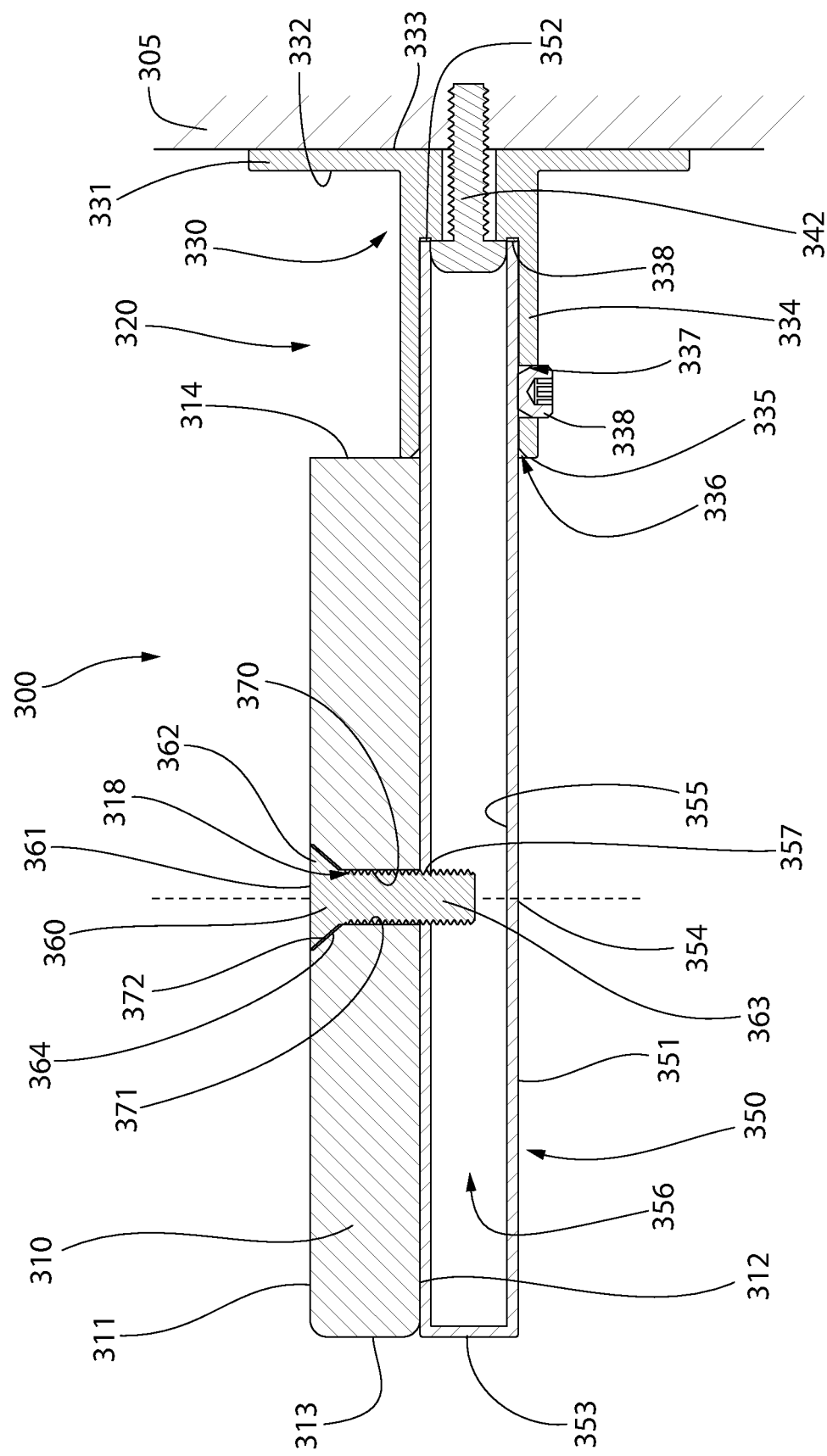
FIG. 16 is a cross-sectional view taken along line XVI-XVI of FIG. 13, illustrating the wall-mountable accessory mounted to a wall.
Figure 17:
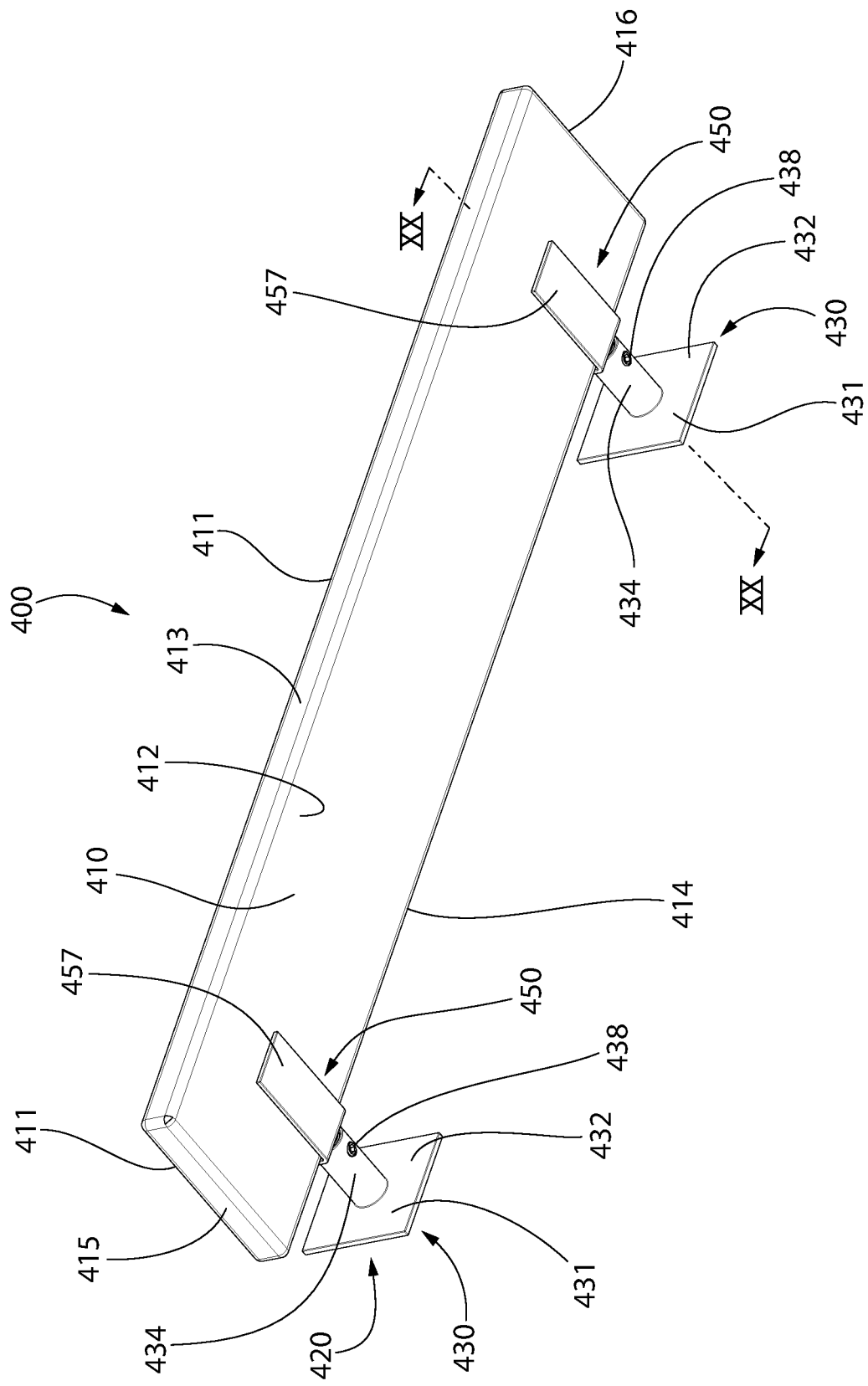
FIG. 17 is a front perspective view of a wall-mountable accessory in accordance with another embodiment of the present invention.
Figure 18:
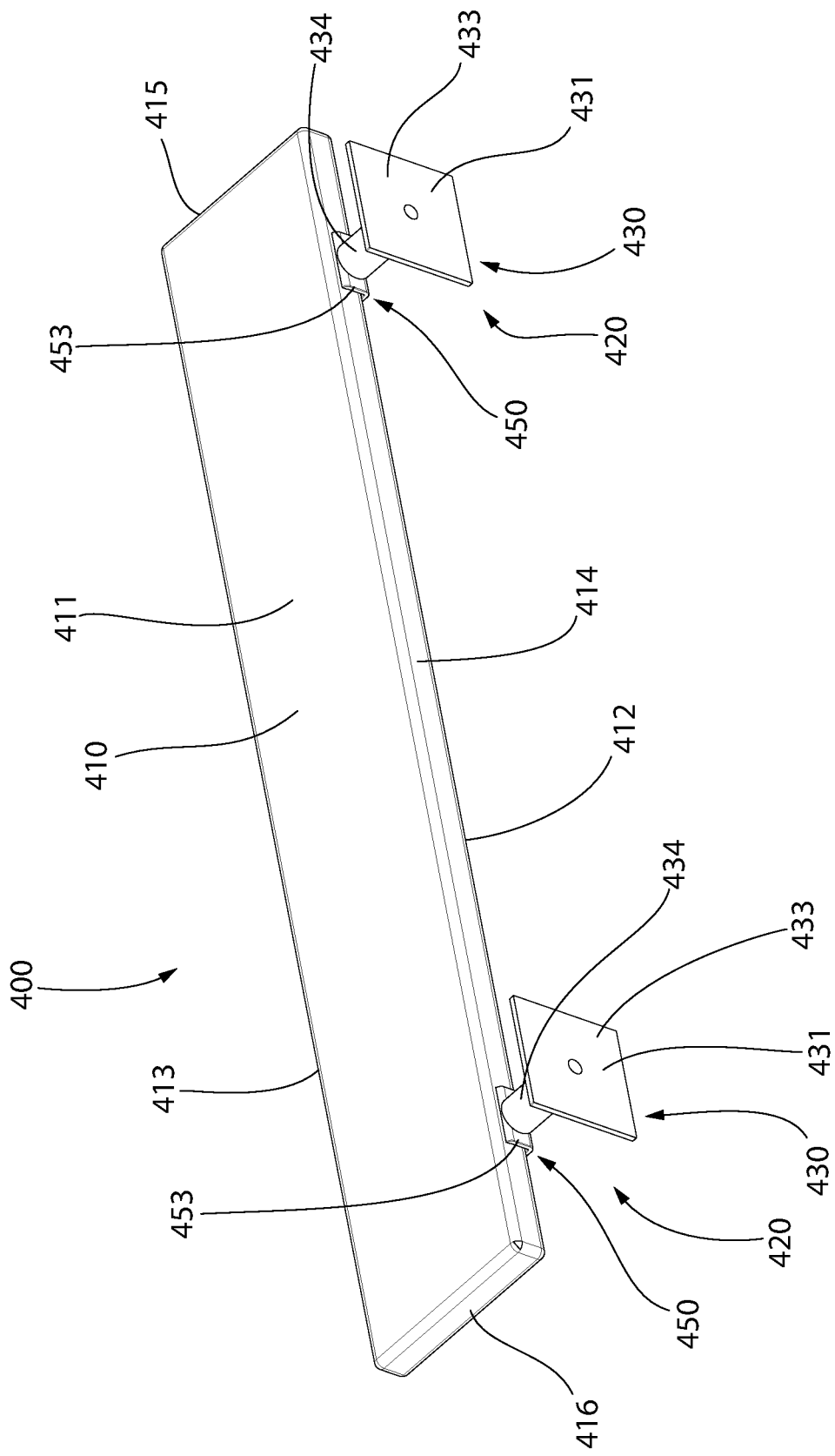
FIG. 18 is a rear perspective view of the wall-mountable accessory of FIG. 17.
Figure 19:
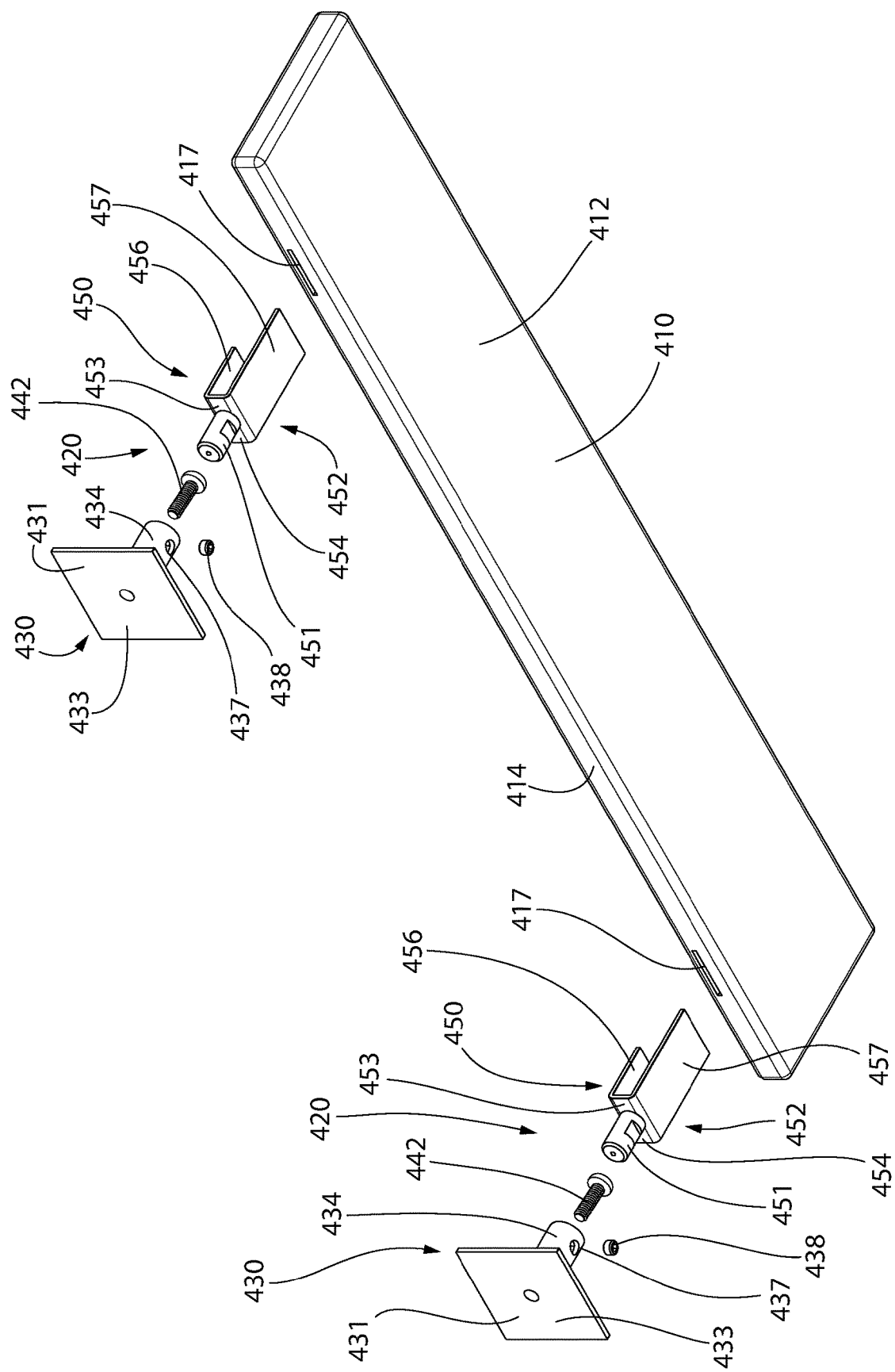
FIG. 19 is an exploded rear perspective view of the wall-mountable accessory of FIG. 17.

Once the solid body 310 is positioned as described above, one of the fasteners 360 is placed into each of the first and second through-holes 317, 318 in the solid body 310. The fasteners 360 are inserted through the first and second through-holes 317, 318 and into the holes 357 in the elongated members 351 of the fastening pin 350. This completes the attachment of the solid body 310 to the fastening pin 350, which is in turn coupled to the mounting bracket 330 that is mounted on the wall 305. As seen in FIG. 16, a top end 361 of the fasteners 361 is flush with the top surface 311 of the solid body 310, which maintains the seamless, planar, flat nature of the top surface 311 of the solid body 310 which can be important since the solid body 310 is intended to function as a ledge or shelf.

In another embodiment, the wall-mountable assembly 300 may be sold with the solid body 310 already coupled to the elongated members 351 of the fastening pin 350. In that regard, the fasteners 360 may be tamper-proof screws so that the attachment between the solid body 310 and the elongated members 351 cannot be undone without a special tool. This will make mounting of the wall-mountable assembly 300 to the wall 305 much easier. In particular, a user will simply have to mount the mounting bracket 330 to the wall 305 and then attach the elongated members 351 to the mounting bracket 330 using the set screws 338 as described above.

It should be noted that the attachment between the fasteners 360 and each of the solid body 310 and the elongated members 351 of the fastening pin 350 causes the fasteners 360 to apply a stable compressive force onto the solid body 310. In the exemplified embodiment, the through-holes 317, 318 extend from the top surface 311 of the solid body 310 to the bottom surface 312 of the solid body 310 along an axis C-C. Furthermore, the through-holes 317, 318 are defend by a sidewall 370 that comprises a first portion 371 that extends in a direction parallel to the axis C-C and a second portion 372 that is non-parallel to the axis C-C. In the exemplified embodiment, the second portion 372 is oriented obliquely relative to the axis C-C. However, in other embodiments the second portion 372 may be oriented perpendicular relative to the axis C-C. In the exemplified embodiment, the first portion 371 extends from the bottom surface 312 to the second portion 372 and the second portion 372 extends from the top surface 311 to the first portion 371.

The fastener 360 comprises a head portion 362 and a threaded portion 363. The head portion 362 comprises a lower surface 364 that faces downwardly in a direction generally away from the top surface 361 of the fastener 360. In the exemplified embodiment, the lower surface 364 is oriented oblique relative to the axial direction of the fastener 360, although the lower surface 364 could be perpendicular to the axial direction of the fastener 360 in other embodiments. When the fastener 360 is inserted into the through-holes 317, 318 and into the holes 357 in the tubular portions 351 of the fastening pin 350, the lower surface 364 of the head portion 362 of the fasteners 360 engage the second portion 372 of the sidewall 370 of the holes 317, 318 in the solid body 310. It is the engagement between the lower surface 364 of the head portion 362 of the fasteners 360 and the second portion 372 of the sidewall 370 where the compression force is applied. The lower surface 364 of the head portion 362 of the fastener 360 should be in continuous contact with the second portion 372 of the sidewall 370 so that the compression force being applied is stable and free of any individual point forces.

When the wall-mountable accessory 300 is mounted to the wall 305, the rear edge 314 of the solid body 310 is spaced from the wall 305 by the standoff 330. Thus, the standoff 330 forms a standoff that maintains the solid body 310 at a distance from the wall 305. Moreover, in the exemplified embodiment the second end 353 of the elongated member 351 of the fastening pin 350 is even or flush with the front edge 313 of the solid body 310. In other embodiments, the second end 353 of the elongated member 351 may be recessed relative to the front edge 313 of the solid body 310 to make the elongated member 351 less visible to a user.

Referring to FIGS. 17-20, another embodiment of a wall-mountable accessory 400 will be described in accordance with an embodiment of the present invention. The wall-mountable accessory 400 generally comprises a solid body 410 and a mounting assembly 420 that is used to mount the solid body 410 to a wall 405. Similar to the previous embodiment, in this embodiment the solid body 410 forms a ledge or shelf that protrudes from the wall 405. The solid body 410 may be formed from a brittle material, such as solid surface, glass, concrete, ceramic, acrylic, and the like as discussed throughout this document.

The solid body 410 comprises a top surface 411, a bottom surface 412, and a peripheral edge which includes a front edge 413, 414, and first and second side edges 415, 416. Of course, the exact configuration of the peripheral edge may be modified from that which is shown in the drawings in alternative embodiments depending on the overall shape of the solid body 410. In this embodiment, the solid body 410 comprises a hole 417 formed into the rear edge 414 of the solid body 410. Specifically, the hole 417 extends from an opening 418 in the rear edge 414 inwardly in a direction towards the front edge 413. However, the hole 417 is not a through-hole and does not extend all the way to the front edge 413. Rather, the hole 417 is a blind hole that terminates at a floor 419 that is located at some distance between the front and rear edges 413, 414. In the exemplified embodiment, the opening 418 in the rear edge 414 of the solid body 410 is elongated in a direction extending between the first and second side edges 415, 416. Moreover, in the exemplified embodiment there are two of the holes 417 formed into the rear edge 414 of the solid body 410. Any number of holes 417 may be used as needed to securely couple the solid body 410 to the mounting assembly 420 for purposes of mounting the solid body 410 to the wall 405.

In the exemplified embodiment, the hole 417 is elongated in a direction moving from the rear edge 414 towards the front edge 415 of the solid body 410. The hole 417 may have a length measured from the rear edge 414 of the solid body 410 to the floor 419 of the hole 417 that is between 20% and 80%, more specifically between 20% and 60%, and still more specifically between 30% and 50% of the length of the solid body 410 measured from the rear edge 414 to the front edge 413.

The mounting assembly 420 comprises a standoff 430 and a fastening pin 450. More specifically, the mounting assembly 420 comprises two of the standoffs 430 and two of the fastening pins 450, one for engaging each of the holes 417 of the solid body 410. The number of standoffs 430 and fastening pins 450 may correspond with the number of holes 417 in the solid body 410.

The standoff 430 is identical to the standoffs 130, 230, 330 described previously, and thus the description of the standoffs 130, 230, 330, provided above are fully applicable to the standoff 430. Briefly, the standoff 430 comprises a plate portion 431 comprising a front surface 432 and a rear surface 433 and a stem portion 434 that protrudes from the front surface 432 to a distal end 435. The stem portion 434 defines or comprises an internal passageway 436. In the exemplified embodiment, the internal passageway 436 extends form the distal end 435 of the stem portion 434 to the rear surface 432 of the plate portion 431 so that a fastener 442 can be inserted into the internal passageway 436 for purposes of coupling the standoff 430 to the wall 405. However, the invention is not to be so limited in all embodiments and the internal passageway 436 may be formed within the stem portion 434 but not also within the plate portion 431 of the standoff 430, as has been described above.

Figure 20:
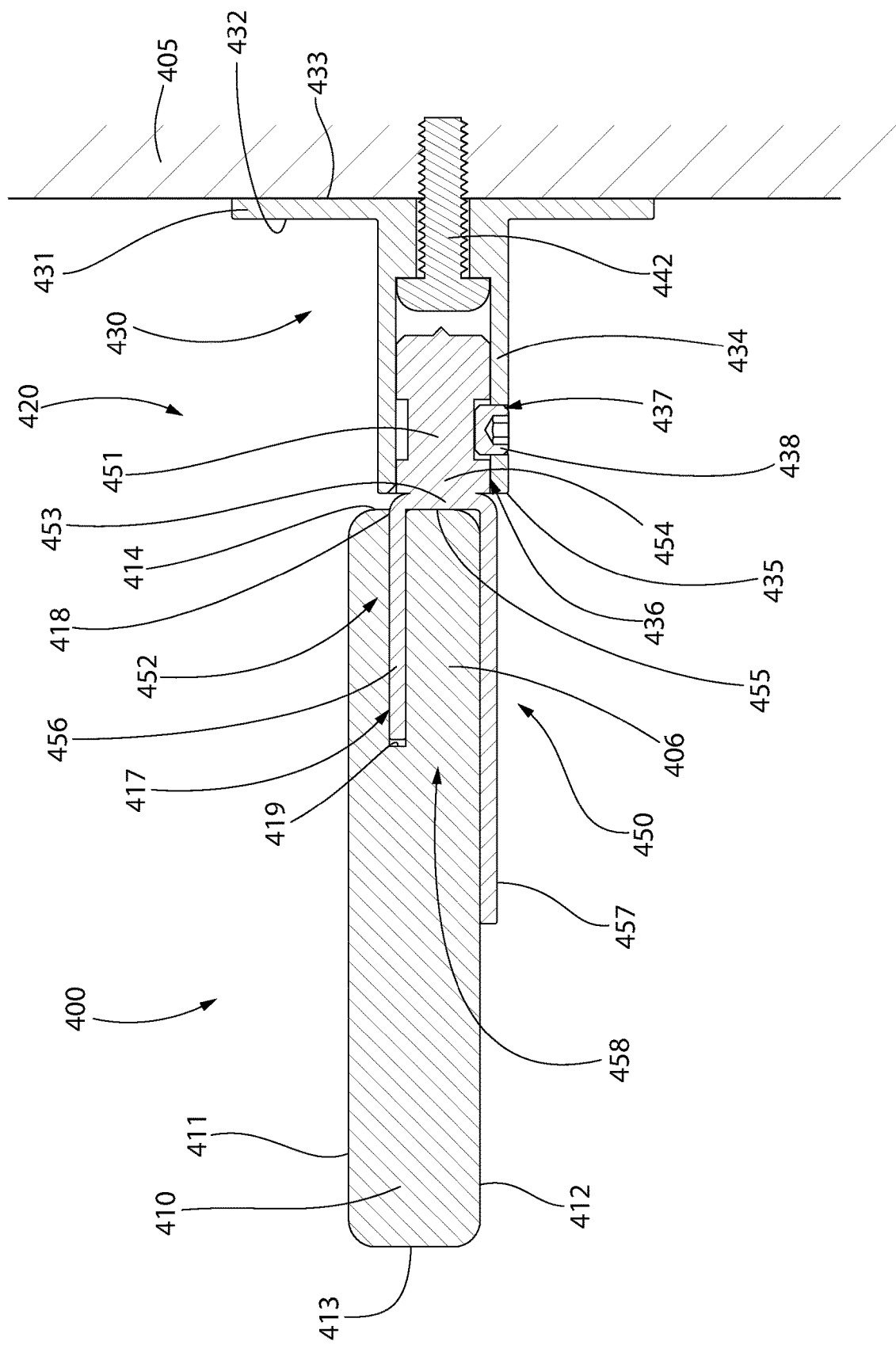
FIG. 20 is a cross-sectional view taken along line XX-XX of FIG. 17, illustrating the wall-mountable accessory mounted to a wall.
Figure 21:
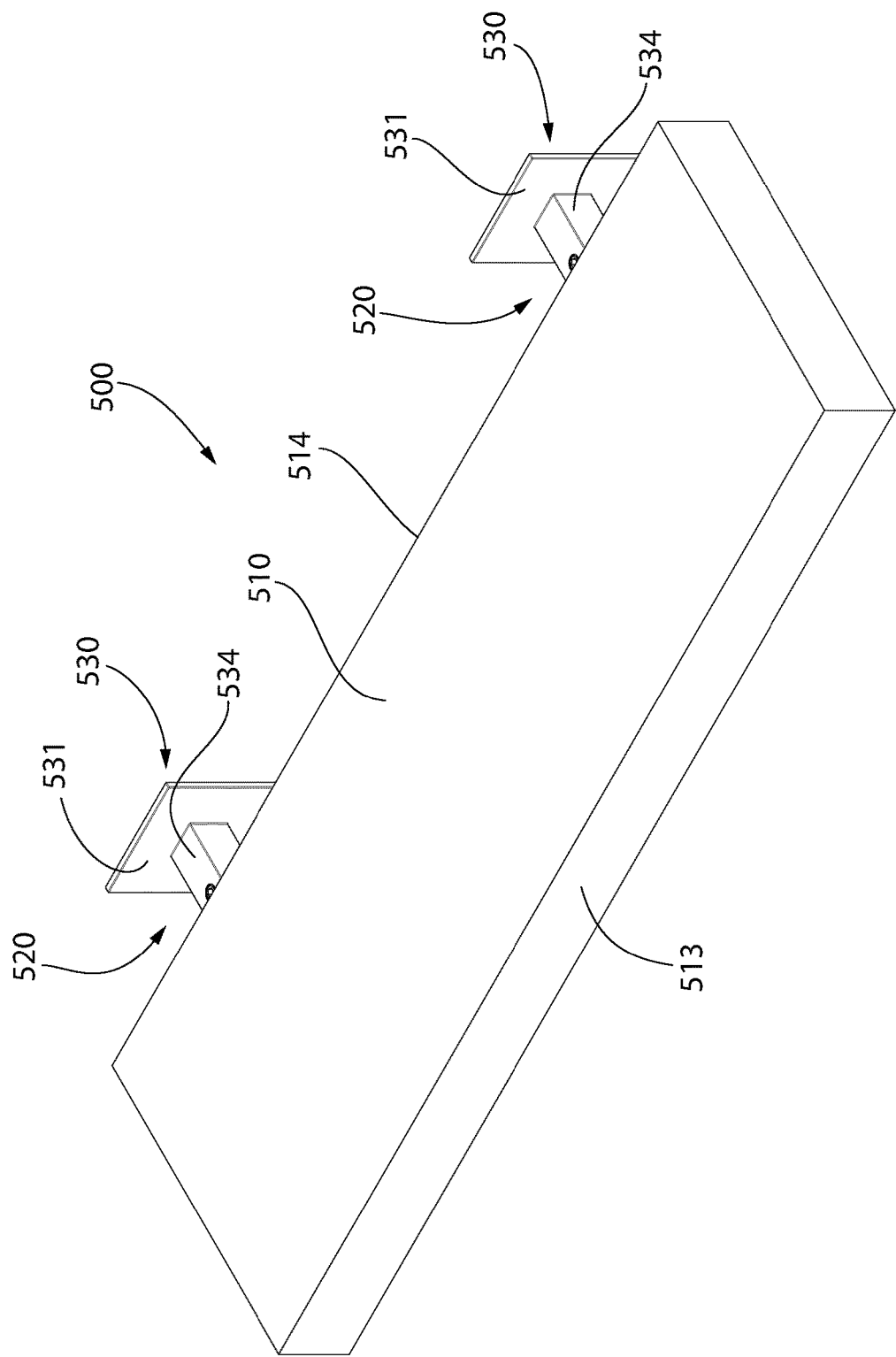
FIG. 21 is a front perspective view of a wall-mountable accessory in accordance with another embodiment of the present invention.
Figure 22:
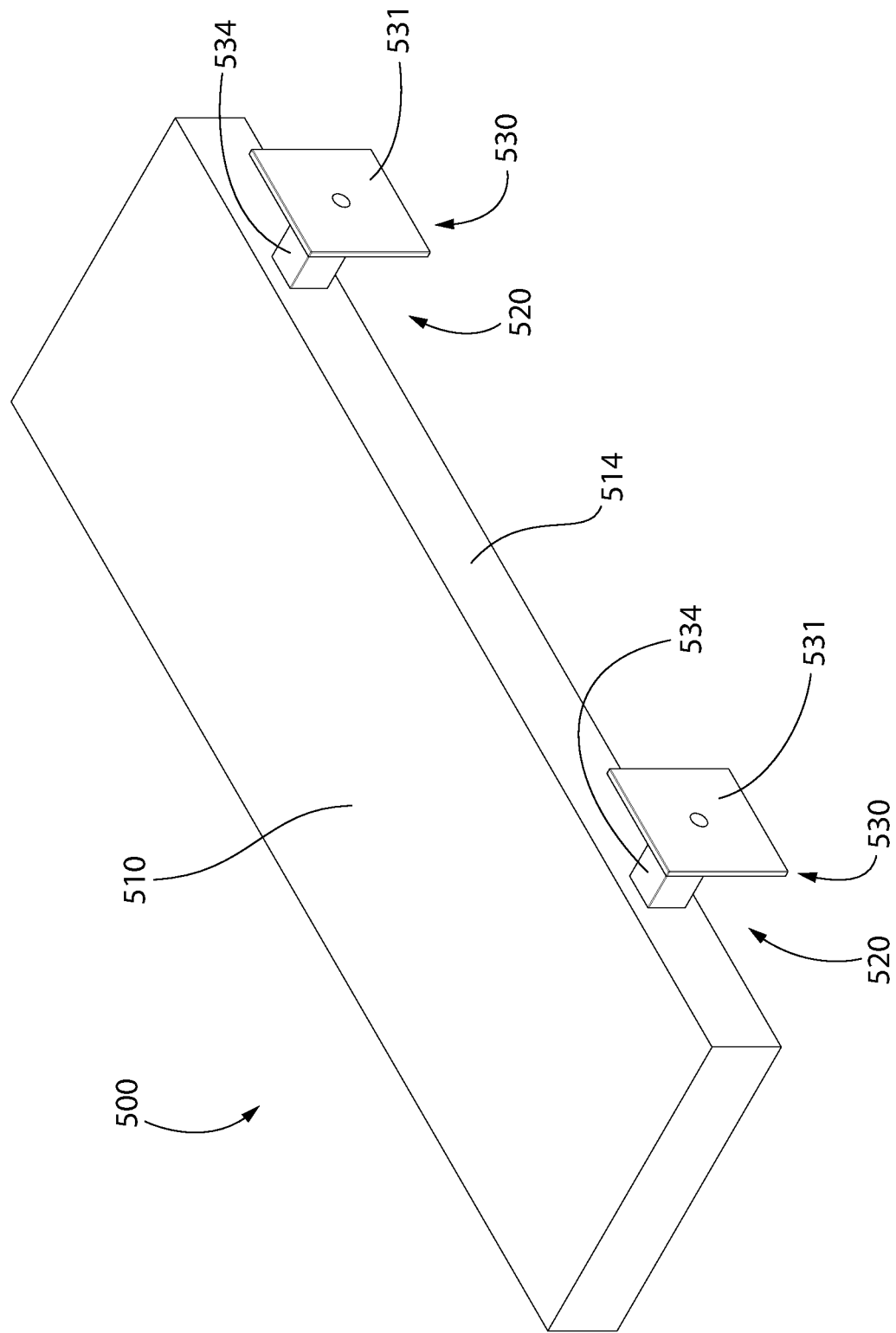
FIG. 22 is a rear perspective view of the wall-mountable accessory of FIG. 21.
Figure 23:
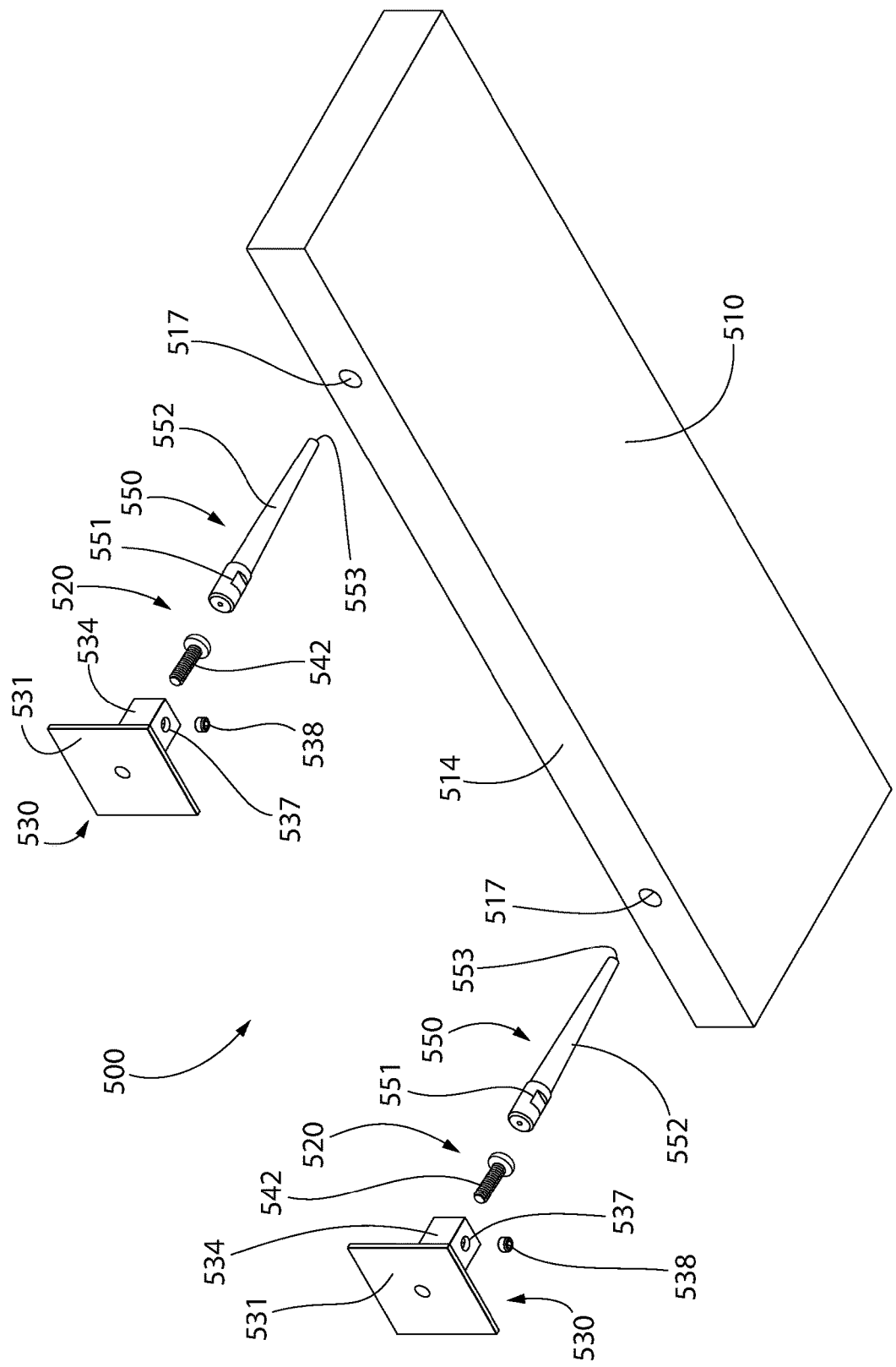
FIG. 23 is an exploded rear perspective view of the wall-mountable accessory of FIG. 21.
Figure 24:
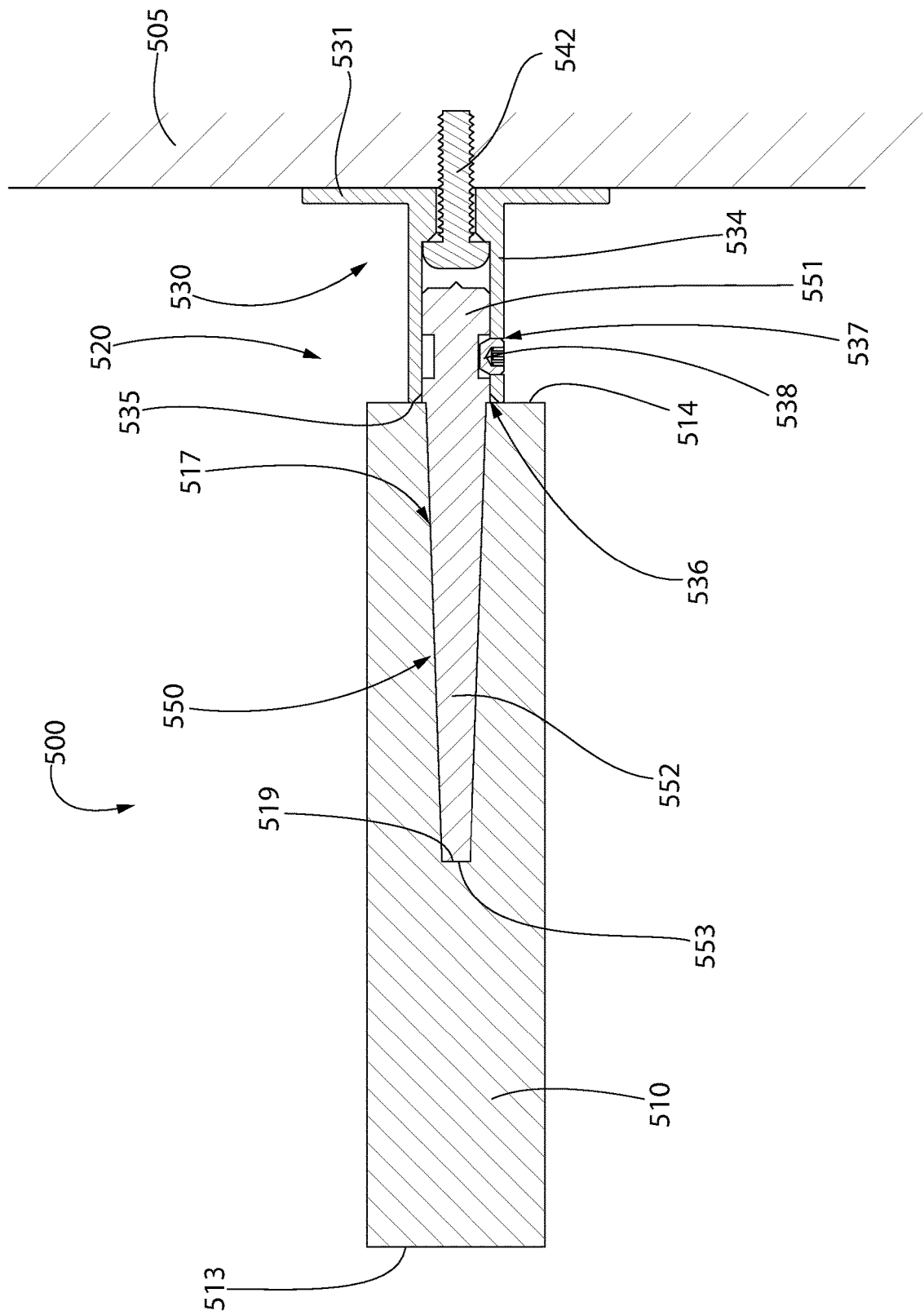
FIG. 24 is a cross-sectional view taken along line XXIV-XXIV of FIG. 21, illustrating the wall-mountable accessory mounted to a wall.

The stem portion 434 comprises a hole 437 that extends from the outer surface of the stem portion 434 into the internal passageway 436. The hole 437 is configured to receive a set screw 438 for coupling the fastening pin 450 to the standoff 430, as shown in FIG. 20.

The fastening pin 450 is quite different structurally from the fastening pins previously described. The fastening pin 450 comprises a first portion 451 that is configured to nest within the internal passageway 436 of the standoff 430 to attach the fastening pin 450 to the standoff 430 and a second portion 452 that is configured to be coupled to the solid body 410. In the exemplified embodiment, the first portion 451 is a cylindrical member with one or more recesses therein for receiving the set screw 438. Of course, the specific shape of the first portion 451 may be modified as needed to ensure that it can fit into the internal passageway 436 of the standoff 430.

The second portion 452 of the fastening pin 450 is U-shaped and comprises a rear wall 453 having a rear surface 454 from which the first portion 451 extends and a front surface 455 opposite the rear surface 454. Furthermore, the second portion 452 of the fastening pin 450 comprises a top leg 456 that extends from the front surface 455 of the rear wall 453 and a bottom leg 457 that extends from the front surface 455 of the rear wall 453. The top and bottom legs 456, 457 are spaced apart from one another so that a receiving channel 458 is defined in the space between the top and bottom legs 456, 457. In the exemplified embodiment, the bottom leg 457 has a greater length than the top leg 456. In other embodiments the top and bottom legs 456, 457 may have the same length, although having the bottom leg 457 longer may provide necessary added support to the solid body 410 in some embodiments.

The second portion 452 of the fastening pin 450 is coupled to the solid body 410. More specifically, the top leg 456 is positioned within the hole 417 in the solid body 410. A lower portion 406 of the solid body 410 that is located between the hole 417 and the bottom surface 412 of the solid body 410 nests within the receiving channel 458 defined in the space between the top and bottom legs 456, 457 of the second portion 452 of the fastening pin 450. In some embodiments, an adhesive or other fillers may be placed on the top leg 456 of the second portion 452 of the fastening pin 450 and/or within the hole 417 in the solid body 410 to strengthen the attachment between the fastening pin 450 and the solid body 410.

When the second portion 452 of the fastening pin 450 is attached to the solid body 410 as described above and best shown in FIG. 20, a stable compression force is applied by the second portion 452 of the fastening pin 450 onto the lower portion 406 of the solid body 410. This may be achieved by having a height of the receiving channel 458 be less than a thickness of the lower portion 406 of the solid body 410, which will result in the top and bottom legs 456, 457 being slightly pulled apart from one another when the lower portion 406 of the solid body 410 is located within the receiving channel 458. The top and bottom legs 456, 457 may then apply the stable compression force onto the lower portion 406 of the solid body 410 as the top and bottom legs 456, 457 work to attain their natural state/position. Stated another way, the lower portion 406 of the solid body 410 is held in an equal pressure scenario to provide the solid body 410 with maximum structural stability.

As with the embodiments described previously, the solid body 410 may be coupled to the fastening pin 450 by the manufacturer. That is, the wall-mountable accessory 400 may be sold to consumers with the solid body 410 already coupled to the fastening pin 450. This makes for an easy plug-and-play situation whereby assembly simply requires coupling the mounting bracket 430 to the wall 405 and then securing the fastening pin 450 to the mounting bracket 430 using the set screw 438 as described above.

FIGS. 21-24 illustrate yet another wall-mountable accessory 500. The wall-mountable accessory 500 is similar to the wall-mountable accessory 400 with a few modifications. The wall-mountable accessory 500 comprises a solid body 510 in the form of a shelf or ledge and a mounting assembly 520 for coupling the solid body 510 to a wall 505. The solid body 510 has a rear edge 513 with a hole 517, much like the solid body 410. Moreover, the hole 517 is a blind hole that does not extend all the way to a front edge 512 of the solid body 510, but instead terminates in a floor 519. In this embodiment, the hole 517 is tapered as it extends from the rear edge 513 towards the front edge 512 of the solid body 510. That is, a diameter of the hole 517 decreases as it extends further from the rear edge 513 of the solid body 510.

In this embodiment, the mounting assembly 520 comprises a standoff 530 which is identical to the standoff 430 and a fastening pin 550. The standoff 530 comprises a plate portion 531 and a stem portion 534 that extends from the plate portion 531 to a distal end 535. The stem portion 534 defines an internal passageway 536, and all of these features are the same as the features of the standoff 430 described previously. The standoff 530 may be coupled to the wall 505 using a fastener 542.

The fastening pin 550 comprises a first portion 551 and a second portion 552. The first portion 551 of the fastening pin 550 is identical to the first portion 451 of the fastening pin 450 described above. The first portion 551 of the fastening pin 550 is configured to nest within the internal passageway 536 of the standoff 530 for purposes of coupling the fastening pin 550 to the standoff 530. As shown, a set screw 538 is inserted into an opening 537 in the stem portion 534 of the standoff 530 and engages the first portion 551 of the fastening pin 550 to couple the standoff 530 and the fastening pin 550 together.

The second portion 552 of the fastening pin 550 differs from the second portion 452 of the fastening pin 550 described above. The reason for this is that the second portion 552 of the fastening pin 550 is the part that engages with the solid body 510, and the hole 517 in the solid body 510 is of a different configuration than the hole 417 in the solid body 410 described above. Therefore, the second portion 552 of the fastening pin 550 must also be modified to match the hole 517 in the solid body 510. In that regard, the second portion 552 of the fastening pin 550 protrudes from the first portion 551 of the fastening pin 550 and terminates in a distal end 553. Moreover, the second portion 552 of the fastening pin 550 is tapered as it extends from the first portion 551 of the fastening pin 550 towards the distal end 553. Thus, both the second portion 552 of the fastening pin 550 and the hole 517 in the solid body 510 are tapered, so that the second portion 552 of the fastening pin 550 is configured to nest within the hole 517 to couple the solid body 510 to the fastening pin 550.

There are several ways that the second portion 552 of the fastening pin 550 may be fit to the hole 517 to securely couple the solid body 510 to the fastening pin 550. In one embodiment, the second portion 552 of the fastening pin 550 may be slightly smaller in diameter (e.g., several thousands of an inch) than the hole 517 so that the second portion 552 of the fastening pin 500 can fit within the hole 517. In such an embodiment, adhesives or fillers would be located in the hole 517 or coated onto the second portion 552 of the fastening pin 550 so that when the adhesives and/or fillers harden, the combination of the second portion 552 and the adhesives/fillers has a virtually identical size/diameter as the hole 517. As a result, the second portion 552 plus adhesives/fillers will apply a stable compressive force internally onto the walls of the solid body 510 which surround the hole 517. It may also be able to achieve this without adhesives or fillers with a simple tight fit, friction fit, or interference fit, by appropriately sizing the second portion 552 of the fastening pin 550 relative to the hole 517, although there may be some difficulty in achieving this perfect fit in real world manufacturing scenarios.

In another embodiment, the second portion 552 of the fastening pin 550 may be formed as a micro threaded screw. In such an embodiment, the outer diameter of the micro threaded screw where the screw threads terminate may be greater than the diameter of the hole 517. With a micro threaded screw, the screw threads are flat, cover more than 50% of the surface of the fastener, and the threads are only raised a few thousandths of an inch off the valley. Thus, as the second portion 552 is inserted into the hole 517, the second portion 552 will be able to progressively go deeper into the hole 517 while wedging itself into the hole. The fastening pin 550 may be screwed into the hole 517 in a more traditional sense in this embodiment by rotating the fastening pin 550 to move the distal end 553 of the second portion 552 deeper into the hole 517. The valley of the micro threaded screw (i.e., the portions of the micro threaded screw between the threads) has a smaller diameter than the hole 517, which provides a relief when the micro threaded screw (i.e., the second portion 552) is being inserted into the hole 517. Because the outer diameter of the threads of the micro threaded screw may be larger than the diameter of the hole 517, the threads engage the sidewall of the solid body 510 which surrounds/defines the hole 517, thereby achieving a secure coupling between the second portion 552 of the fastening pin 550 and the solid body 510.

Moreover, it should be appreciated that in an embodiment whereby the second portion 552 forms a micro threaded screw, the second portion 552 may not be tapered, but rather may have a consistent diameter throughout most, if not all, of its length. Thus, in some embodiments the hole 517 may also not be tapered but may instead have a constant diameter. The threads of the micro threaded screw would in such embodiment engage the sidewall of the hole 517 as described above. Threading in the micro threaded screw will create an equal internal pressure against the sidewall of the solid body 510 which surrounds the hole 517.

In this embodiment, the rear edge 514 of the solid body 510 abuts against the distal edge 536 of the stem portion 534 of the standoff 530 when the wall-mountable accessory 500 is mounted to the wall 505. However, the invention is not to be so limited in all embodiments and it may be possible for the rear edge 514 of the solid body 510 to be spaced from the distal edge 536 of the stem portion 534 of the standoff 530. Moreover, as with the other embodiments illustrated and described herein, the rear edge 514 of the solid body 510 is spaced apart from the wall 505 because the standoff 530 functions as a standoff. As with the previous embodiments, the fastening pin 550 may be coupled to the solid body 510 by the manufacturer before sale to consumers so that assembly at the installation site simply requires mounting the standoff 530 to the wall 505 and then attaching the fastening pin 550 to the standoff 530.

Referring to FIGS. 25-28, an additional embodiment of a wall-mountable accessory 600 is illustrated and will be briefly described. The wall-mountable accessory 600 includes mounting components that are similar to those described above with reference to the wall-mountable accessory 100. In particular, the wall-mountable accessory 600 includes a solid body 610 that is in effect sandwiched between two components of a mounting assembly 620. However, in this embodiment the wall-mountable accessory 600 is specifically designed as a toilet paper holder. As such, the solid body 610 is configured to rotate/pivot while remaining mounted on a wall 605, which requires some modification as described further below. As with the other embodiments described herein, the solid body 610 is formed from a brittle material, such as a solid surface material or one of the other materials noted herein. The solid body 610 may therefore have any of a number of different ornamental appearances on its outer surfaces to match a desired décor.

The solid body 610 is elongated from a first end 601 to a second end 602 and comprises a front surface 611, a rear surface 612, and a peripheral edge 613 that extends between the front and rear surfaces 611, 612. The solid body 610 is somewhat flat in the exemplified embodiment, but may take on more of a round profile, or one with a square, rectangular, or other polygonal profile. The solid body 610 should have a thickness or width or diameter which is less than a diameter of a toilet paper tube so that the toilet paper roll may be supported on the solid body 610. The solid body 610 comprises a first hole 614 and a second hole 615, each of which extends through the solid body 610 from the front surface 611 to the rear surface 612.

In the exemplified embodiment, the first hole 614 is a through-hole that is spaced inwardly of the peripheral edge 613 at a location that is adjacent to the first end 601 of the solid body 610. The second hole 615 is a through-hole that is located adjacent to the second end 602 of the solid body 610. However, the second hole 615 is not entirely spaced inwardly from the peripheral edge 613 of the solid body 610. Rather, the second hole 615 extends to the peripheral edge 613 so that the second hole 615 forms an opening in the peripheral edge 613 along a lower end of the solid body 610. This allows the solid body 610 to pivot about an axis that is coincident with an axis of the first hole 614, as discussed in greater detail below.

The mounting assembly 620 is identical to the mounting assembly 120 previously described. Thus, while the mounting assembly 620 will be described briefly here, it is noted that additional details of the mounting assembly 620 are provided above with the description of the mounting assembly 120, and that description and discussion is entirely applicable to the mounting assembly 120.

In particular, the mounting assembly 620 comprises a standoff 630 and a fastening pin 650. The standoff 630 comprises a plate portion 631 and a stem portion 634 that protrudes from the plate portion 631 to a distal end 635. The standoff 630 comprises an internal passageway 636 that extends from the distal end 635 of the stem portion 634 to a rear surface of the plate portion 631. In other embodiments, the internal passageway 636 may be confined only within the stem portion 634 and may not extend to the rear surface of the standoff 630. However, in the exemplified embodiment the internal passageway 636 is configured to receive a fastener (such as a screw) 642 for coupling the standoff 630 to the wall 605. The stem portion 634 also has an opening 637 adjacent to the distal end 635 for receiving a set screw 638 that facilitates the coupling of the standoff 630 to the fastening pin 650.

The fastening pin 650 comprises a tubular portion 651 that extends from a first end 652 to a second end 653 and a flange portion 654 located at the second end 653. The flange portion 654 sticks out/protrudes radially beyond the outer surface of the tubular portion 651 at the second end 653 thereof. During assembly, the tubular portion 651 of the fastening pin 650 is inserted through the hole 614 in the solid body 610 and into the internal passageway 636 of the standoff 630. The set screw 638 is then tightened to couple the fastening pin 650 to the standoff 630. Additionally, a second tubular portion 651 of a second fastening pin 650 is inserted through the hole 615 in the solid body 610 and into an internal passageway 636 of another one of the standoffs 630 (and a set screw is used to couple these as well). When so assembled, the solid body 610 is sandwiched between the flange portion 654 of the fastening pin 650 and the distal end 635 of the stem portion 634 of the standoff 630. As noted above, the flange portion 654 and the distal end 635 may apply a stable compressive force onto the solid body 610 to provide structural strength and integrity to the brittle material which forms the solid body 610 or a portion thereof. This compressive force is similar to that which has been described previously in this document.

Figure 25:
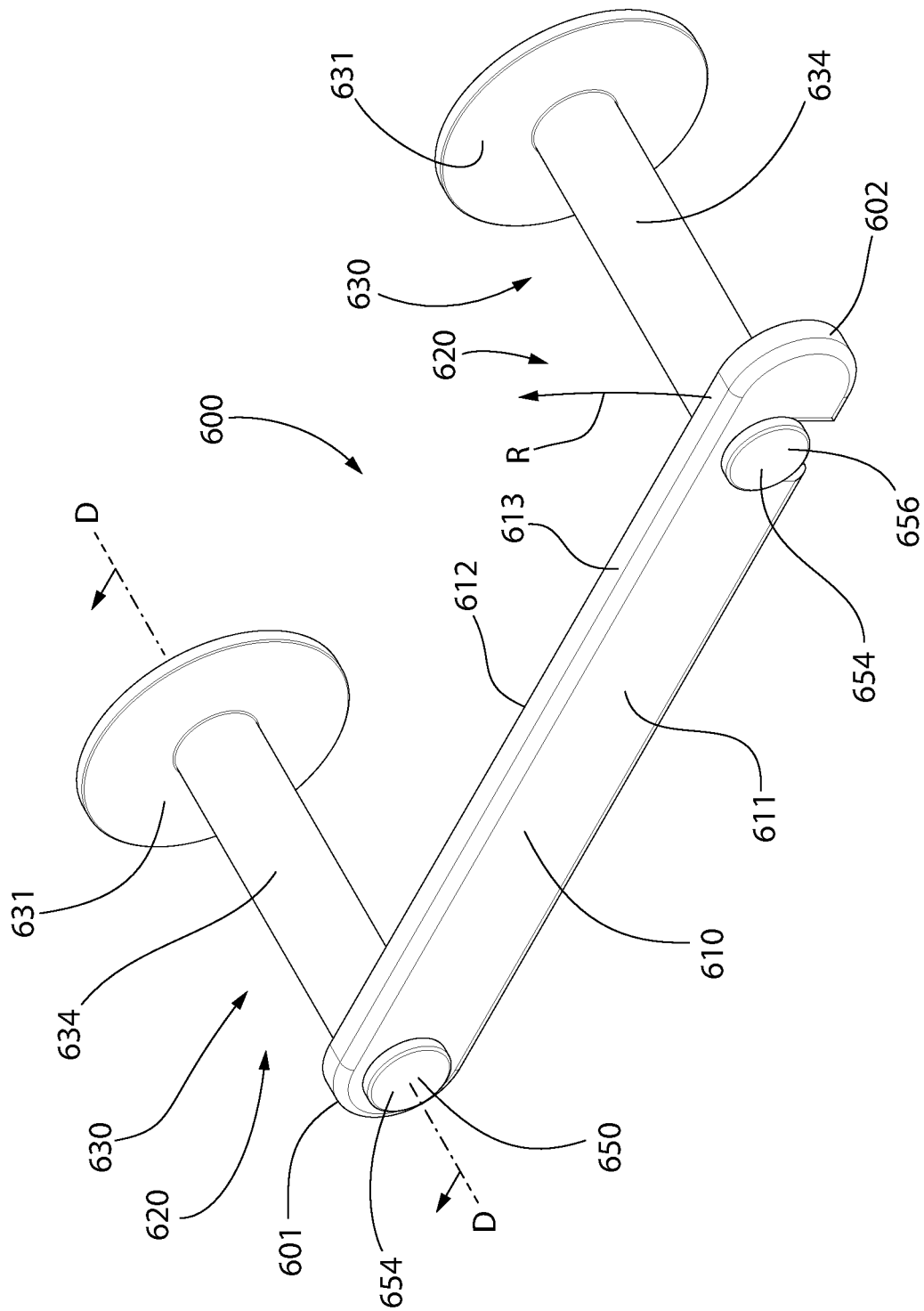
FIG. 25 is a front perspective view of a wall-mountable accessory in accordance with another embodiment of the present invention.
Figure 26:
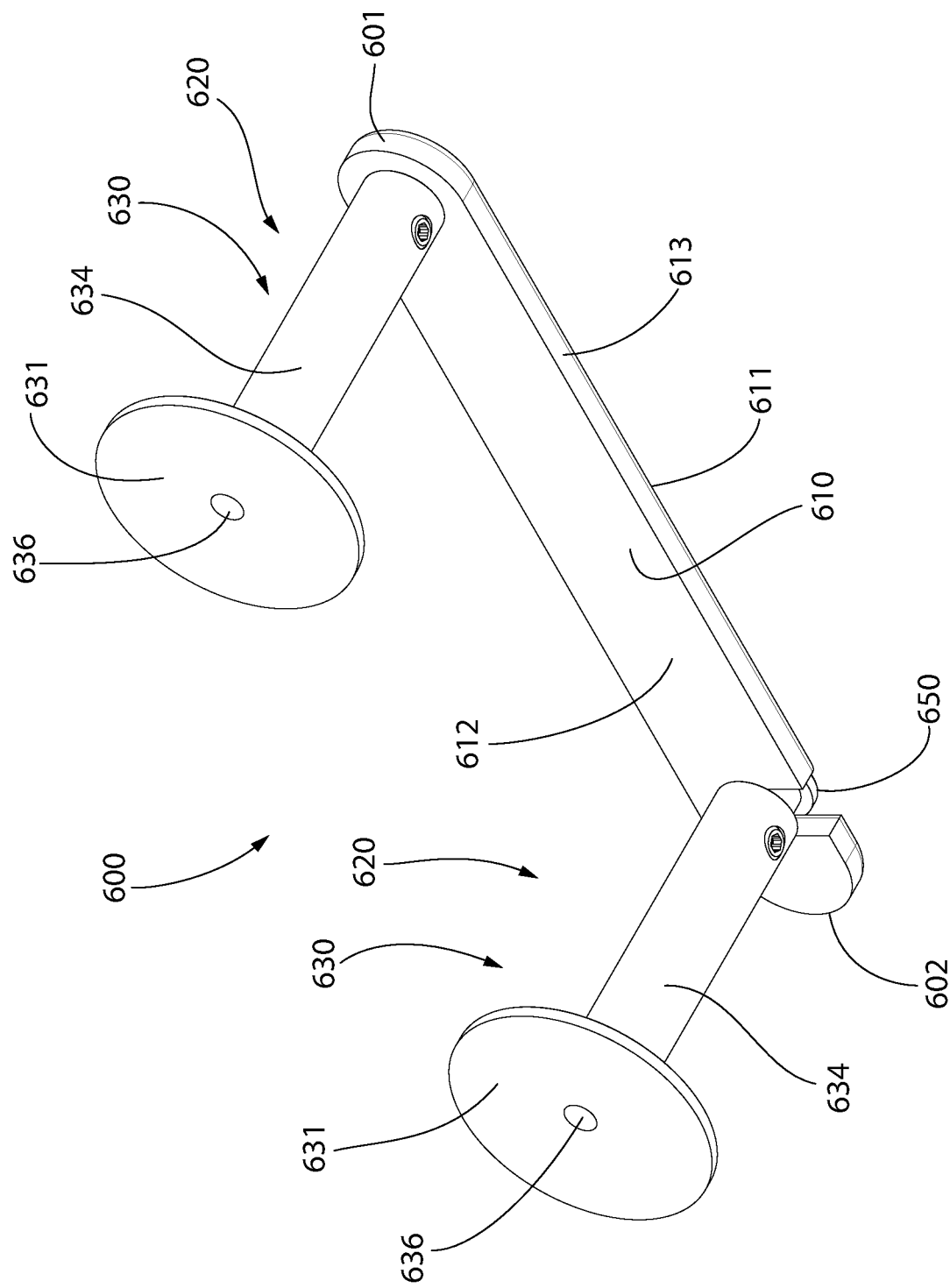
FIG. 26 is a rear perspective view of the wall-mountable accessory of FIG. 25.
Figure 27:
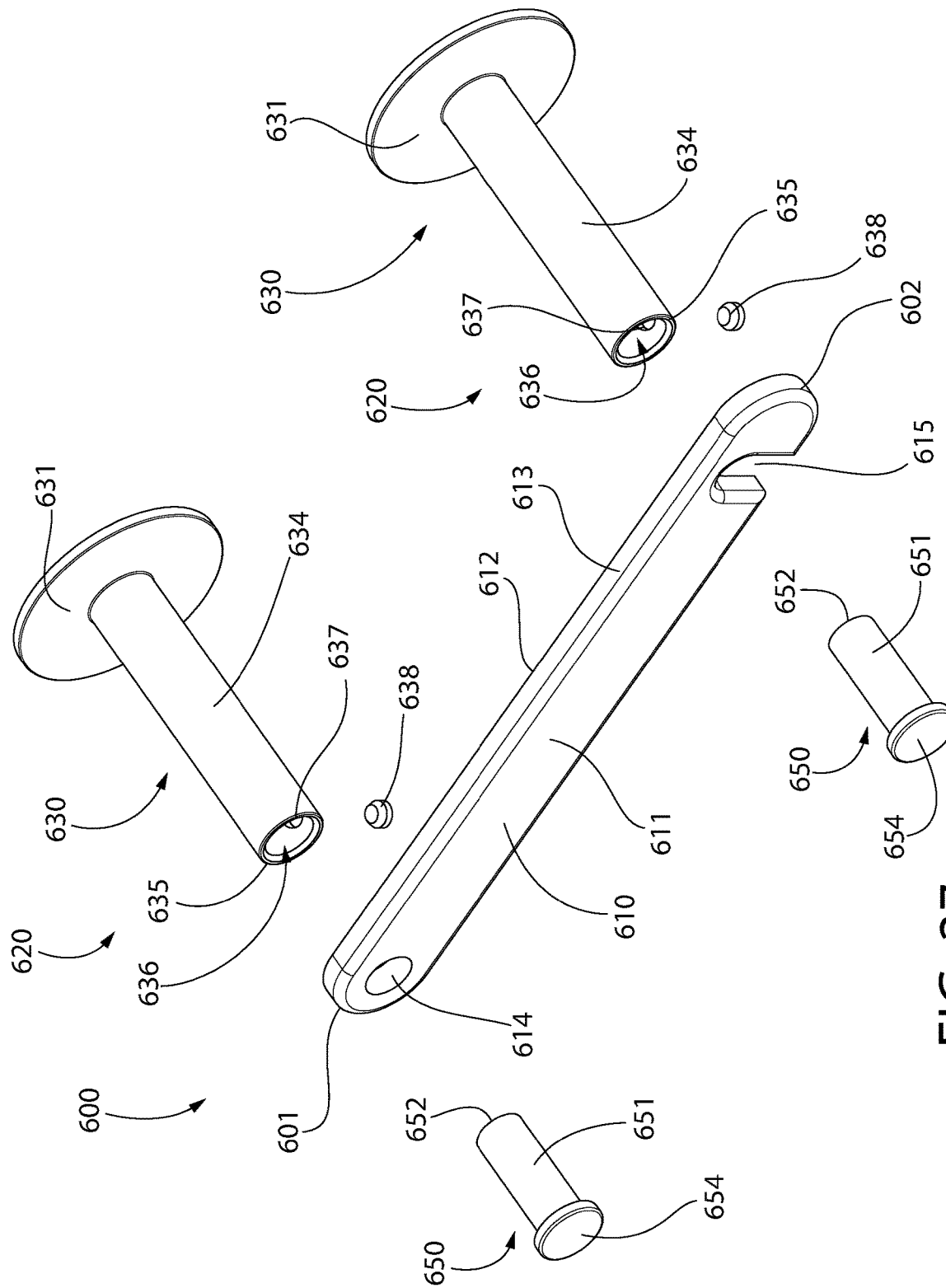
FIG. 27 is an exploded front perspective view of the wall-mountable accessory of FIG. 25.
Figure 28:
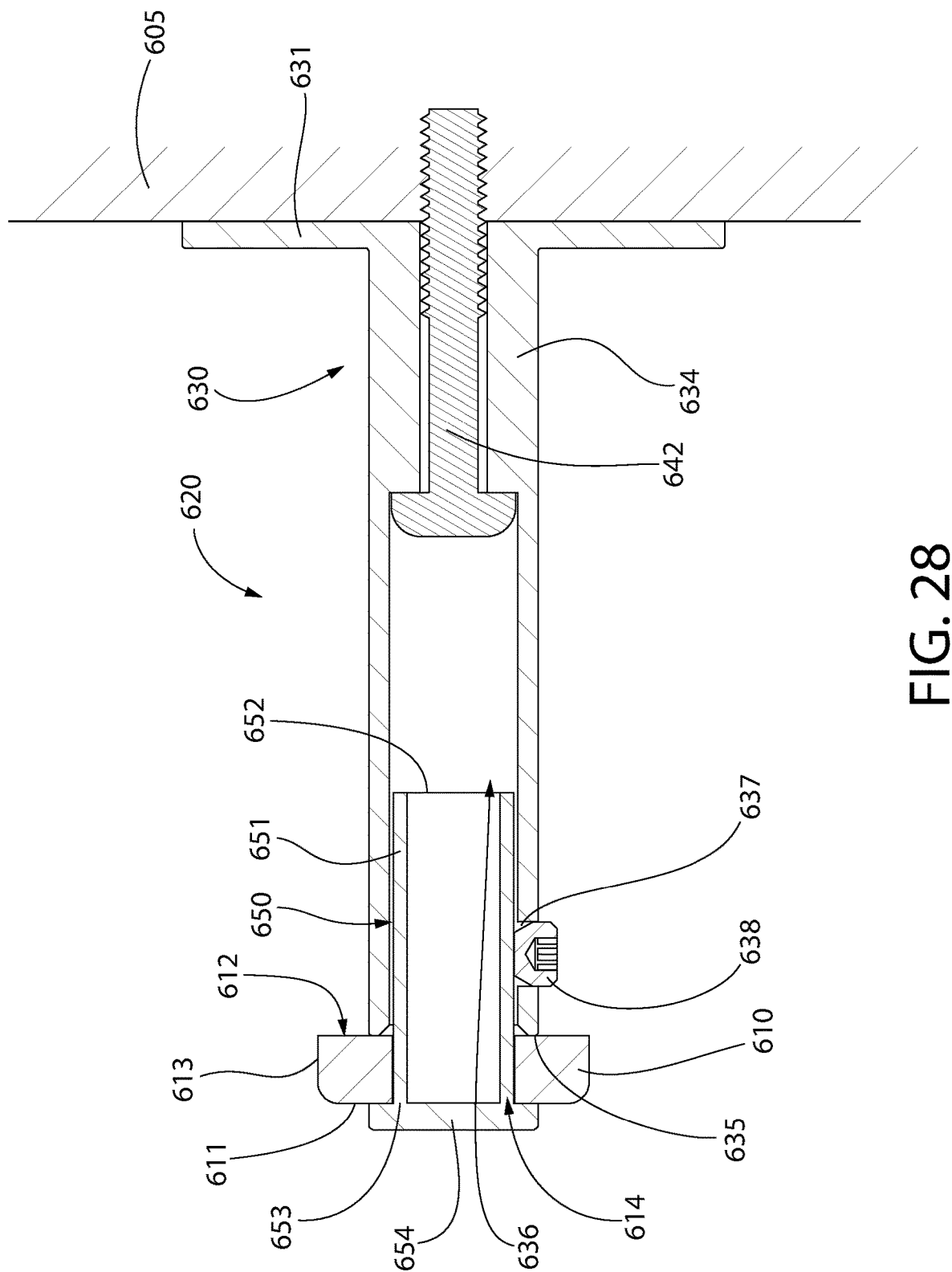
FIG. 28 is a cross-sectional view taken along line XXVIII-XXVIII of FIG. 25, illustrating the wall-mountable accessory mounted to a wall.

Moreover, as noted above, the main difference between the wall-mountable accessory 600 as compared to the wall-mountable accessory 200, for example, is that the wall-mountable accessory 600 is configured to allow for pivoting/rotating of the solid body 610 about a pivot axis D-D (see FIG. 25). This is possible due to the fact that the hole 615 extends to an opening in the bottom of the peripheral edge 613 of the solid body 610. In particular, as seen in FIG. 25, the solid body 610 is configured to pivot about the pivot axis D-D by lifting the second end 602 of the solid body 610 upward in the direction of the arrow R so that the portion of the fastening pin 650 that is located within the hole 615 passes through the opening in the bottom of the peripheral edge 613 of the solid body 610. Thus, a user can pivot the solid body 610 in order to remove an empty toilet paper tube and replace it with a new roll of toilet paper. Once the new roll of toilet paper is positioned around the solid body 610, the solid body 610 can be pivoted in the opposite direction to reinsert the portion of the fastening pin 650 within the hole 615 in the solid body 610.

Figure 29:
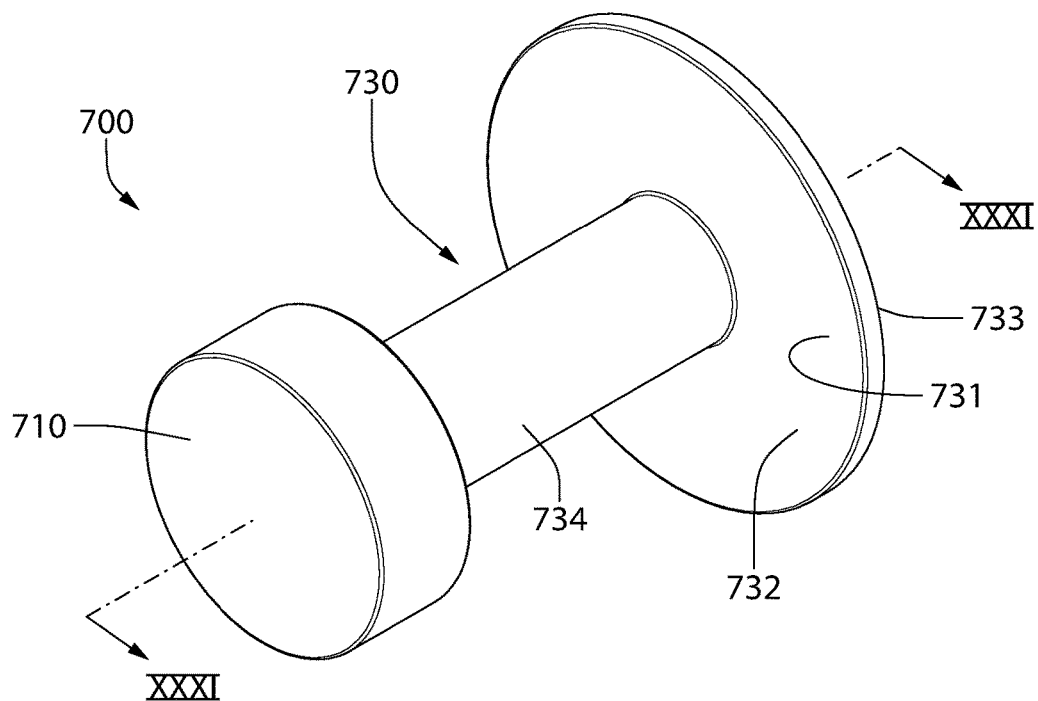
FIG. 29 is a front perspective view of a wall-mountable accessory in accordance with another embodiment of the present invention.
Figure 30:
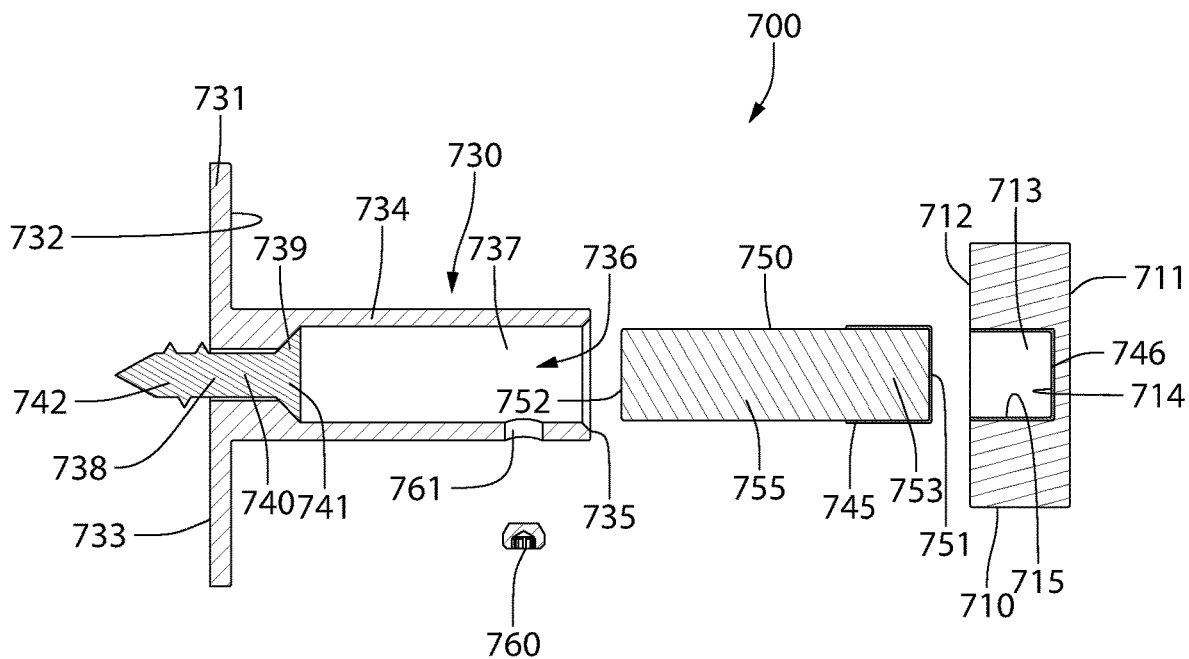
FIG. 30 is a side exploded view of the wall-mountable accessory of FIG. 29.
Figure 31:
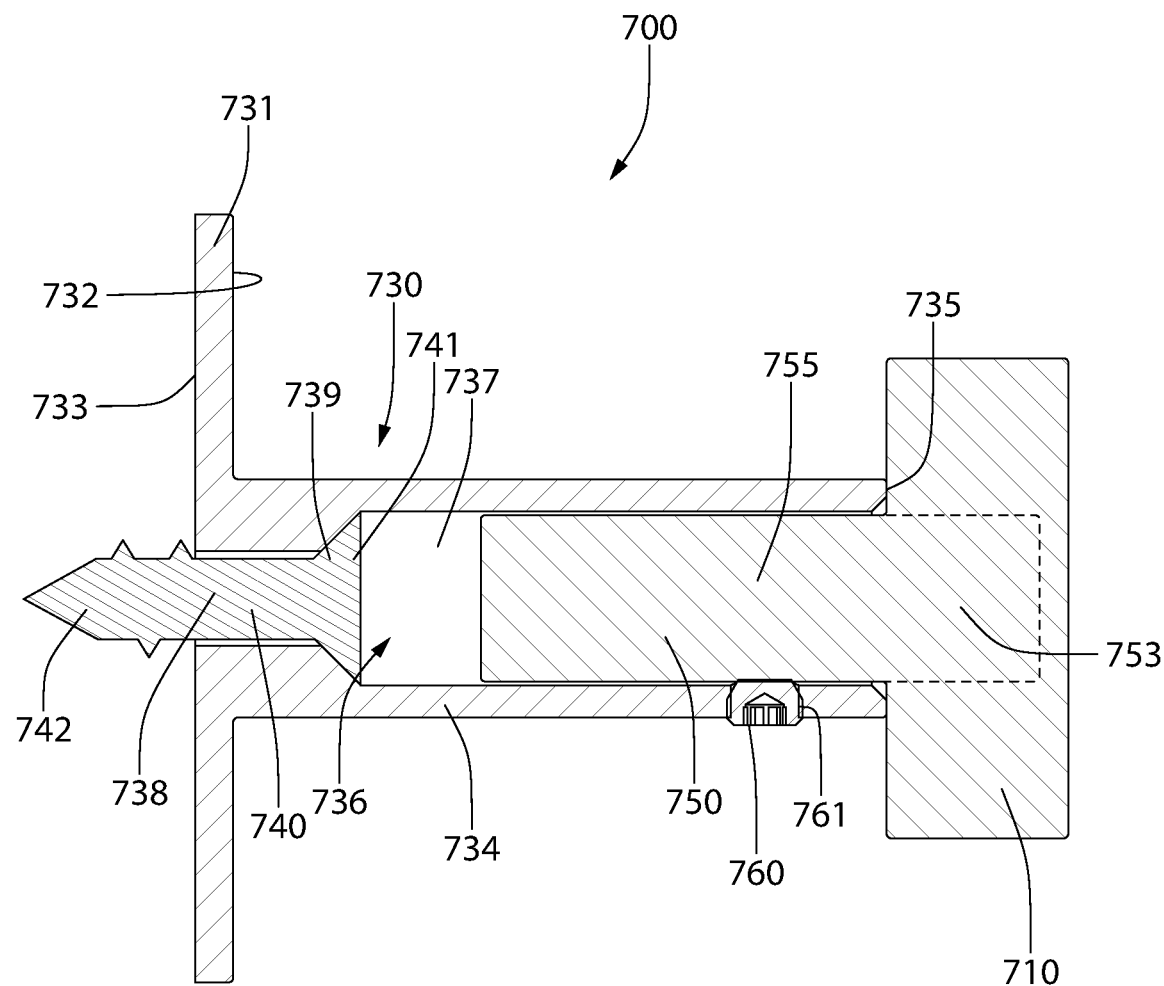
FIG. 31 is a cross-sectional view taken along line XXXI-XXXI of FIG. 29.

Referring to FIGS. 29-31, a wall-mountable accessory 700 will be described in accordance with another embodiment of the present invention. The wall-mountable accessory 700 generally comprises a solid body 710, a standoff 730, and a rod member 750. The solid body 710 and the rod member 750 may be formed from a brittle material, such as a solid surface material or any other material which may be deemed a brittle material, including the materials described herein above. The solid body 710 and the rod member 750 are separate components which are coupled together as described herein.

The standoff 730 comprises a plate portion 731 having a front surface 732 and a rear surface 733 and a stem portion 734 protruding from the front surface 732 of the plate portion 731 to a distal end 735. The standoff 730 may be formed entirely of a non-brittle material such as metal. In other embodiments, the plate portion 731 of the standoff 730 may be formed from a brittle material such as solid surface material and the stem portion 734 may be a separate component from the plate portion 731 which is formed from metal or plastic or the like. The standoff 730 comprises an internal passageway 736 that extends from an opening in the distal end 735 of the stem portion 734 to an opening in the rear surface 733 of the plate portion 731.

As with the previously described embodiments, the internal passageway 736 comprises a first axial section 737 located adjacent to the distal end 735 of the stem portion 734, a second axial section 738 located adjacent to the rear surface 733 of the plate portion 731, and a transition section 739 located between the first and second axial sections 737, 738. The first axial section 737 has a greater diameter than the second axial section 738. The transition section 739 has a diameter which decrease moving from the first axial section 737 to the second axial section 738. Thus, a fastener 740 can be inserted into the internal passageway 736 such that a head portion 741 of the fastener nest within the transition section 739 and a shank portion 742 of the fastener extends into the second axial section 738 and protrudes form the rear surface 733 of the plate portion 731. The shank portion 742 can then be embedded within a wall to mount the standoff 730 to the wall.

The rod portion 750 extends from a first end 751 to a second end 752 along a longitudinal axis. The rod portion 750 has a constant diameter in the exemplified embodiment, but could have variations in its diameter in other embodiments. For example, the ends of the rod portion 750 could have smaller diameter connection portions than the remainder of the rod portion 750. As noted above, the rod portion 750 is formed from a brittle material such as a solid surface material.

The solid body 710 has a front surface 711 and a rear surface 712 opposite the front surface 711. The solid body 710 is round in the exemplified embodiment with the front and rear surfaces 711, 712 being flat and planar and parallel to one another. However, the solid body 710 could take on other shapes, including being triangular, square, or any other polygon, regular, or irregular shape as may be desired, including having wavy or undulating surfaces or the like. The solid body 710 has a blind hole 713 formed into the rear surface 712. The blind hole 713 extends from an opening in the rear surface 712 to a floor 714.

To assemble the wall-mountable accessory 700, the standoff 730 is first mounted to the wall using the fastener 740 as has been described herein. Separately, the rod member 750 must be coupled to the solid body 710 so that the rod member 750 and the solid body 710 can form a unitary construction. As discussed herein, the rod member 750 and the solid body 710 are both formed from a brittle material, which may in certain specific embodiments be solid surface. As can be seen, an end portion 753 of the rod member 750 which includes the first end 751 may be inserted into the blind hole 713 of the solid body 710. However, this alone will not form the necessary attachment between the rod member 750 and the solid body 710. Rather, an adhesive is needed to achieve the desired bond between the components.

In some embodiments, a sidewall 715 and floor 714 of the blind hole 713 may be milled prior to attachment of the solid body 710 to the rod member 750. Furthermore, in some embodiments the outer surface of the rod member 750 along the end portion 753 may be milled. It has been found that milling the interfacing surfaces of the components prior to coating them with a reactive adhesive (e.g., two-part epoxy) enhances and improves the bond between the two components once the reactive adhesive cures. Without intending to be bound by theory, it is believed that milling the brittle material components increases the density of the material at the surface where the adhesive is being applied so that the density at the outer surface of the material is greater than the density in the interior. This increased density allows the materials to better bond to the reactive adhesive to create a very strong bond between the components being coupled together.

Next, a reactive adhesive may be coated onto any one or all of the sidewall 715 of the blind hole 713, the floor 714 of the blind hole 713, and the outer surface of the rod member 750 along the end portion 753 of the rod member 750 which nests within the blind hole 713 of the solid body 710 when the rod member 750 is attached to the solid body 710. FIG. 30 illustrates a reactive adhesive coating 745 on the outer surface of the end portion 753 of the rod member 750 and a reactive adhesive coating 746 on the sidewall 715 and floor 714 of the blind bore 713. However, the reactive adhesive coating 745 or the reactive adhesive coating 746 may be omitted in some embodiments. The reactive adhesive may be a two-part epoxy adhesive which comprises a resin and a hardener. It has been found that after milling the surface of the two brittle (or solid surface) material components, using a two-part epoxy to adhered and bond the two components together is extremely effective.

The reactive adhesive or epoxy adhesive may be a methacrylate adhesive such as a methyl methacrylate adhesive in some embodiments. Such an adhesive has good bonding qualities for solid surface, granite, engineered stone, quartz, ceramic, natural stone, and the like. An example of a reactive or epoxy adhesive that may be used in accordance with the invention set forth herein is Component Bonder by Integra Adhesives®, which is a quick drying acrylic structural adhesive. A polyester resin and hardener two-part epoxy could also be used. The reactive adhesive or epoxy adhesive described throughout this disclosure may cure as a structural thermoplastic. Moreover, the brittle materials described herein (e.g., the solid surface materials or the like) may also cure as a structural thermoplastic. This may lend itself to ensuring a very strong bond when two components are adhered together using the reactive or epoxy adhesive.

After coating one or both of the rod member 750 and the solid body 710 with the reactive adhesive, the end portion 753 of the rod member 750 is inserted into the blind bore 713 of the solid body 710 until the first end 751 of the rod member 750 interfaces with the floor 714 of the blind bore 713. Of course, the reactive adhesive 745, 746 may be located between the first end 751 of the rod member 750 and the floor 714 of the blind bore 713, and thus the term "interfaces with" includes instances in which the two surfaces are in abutting contact and instances in which the two surfaces face each other but are separated or spaced by the reactive adhesive or epoxy.

Once the reactive adhesive 745, 746 cures, the rod member 750 and the solid body 710 form a seamless unitary construction. An ordinary viewer will likely not even be able to tell that the combined rod member 750 and solid body 710 is actually formed from two separate components that are bonded or adhered together. Moreover, due to the mortise and tenon joint formed between the rod member 750 and the solid body 710 in combination with the reactive adhesive, the bond between the rod member 750 and the solid body 710 is extremely strong. In fact, it is likely that the rod member 750 and/or solid body 710 would fracture under force before the rod member 750 would become separated from the solid body 710 after the two are attached and bonded together as described herein. When the rod member 750 is attached to the solid body 710, the rod member 750 comprises a protruding portion 755 which protrudes from the rear surface 712 of the solid body 710.

Once the standoff 730 is mounted to the wall and the solid body 710 is attached to the rod member 750, the protruding portion 755 of the rod member 750 is inserted into the internal passageway 736 of the standoff 730 through the opening in the distal end 735 of the stem portion 734. The combined solid body 710 and rod member 750 may be translated into the internal passageway 736 until the distal end 735 of the stem portion 734 of the standoff 710 abuts against the rear surface 712 of the solid body 710, although this is not required in all embodiments and there may be a gap between the distal end 735 of the stem portion 734 and the rear surface 712 of the solid body 710 in other embodiments.

Finally, when the protruding portion 755 of the rod member 750 is fully inserted into the internal passageway 736 of the standoff 730, a set screw 760 is screwed into a threaded hole 761 in the stem portion 734 of the standoff 730. The set screw 760 is screwed into the threaded hole 761 until it makes forcible contact with the outer surface of the protruding portion 755 of the rod member 750. This contact between the set screw 760 and the rod member 750 couples the rod member 750 and solid body 710 to the standoff 730. In some embodiments, the protruding portion 755 of the rod member 750 may include an annular or partially annular recess which receives a tip portion of the set screw 761 to lock the components together.

In the exemplified embodiment, the wall-mountable accessory 700 forms a wall hook for hanging articles of clothing thereon, such as jackets, robes, hats, or really any article that is typically hung from a hook. Furthermore, in this embodiment, when the wall-mountable accessory 700 is mounted to the wall, the front and rear surfaces 711, 712 of the solid body 710 are oriented parallel to the wall.

Figure 32:
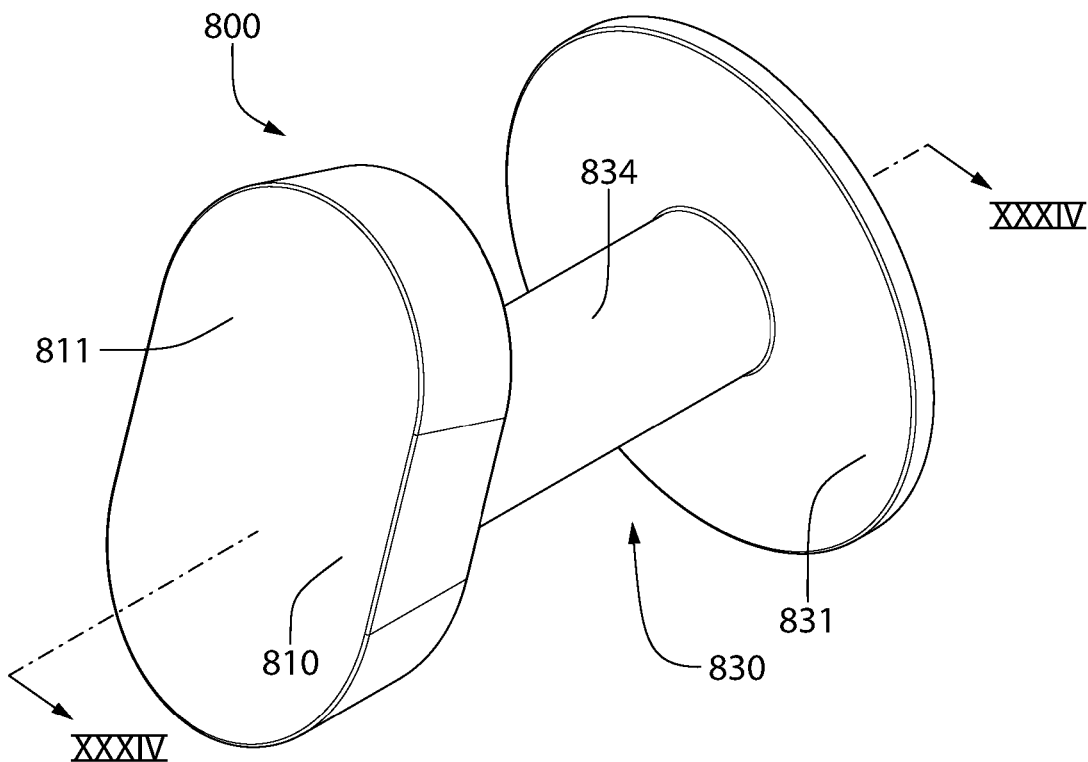
FIG. 32 is a front perspective view of a wall-mountable accessory in accordance with another embodiment of the present invention.
Figure 33:
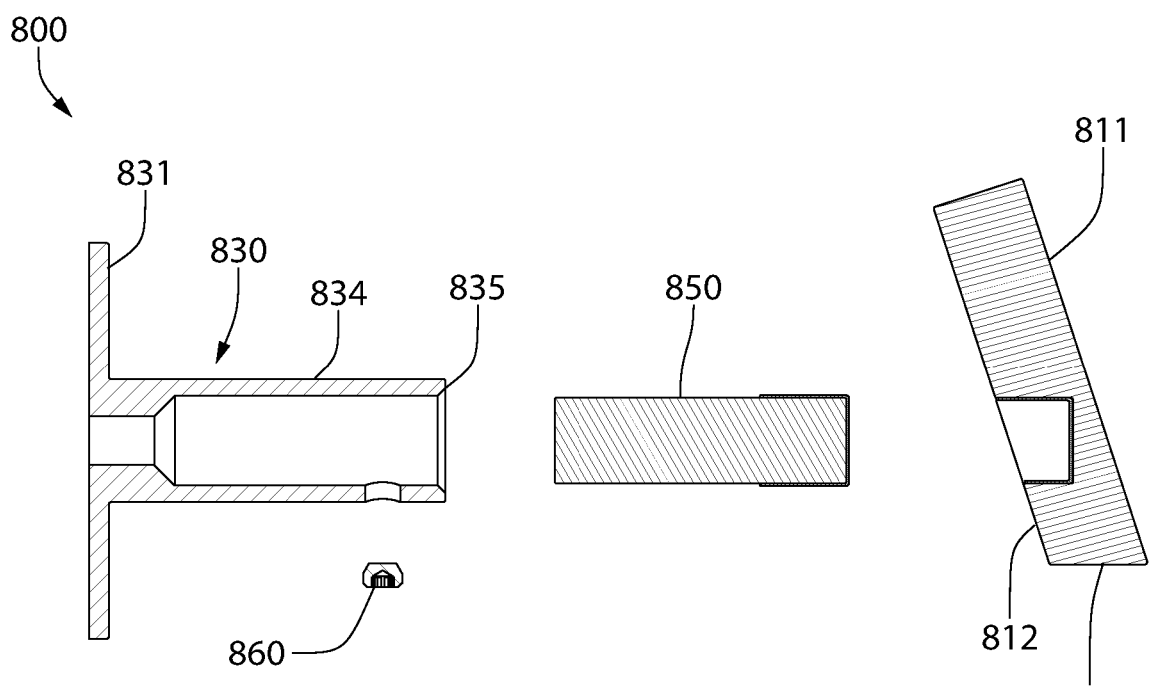
FIG. 33 is a side exploded view of the wall-mountable accessory of FIG. 32.
Figure 34:
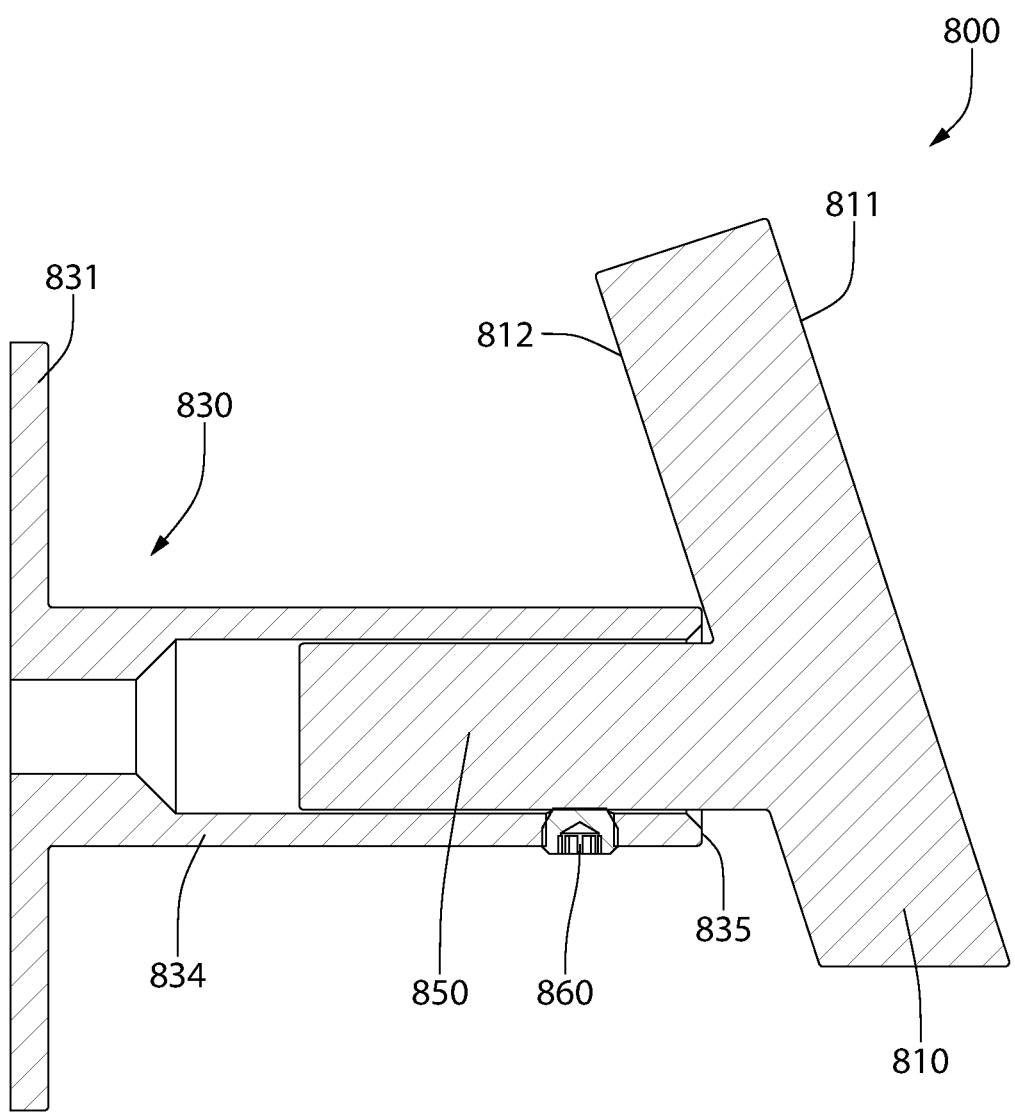
FIG. 34 is a cross-sectional view taken along line XXXIV-XXXIV of FIG. 32.

FIGS. 32-34 illustrate an alternative embodiment of a wall-mountable accessory 800 which is identical to the wall-mountable accessory 700 in all respects except with regard to the orientation of the front and rear surfaces of the solid body 710 and the shape of the solid body 710. Thus, for any details of the wall-mountable accessory 800 which are not provided herein, reference to the description of the wall-mountable accessory 700 is applicable. The wall-mountable accessory 800 generally comprises a standoff 830 comprising a plate portion 831 and a stem portion 834, a rod member 850 and a solid body 810. The rod member 850 and the solid body 810 may be formed from a brittle material such as solid surface or any of the other materials described herein or otherwise known to be brittle materials. The attachment of the rod member 850 to the solid body 810 using a reactive adhesive such as an epoxy adhesive is the same as that which was described above for the wall-mountable accessory 700. Furthermore, the attachment of the rod member 850 to the standoff 830 via a set screw 860 is the same as that which was described above with reference to the wall-mountable accessory 700 and will not be described in great detail herein in the interest of brevity.

In this embodiment, the solid body 810 has an oval shape. However, the invention is not to be so limited and the shape of the solid body 810 may be circular, polygonal, irregular, regular, or the like in various different embodiments. The solid body 810 has a front surface 811 and a rear surface 812. As best seen in FIG. 34, when the wall-mountable accessory 800 is fully assembled, a distal end 835 of the stem portion 834 of the standoff 830 contacts a portion of the rear surface 812 of the solid body 810 and is spaced apart from another portion of the rear surface 812 of the solid body 810. This is because the solid body 810 is oriented at an angle relative to the wall and standoff 830. In particular, the solid body 810 is angled such that the front and rear surfaces 811, 812 of the solid body 810 are oblique to the wall. More specifically, the front and rear surfaces 811, 812 of the solid body 810 are angled towards the wall moving from a lower end of the solid body 810 to an upper end of the solid body 810. As such, the distal end 835 of the stem portion 834 of the standoff 830 contacts a portion of the rear surface 812 of the solid body 810 which is located above the rod member 850, while portions of the rear surface 812 of the solid body 810 that are located below the rod member 850 are spaced from the distal end 835 of the stem portion 834 of the standoff 830. To reiterate, other than the concepts described, the features, methods, and the like of the wall-mountable accessory 800 are the same as with the wall-mountable accessory 700 and thus reliance on the description of the wall-mountable accessory 700 for details of the wall-mountable accessory 800 is entirely appropriate.

Figure 35:
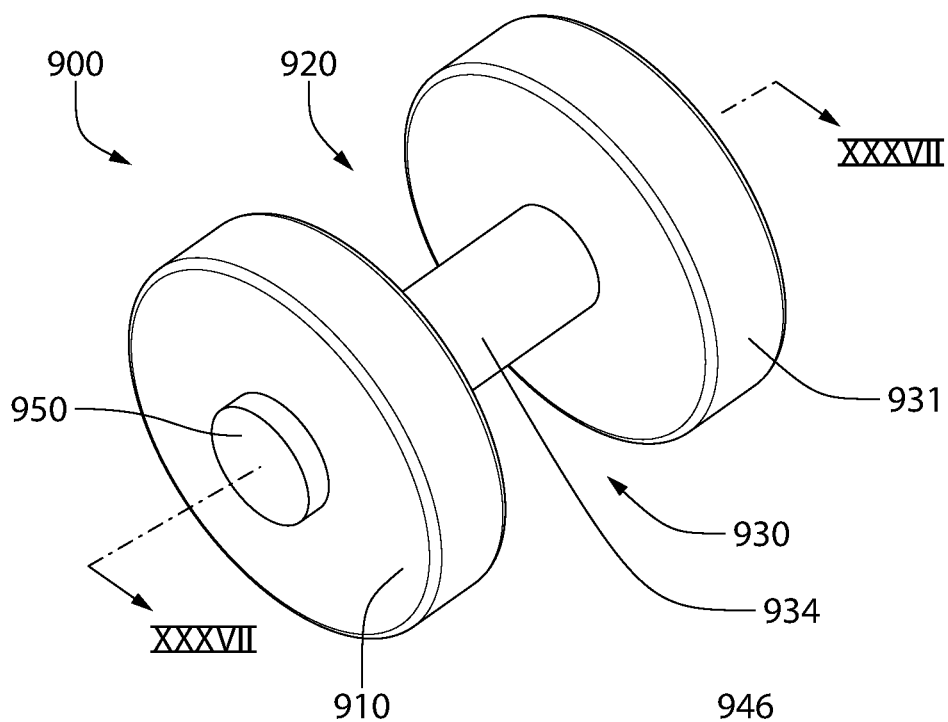
FIG. 35 is a front perspective view of a wall-mountable accessory in accordance with another embodiment of the present invention.
Figure 36:
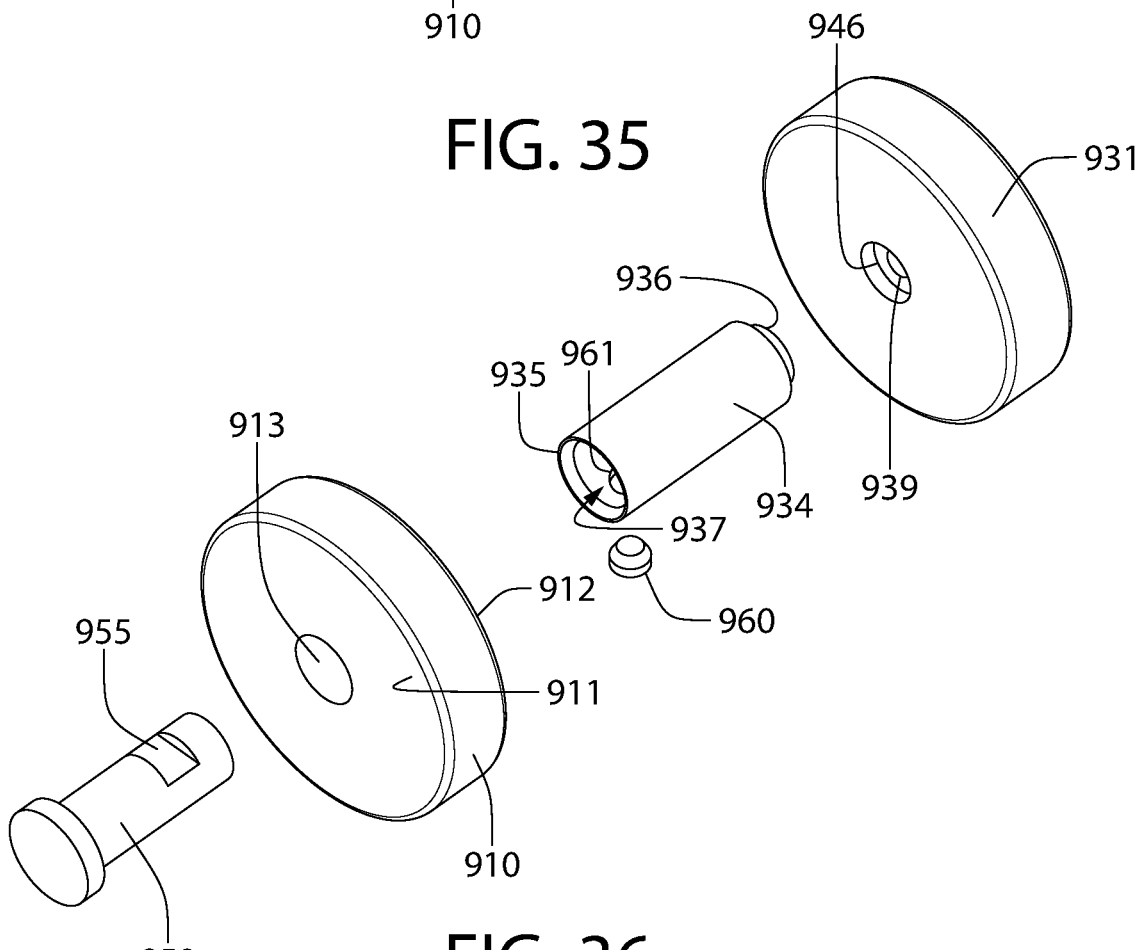
FIG. 36 is a side exploded view of the wall-mountable accessory of FIG. 35.
Figure 37:
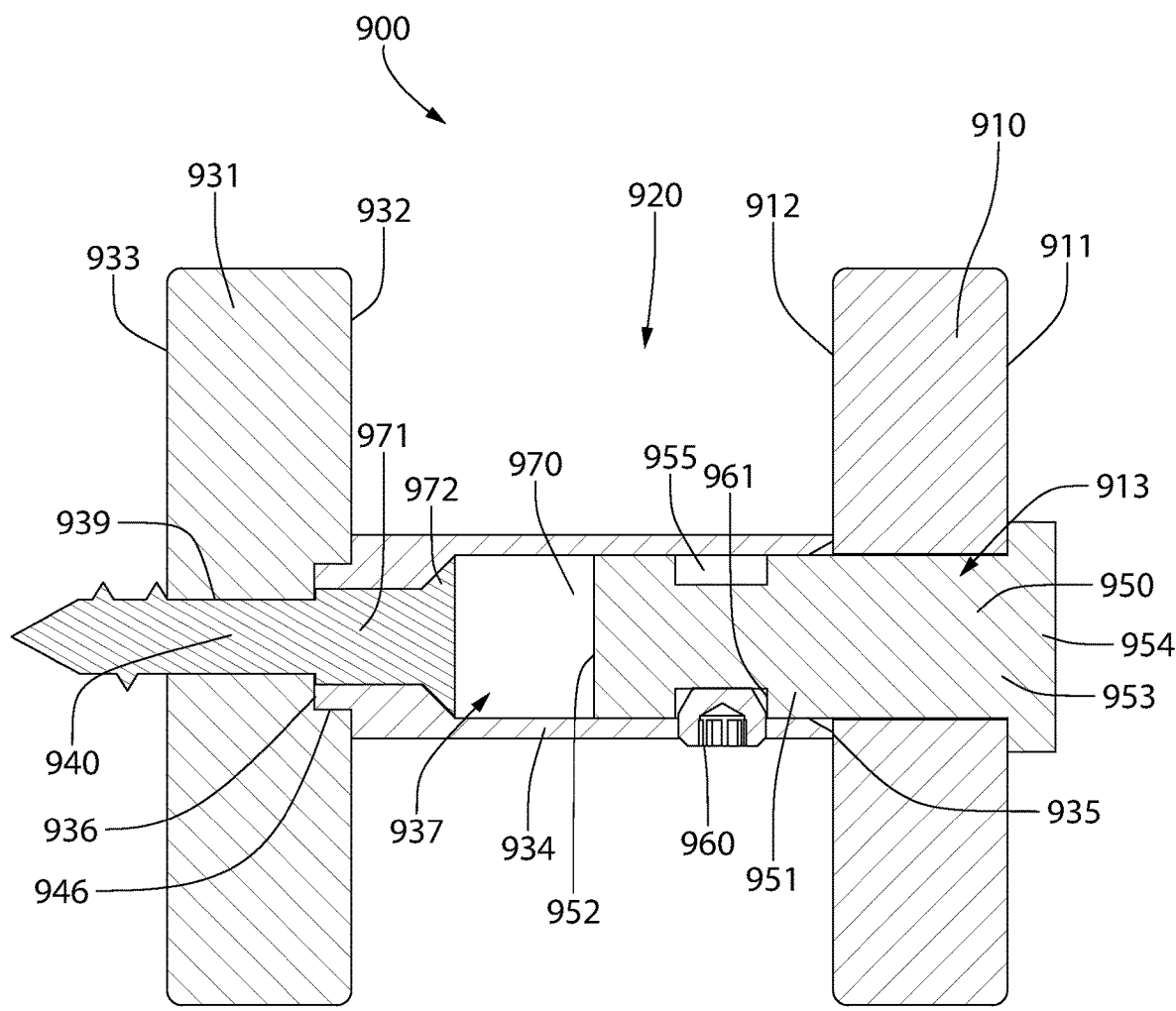
FIG. 37 is a cross-sectional view taken along line XXXVII-XXXVII of FIG. 35.
Figure 38:
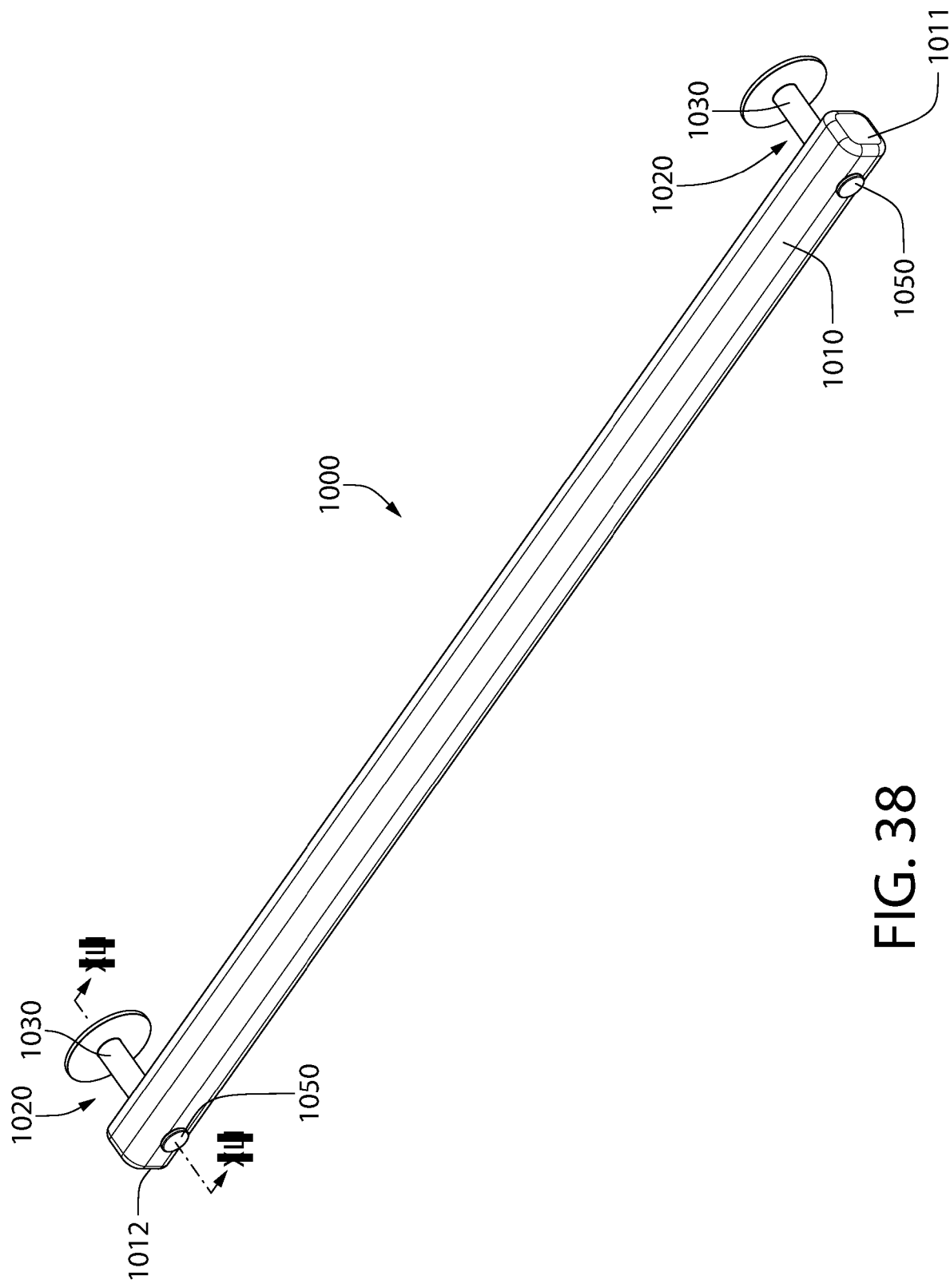
FIG. 38 is a front perspective view of a wall-mountable accessory in accordance with another embodiment of the present invention.
Figure 39:
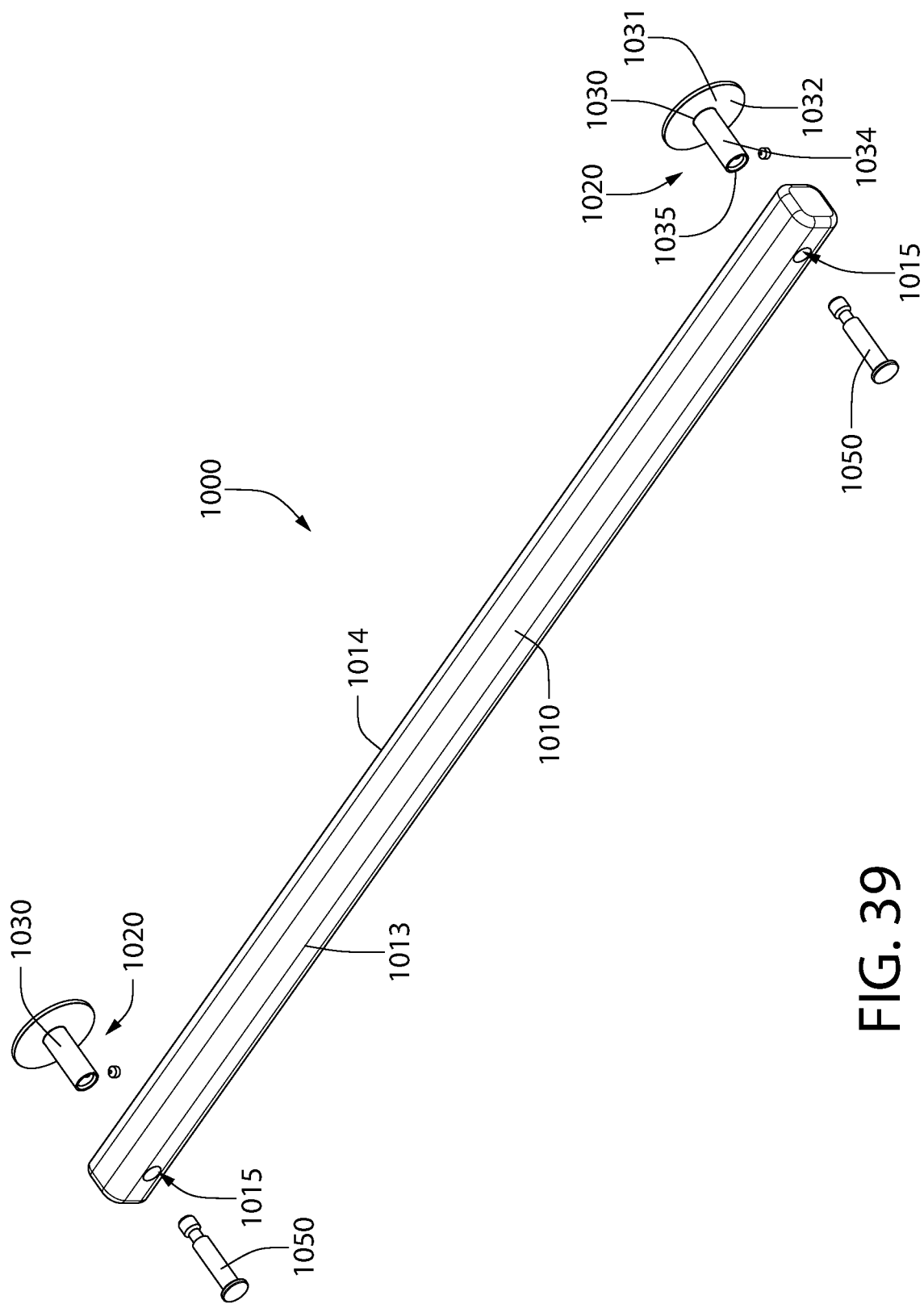
FIG. 39 is an exploded front perspective view of the wall-mountable accessory of FIG. 38.
Figure 40:
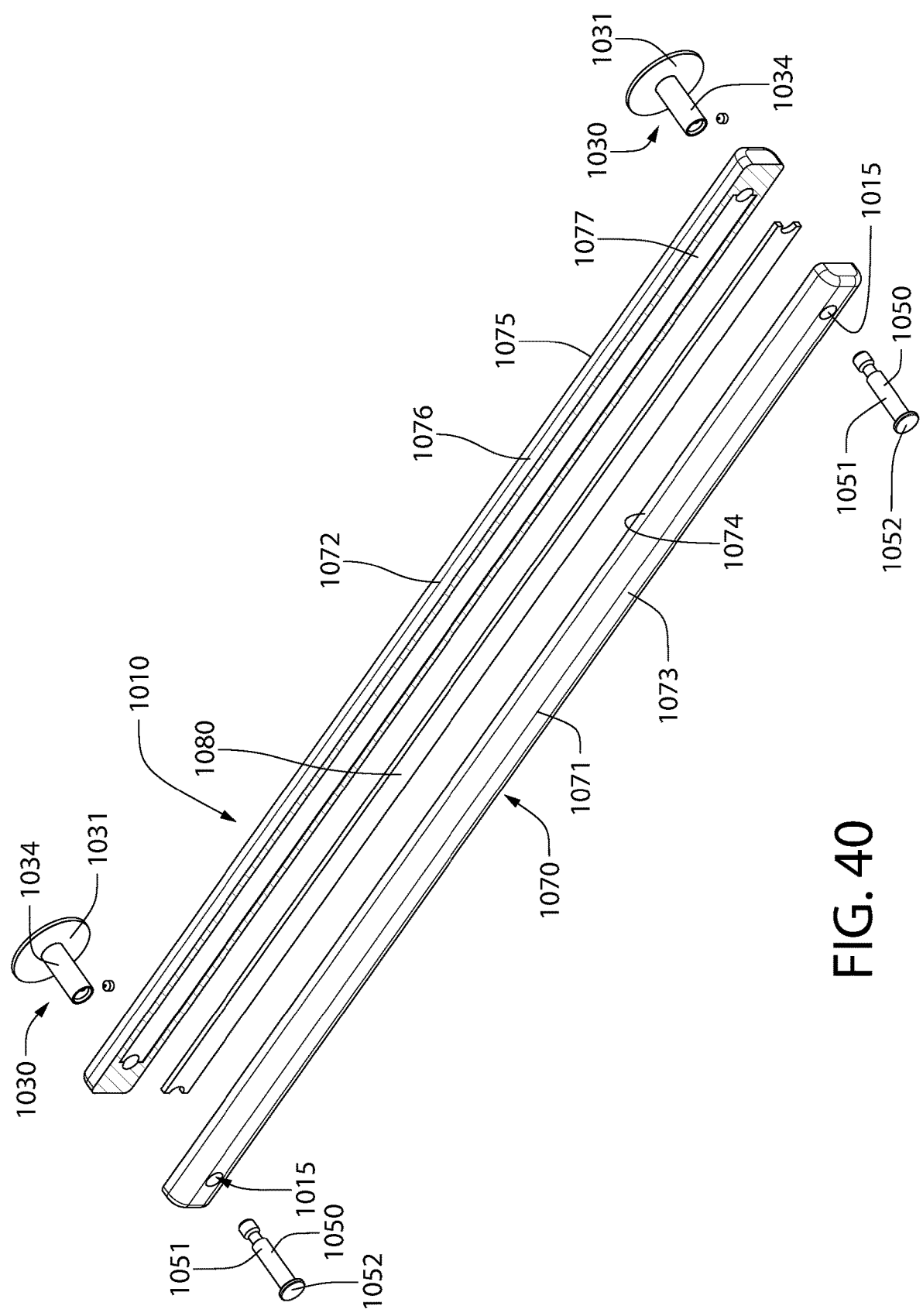
FIG. 40 is another exploded front perspective view of the wall-mountable accessory of FIG. 38.
Figure 41:
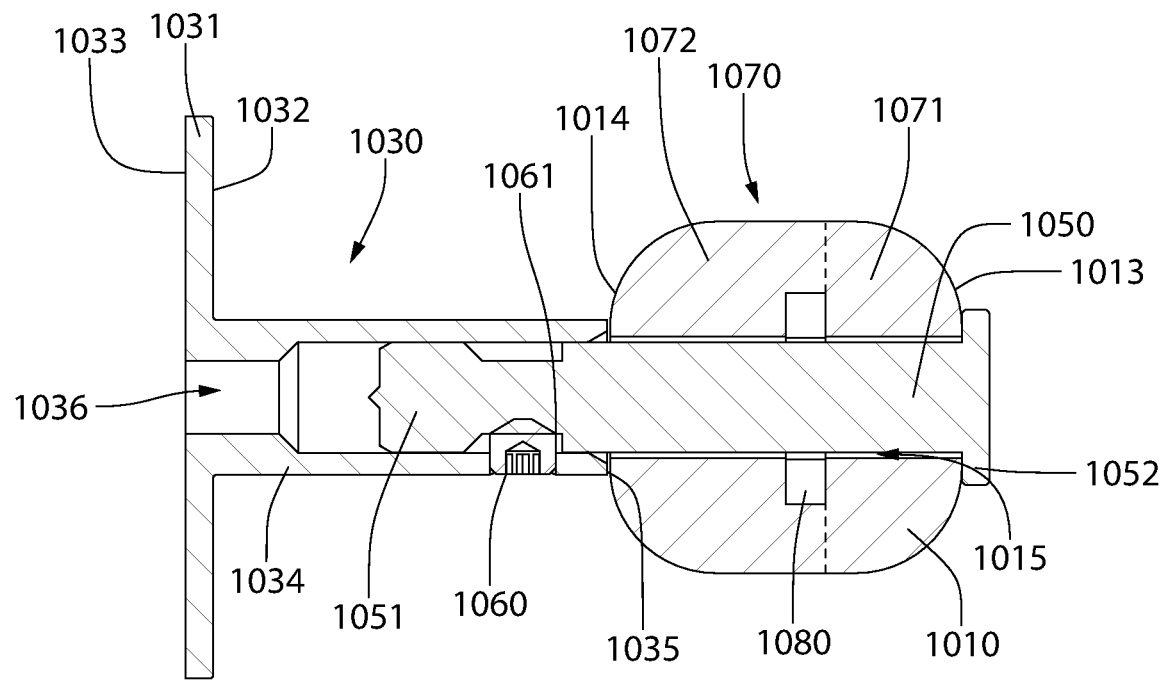
FIG. 41 is a cross-sectional view taken along line XLI-XLI of FIG. 38.

Referring now to FIGS. 35-37, a wall-mountable accessory 900 will be described in accordance with yet another embodiment of the present invention. The wall-mountable accessory 900 is a hook, such as a clothing hook, a robe hook, or the like such that articles (clothing, purses, backpacks, etc.) may be hung from the hook when it is mounted to a wall. The wall-mountable accessory 900 is very similar to the wall-mountable accessory 900, except that the plate portion and the stem portion of the standoff are formed from two separate components that are coupled together.

The wall-mountable accessory 900 comprises a solid body 910 and a mounting assembly 920 for mounting the solid body 910 to a wall. The mounting assembly 920 comprises a standoff 930 configured to be coupled to the wall and a fastening pin 950 that engages with the standoff 930 and with the solid body 910 to mount the solid body 910 to the standoff 930. The solid body 910 may be formed from a brittle material, the details of which have been provided above. The solid body 910 has a circular shape. Furthermore, the solid body 910 has a front surface 911 and a rear surface 912 that are flat/planar, although the invention is not to be so limited in all embodiments and other shapes and surface configurations may be used in other embodiments. The solid body 910 has a through-hole that extends from the front surface 911 to the rear surface 912.

The standoff 930 comprises a plate portion 931 and a stem portion 934. However, unlike in previously described embodiments, in this embodiment the plate portion 931 and the stem portion 934 are separate components (i.e., non-unitary, non-monolithic, non-integral) that are coupled together with a fastener such as a screw. Thus, in this embodiment the plate portion 931 may be formed from a brittle material, such as the solid surface material or any of the other materials noted herein or known to persons skilled in the art as being brittle. However the stem portion 934 cannot be made from a brittle material in accordance with the present invention because brittle material cannot be made with a threaded hole that can accept a set screw. Thus, in this embodiment the stem portion 934 may be made from metal (stainless steel, aluminum, or the like). The stem portion 934 may also be made from plastic in some embodiments.

The plate portion 931 comprises a front surface 932, a rear surface 933, and a through-hole 939 extending from the front surface 932, to the rear surface 933. The stem portion 934 comprises a first end 935, a second end 936, and an internal passageway 937 extending from the first end 935 to the second end 936. The stem portion 934 is open at each of the first and second ends 935, 936. The internal passageway 937 has a first axial section 970 adjacent the first end 935, a second axial section 971 adjacent to the second end 936 and a transition section 972 between the first and second axial sections 970, 971. The first axial section 970 has a greater diameter than the second axial section 971, and the diameter transitions from the first diameter to the second diameter within the transition section 972.

In this embodiment, the stem portion 934 is coupled to the plate portion 931 with a fastener 940. That is, the fastener 940 is inserted into the internal passageway 936 of the stem portion 934 through the opening in the first (or distal) end 935 until the head portion of the fastener 940 nests within the transition region 972 and the shank portion extends through the second axial section 971 and protrudes from the second end 936 of the stem portion 934. The plate portion 934 is then positioned so that the front surface 932 of the plate portion 931 is in contact with the second end 936 of the stem portion 934 such that the through-hole 939 in the plate portion 931 is aligned with the internal passageway 937 of the stem portion 934. When so positioned, the portion of the shank portion of the fastener 940 which protrudes from the second end 936 of the stem portion 934 will extend into the through-hole 939 in the plate portion 931 and protrude from the rear surface 933 of the plate portion 931 for insertion into a wall. When the shank portion of the fastener 940 is engaged with a wall, such engagement retains the stem portion 934 and the plate portion 931 in an attached configuration.

In the exemplified embodiment, the plate portion 931 has a recess 946 in the front surface 932 and a portion of the stem portion 934 nests within the recess 946. In other embodiments, the second end 936 of the stem portion 934 may simply abut against the front surface 932 of the plate portion 931, although the recess 946 adds some stability to the attachment between the stem portion 934 and the plate portion 931.

The fastening pin 950 is much the same as the fastening pins described previously. That is, the fastening pin 950 comprises a tubular portion 951 having a first end 952 and a second end 953 and a flange portion 954 that extends radially outward from the second end 953 of the tubular portion 951. To assemble the wall-mountable accessory, first the stem portion 934 of the standoff 930 is coupled to the plate portion 931 of the standoff 930 as described above sing the fastener 940. Next, the tubular portion 951 of the fastening pin 950 is placed into and through the through-hole 913 in the solid body 910 until the underside of the flange portion 954 abuts against the front surface 911 of the solid body 910. Next, the portion of the tubular portion 951 of the fastening pin 950 that protrudes from the rear surface 912 of the solid body 910 is inserted into the internal passageway 937 of the stem portion 934 of the standoff 930 via the opening in the first end 935 of the stem portion 934. Finally, a set screw 960 is inserted through a threaded opening 961 in the stem portion 934 of the standoff 930 until the set screw 960 engages the tubular portion 951 of the fastening pin 950. The tubular portion 951 of the fastening pin 950 may have one or more recesses (or an annular recess) 955 for receiving the set screw 960 in some embodiments. When so assembled, the solid body 910 is sandwiched and compressed between the flange portion 954 of the fastening pin 950 and the first (or distal) end 935 of the stem portion 934 of the standoff 930.

Thus, in this embodiment the solid body 910, the plate portion 931 of the standoff 930, and even the fastening pin 950 may be formed from a brittle material. Any one or all of these components may be formed from a brittle material, to create a desired aesthetic. However, the stem portion 934 of the standoff 930 will be made from metal or plastic as described herein mainly due to its need to support the set screw 960 as described above. This opens the door for more variation in the aesthetic and décor created by the wall-mountable accessory 900.

Referring now to FIGS. 38-41, a wall-mountable accessory 1000 will be described in accordance with another embodiment of the present invention. The wall-mountable accessory 1000 is illustrated as a towel bar or a grab bar. The wall-mountable accessory 1000 generally comprises a solid body 1010 and a mounting assembly 1020 comprising a standoff 1030 and a fastening pin 1050. In particular, in this embodiment the solid body 1010 extends from a first end 1011 to a second end 1012 along a longitudinal axis E-E. That is, the solid body 1010 is elongated along the longitudinal axis E-E. Due to the elongated structure of the solid body 1010, in this embodiment there are two identical mounting assemblies 1020 for mounting the solid body 1010 to the wall. That is, the two identical mounting assemblies 1020 are used to support the elongated nature of the solid body 1010. In some embodiments, more than two mounting assemblies 1020 may be used.

Figure 42:
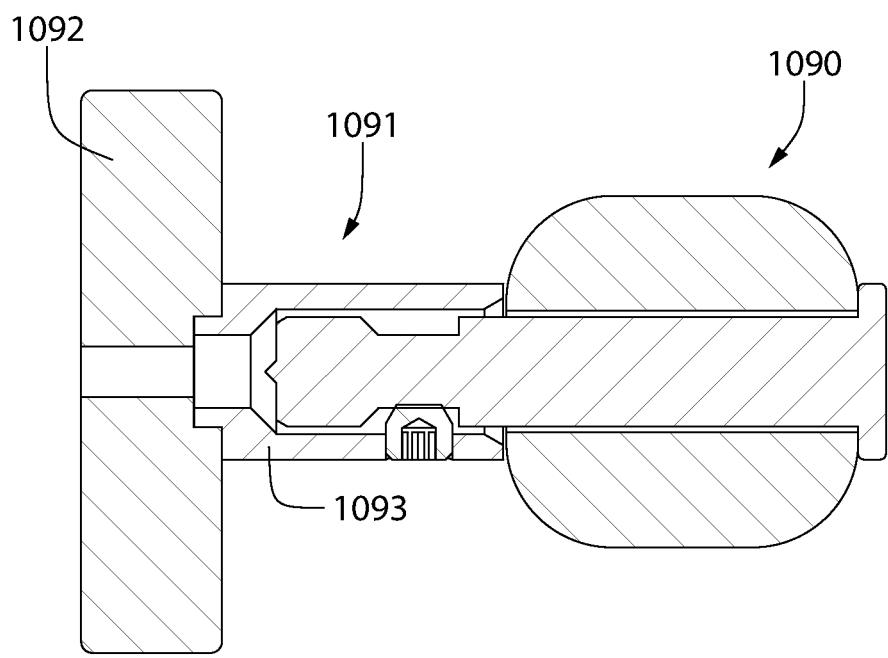
FIG. 42 is the cross-sectional view taken along line XLI-XLI of FIG. 38 in accordance with an alternative embodiment.
Figure 43:
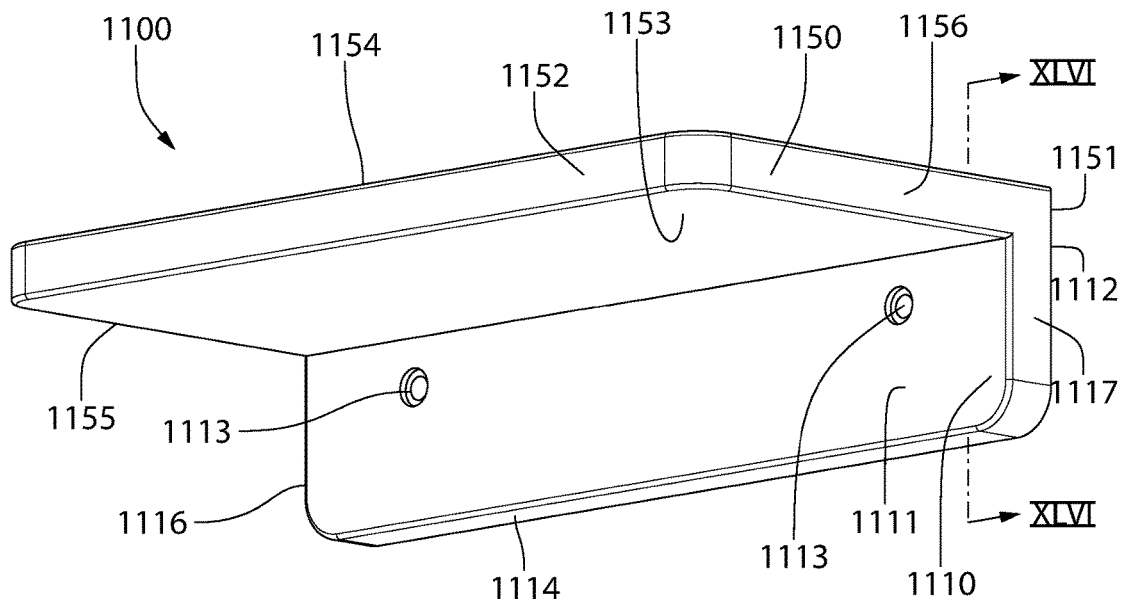
FIG. 43 is a front perspective view of a shelf in accordance with an embodiment of the present invention.
Figure 44:
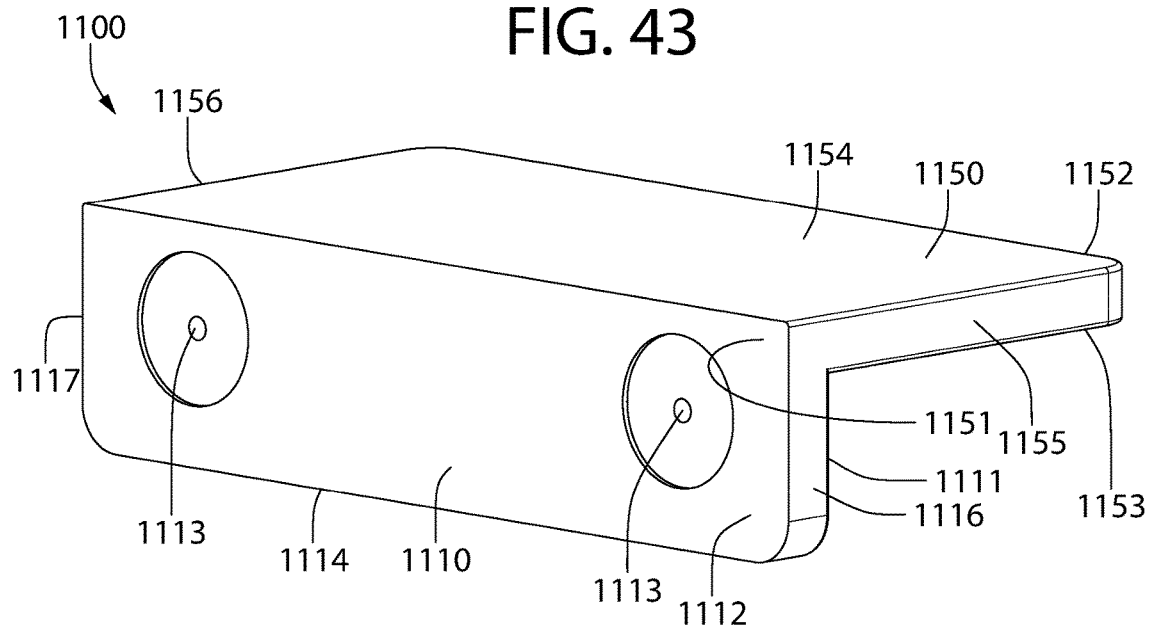
FIG. 44 is a rear perspective view of the shelf of FIG. 43.

The details of the standoff 1030 and the fastening pin 1050 are the same as that which has been described above, and thus the description of these parts will be brief with regard to this embodiment. The standoff 1030 comprises a plate portion 1031 and a stem portion 1034. The plate portion 1031 has a front surface 1032 and a rear surface 1033 with the rear surface 1033 abutting the wall when the standoff 1030 is mounted to the wall. The stem portion 1034 protrudes from the front surface 1032 of the plate portion 1031. In the exemplified embodiment, the plate portion 1031 and the stem portion 1034 are formed as part of a unitary and monolithic structure which may be formed from metal or plastic. However, the invention is not to be so limited in all embodiments and in some alternative embodiments the plate portion 1031 and the stem portion 1034 may be separate components that are coupled together (see FIG. 42 for an example). As described above with reference to the wall-mountable accessory 900, the plate portion 1031 may be formed from a brittle material and the stem portion 1034 may be formed from metal or plastic or the like in some embodiments. In any case, the stem portion 1034 extends from the plate portion 1031 to a distal end 1035.

The standoff 1030 comprises an internal passageway 1036 that extends from the distal end 1035 of the stem portion 1034 to the rear surface 1033 of the plate portion 1031. A fastener like a screw or the like may be received within the internal passageway 1036 as described in the previous embodiments to mount the standoff 1030 to a wall.

The solid body 1010 comprises a front surface 1013 and a rear surface 1014 opposite the front surface 1013. Furthermore, the solid body 1010 comprises a through-hole 1015 extending from the front surface 1013 to the rear surface 104. More specifically, in the exemplified embodiment the solid body 101 has two of the through-holes 1015, one located adjacent to the first end 1011 and one located adjacent to the second end 1012. Each of the through-holes 1015 is configured to cooperate with one of the mounting assemblies 1020 to mount the solid body 1010 to the wall.

The fastening pin 1050 comprises a tubular portion 1051 and a flange portion 1052. The tubular portion 1051 extends into and through the through-hole 1015 in the solid body 1010 such that when the flange portion 1052 of the fastening pin 1050 abuts against the front surface 1013 of the solid body 1010, a portion of the tubular portion 1051 of the fastening pin 1050 protrudes from the rear surface 1014 of the solid body 1010. That portion of the tubular portion 1051 which protrudes from the rear surface 1014 of the solid body 1010 is then positioned within the internal passageway 1036 of the standoff 1030. Finally, a set screw 1060 is inserted through an opening 1061 in the stem portion 1034 of the standoff 1030 and engages the tubular portion 1051 of the fastening pin 1050 which nest within the internal passageway 1036 of the standoff 1030. As such, the solid body 1010 is compressed between the distal end 1035 of the standoff 1030 (which contacts or abuts the rear surface 1014 of the solid body 1010) and the flange portion 1052 of the fastening pin 1051 (which contacts or abuts the front surface 1013 of the solid body 1010).

Because the solid body 1010 is elongated as described and formed from a brittle material, there may be a need to increase the structural integrity of the solid body 1010 by embedding a structural insert within the solid body 1010. By embedding the structural insert within the solid body 1010, this gives the appearance that the solid body 1010 is formed entirely from the brittle (e.g., solid surface or the like) material despite the inclusion of the structural insert. Thus, referring to FIGS. 40 and 41, in this embodiment the solid body 1010 comprises a main body portion 1070 comprising a first elongated member 1071 and a second elongated member 1072 and a structural insert 1080. The first and second elongated members 1071, 1072 may be formed from a brittle material such as a solid surface material or the like and the structural insert 1080 may be formed from a non-brittle material. In some embodiments the non-brittle material may be metal.

The first elongated member 1071 comprises a front surface 1073 which forms the front surface 1013 of the solid body 1010 and a rear surface 1074 opposite the front surface 1073. The second elongated member 1072 comprises a rear surface 1075 which forms the rear surface 1014 of the solid body 1010 and a front surface 1076 opposite the rear surface 1075. When the solid body 1010 is assembled as will be described below, the front surface 1073 of the first elongated member 1071 and the rear surface 1075 of the second elongated member 1072 form an entirety of the outer surface of the solid body 1010. Thus, it appears that the solid body 1010 is formed entirely from the first and second elongated members 1071, 1072, and therefore entirely from the brittle material used to form the first and second elongated members 1071, 1072.

In the exemplified embodiment, the front surface 1076 of the second elongated member 1072 comprises an elongated recess 1077 that is elongated in a direction of the longitudinal axis E-E. In the exemplified embodiment, the recess 1077 extends between the first and second through-holes in the second elongated member 1072, although the exact length of the recess 1077 may be modified from that which is depicted and is therefore not to be limiting of the invention in all embodiments. In alternative embodiments the rear surface 1074 of the first elongated member 1071 may comprise an elongated recess instead of the second elongated member 1072 having the elongated recess 1077. In still other embodiments, there may be an elongated recess formed into each of the rear surface 1074 of the first elongated member 1071 and the front surface 1076 of the second elongated member 1072 such that the two recesses are aligned with the first and second elongated members 1072 are coupled together.

The structural insert 1080 is configured to nest within the recess 1077 in the front surface 1076 of the second elongated member 1072 in the exemplified embodiment. In some embodiments, the structural insert 1080 may nest flush in the recess 1077 so that an outer surface of the structural insert 1080 is flush with the front surface 1076 of the second elongated member 1072. In other embodiments the structural insert 1080 may protrude from the front surface 1076 of the second elongated member 1072, and in such embodiments the rear surface 1074 of the first elongated member 1071 may also comprise a recess to receive the protruding portion of the structural insert 1080. The structural insert 1080 may be bonded or adhered to the second elongated member 1072 in some embodiments. In other embodiments, the structural insert 1080 may simply nest within the recess 1077 and be held therein due to friction and/or once the first and second elongated members 1071, 1072 are coupled together.

Once the structural insert 1080 is positioned within the recess 1077 in the front surface 1076 of the second elongated member 1072, the first and second elongated members 1071, 1072 are bonded or adhered together to form the solid body 1010. That is, at least one of the rear surface 1074 of the first elongated member 1071 and the front surface 1076 of the second elongated member 1072 may be milled and then coated with a reactive adhesive such as an epoxy as has been described herein. In some instances, the epoxy may be applied onto both of the first and second elongated members 1071, 1072. After the epoxy is applied, the rear surface 1074 of the first elongated member 1071 is brought into engagement with the front surface 1076 of the second elongated member 1072 and held in place while the epoxy cures and hardens. Once the epoxy hardens, the first and second elongated members 1071, 1072 are bonded together and form the solid body 1010. Moreover, the structural insert 1080 is embedded within the solid body 1010 between the first and second elongated members 1071, 1072. Thus, while the structural insert 1080 provides structural integrity to the elongated solid body 1010, it is hidden from view as it is embedded within the interior of the solid body 1010.

In the exemplified embodiment the ends of the structural insert 1080 are arcuate and located immediately adjacent to the through-holes 1015 in the solid body 1010. The structural insert 1080 may have a shorter length than shown such that the arcuate ends may not be needed. In other embodiments, the structural insert 1080 may have through-holes that are aligned with the through-holes 1015 such that the structural insert 1080 may extend past the location of the through-holes 1015 in the first and second elongated members 1071, 1072.

As mentioned above, FIG. 42 illustrates a wall-mountable accessory 1090 in cross-section that is identical to the wall-mountable accessory 1000 except that the standoff is formed from separate components. That is, the standoff 1091 comprises a plate portion 1092 which may be formed from a brittle material and a stem portion 1093 which may be formed from metal. All other features of the wall-mountable accessory 1090 are identical the features of the wall-mountable accessory 1000 described above and thus they will not be described herein in the interest of brevity.

Referring now to FIGS. 43-46, a wall-mountable shelf 1100 will be described in accordance with an embodiment of the present invention. The wall-mountable shelf 1100 is a shelf that is configured to be mounted to a wall so that a portion thereof protrudes horizontally from the wall to support items thereon. Any item may be stored on the wall-mountable shelf 1100 such as decorative items, plants, office materials, compact discs, towels, or any other item desirable. In the exemplary embodiments, the wall-mountable shelf 1100 is formed entirely from a brittle material, and more specifically from two separate components, each formed from a brittle material and coupled together to form an extremely strong attachment.

The wall-mountable shelf 1100 generally comprises an apron 1110 and a ledge 1150. The apron 1110 is mounted directly to the wall and the ledge 1150 protrudes from the apron 1110 and from the wall in a generally horizontal direction to function as a shelf for supporting items thereon. The apron 1110 comprises a front surface 1111 and a rear surface 1112. The rear surface 1112 is intended to abut against the wall when the wall-mountable shelf 1100 is mounted to the wall and the front surface 1111 is configured to face away from the wall. In the exemplified embodiment, the apron 1110 comprises a plurality of through-holes 1113 extending therethrough from the front surface 1111 to the rear surface 1112 for receiving fasteners, posts, brackets or the like to couple the wall-mountable shelf 1100 to the wall. As noted above, the apron 1110 is formed from a brittle material, such as for example solid surface material although other brittle materials including those noted herein and others known to persons skilled in the art could be used in other embodiments.

The apron 1110 comprises a peripheral edge (or peripheral surface) extending between the front and rear surface 1111, 1112. The peripheral edge of the apron 1110 comprises a lower edge 1114, an upper edge 1115, a first side edge 1116, and a second side edge 1117. While these are noted as "edges" herein, these could be referred to as surfaces as well. In the exemplified embodiment the apron 1110 is elongated between the first and second side edges 1116, 1117 and is therefore in the shape of a rectangle with rounded corners. However, the invention is not to be so limited in all embodiments and the apron 1110 can take on other shapes in other embodiments.

The ledge 1150 comprises a rear edge 1151, a front edge 1152 which forms a distal end of the ledge 1150, a lower surface 1153, an upper surface 1154, a first side edge 1155 and a second side edge 1156. Furthermore, lower surface 1153 of the ledge 1150 comprises a recess 1160. The recess 1160 extends from the rear edge 1151 of the ledge 1150 in a direction towards the front edge 1152 of the ledge 1150. However, the recess 1160 does not extend the full distance between the rear and front edges 1151, 1152 of the ledge 1150. Rather, the recess 1160 extends from the rear edge 1151 of the ledge 1150 to an end wall 1161. Thus, the recess 1160 is defined by a floor 1162 which is recessed relative to the lower surface 1153 of the ledge 1150 and the end wall 1161. The floor 1162 is oriented generally horizontally when the wall-mountable shelf 1100 is mounted on a wall and the end wall 1161 is oriented generally vertically when the wall-mountable shelf 1100 is mounted on a wall. The recess 1160 extends the full width of the ledge 1110 between the first and second side edges 1155, 1156. That is, the recess 1160 is open at each of the first and second side edges 1155, 1156 and at the rear edge 1151 and the recess 1160 is elongated between the first and second side edges 1155, 1156.

Figure 45:
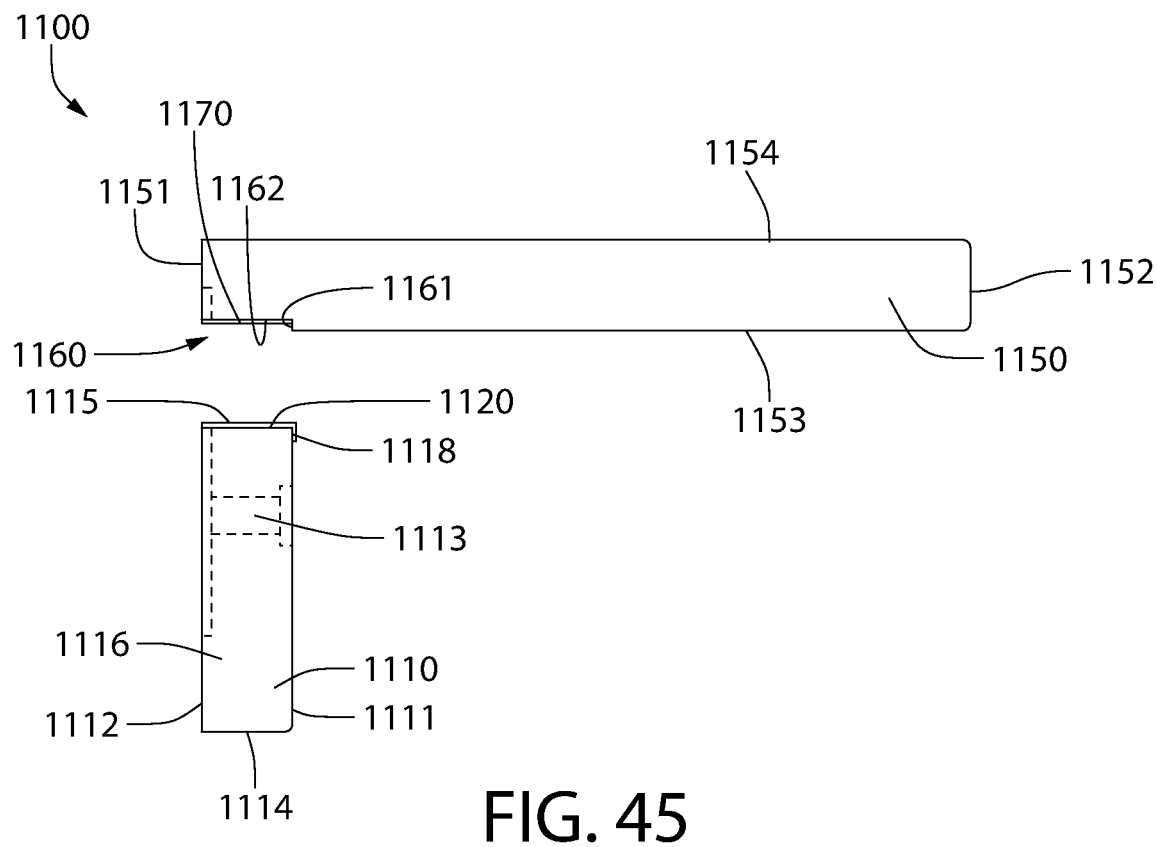
FIG. 45 is an exploded side view of the shelf of FIG. 43.
Figure 46:
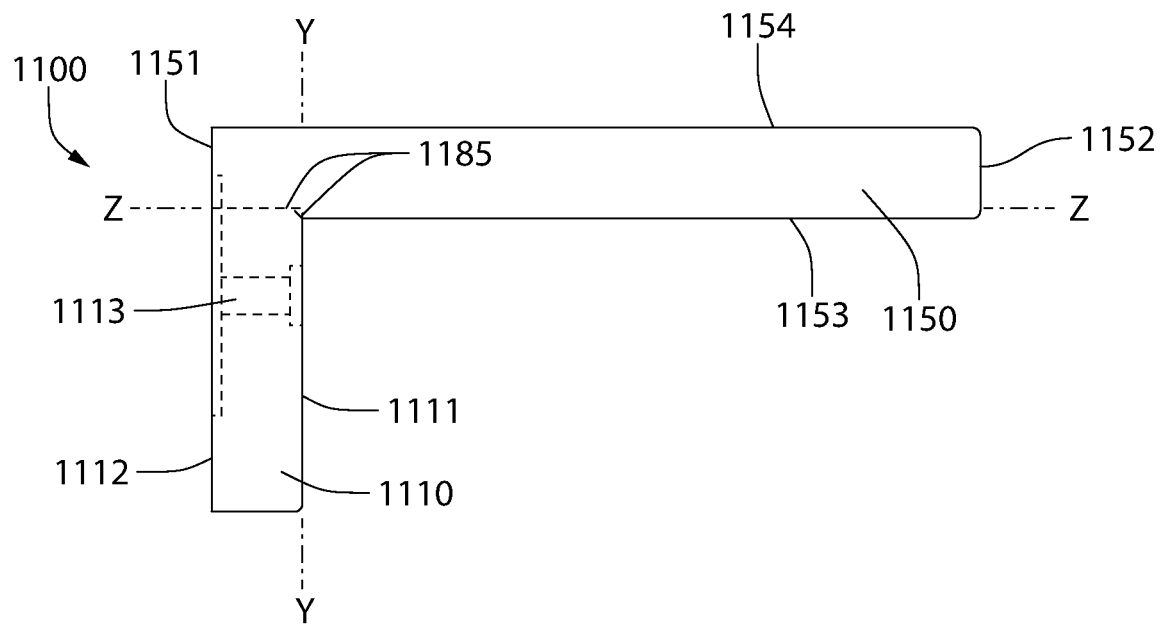
FIG. 46 is an assembled side view of the shelf of FIG. 43.

Referring to FIGS. 45 and 46, the coupling of the apron 1110 and the ledge 1150 to one another will be described. Prior to coupling the apron 1110 and the ledge 1150 to one another, the surface of the apron 1110 and the ledge 1150 that will interface with one another may be milled with a milling tool or milling machine. The surfaces of the apron 1110 that interface with the ledge 1150 include the upper edge 1115 of the apron 1110 and an upper-most part 1118 of the front surface 1111 of the apron 1110. The surfaces of the ledge 1150 that interface with the apron 1110 include the floor 1162 of the recess 1160 and the end wall (or end wall surface) 1161 of the recess 1160. As used herein, the term interface refers to the surfaces of different components that face one another when the two components are coupled together. The term interface is being used because the surfaces of the components that are coupled together may be coated with an adhesive in order to achieve the bonding of the two components together. As such, the surfaces of the components may not be in direct abutment or contact with one another due to the intervening adhesive layer. However, those surfaces still interface with one another.

In the exemplified embodiment, after milling (although in some embodiments the milling step may be omitted), some surfaces of the apron 1110 and/or the ledge 1150 are coated with a reactive adhesive (e.g., an epoxy). For example, in some embodiments the top surface 1115 and the upper-most part 1118 of the front surface 1111 of the apron 1110 may be coated with a reactive adhesive 1120. In other embodiments, the floor 1162 and the end wall surface 1161 of the recess 1160 may be coated with a reactive adhesive 1170. In still other embodiments, all of the aforementioned surfaces may be coated with the reactive adhesives 1120, 1170. Generally, the reactive adhesive should form a layer between the surfaces of the apron 1110 and the surfaces of the ledge 1150 that interface with one another once coupled together. The reactive adhesives 1120, 1170 are depicted with an exaggerated thickness to make them visible in the illustrations, but it should be appreciated that the thicknesses of the reactive adhesive coatings 1120, 1170 is likely to be much thinner than that which is depicted in practice. That said, the invention is not intended to be limited by any particular thickness of the coatings of the reactive adhesives 1120, 1170 in this embodiment or any other embodiment described herein.

Once the reactive adhesive(s) 1120, 1170 (e.g., epoxy) are coated onto the various surfaces of the apron 1110 and the ledge 1150 that are to interface with one another, the apron 110 and the ledge 1150 are brought into engagement with one another. That is, an uppermost portion of the apron 1110 is translated into the recess 1160 so that the upper surface 1115 of the apron 1110 interfaces with the floor 1162 of the recess 1160 and the end wall 1161 of the recess 1160 interfaces with the upper-most portion 1118 of the front surface 1111 of the apron 1110. Again, the term interface is used because the paired surfaces of the apron 1110 and ledge 1150 are not in direct contact due to the layer of adhesive between the otherwise abutting surfaces. The term interface as used herein essentially means that the two surfaces which are interfacing are separated from each other by an adhesive which bonds the two surfaces together. When the epoxy cures it may be brittle like the material of the apron 1110 and the ledge 1150. Furthermore, when the epoxy cures the wall-mountable shelf 1100 may be sleek and seamless such that there are no visible lines at the interfaces between the apron 1110 and the ledge 1150. Thus, the dotted line illustrating the multiplane interface 1185 may not actually be visible. In some embodiments, the floor 1162 and the end wall 1261 of the recess 1160 may be referred to as an interface surface of the recess 1160 because it is the surface that interfaces with the apron 1110. Furthermore, the top surface 1115 and the uppermost portion 1118 of the front surface 1111 of the apron 1110 may be referred to herein as an engagement surface because it engages the recess of the ledge 1150.

Thus, the interface between the apron 1110 and the ledge 1150 is a multiplane interface 1185. In particular, the top surface 1115 of the apron 1110 and the floor 1162 of the recess 1160 of the ledge 1150 interface along a first plane Z-Z. The end wall 1161 of the recess 1160 and the uppermost portion 1118 of the front surface 1111 of the apron 1110 interface along a second plane Y-Y. In the exemplified embodiment, the first and second planes Z-Z, Y-Y are perpendicular to one another. In other embodiments, the first and second planes Z-Z, Y-Y may be oriented oblique to one another. Moreover, the ledge 1150 and the apron 1110 are adhered or bonded to one another along the multiplane interface due to the reactive adhesives 1120 and/or 1170 noted above. The multiplane adhesion between the apron 1110 and the ledge 1150 creates a superior interlock between the apron and the ledge 1150 that minimizes the fulcrum of the shelf but also creates a bind point to interfere with any peel of the adhesive.

In particular, any strong forces on the ledge 1150 are likely to be in the downward direction, and more specifically a downward pivoting movement. However, the end wall 1161 of the recess 1160 interfaces with or abuts against the front surface 1111 of the apron 1110 in that downward direction. Moreover, the ledge 1150 and the apron 1110 are formed from a brittle material, such that they will not deform elastically or plastically. As such, even if a powerful downward force is applied against the ledge 1150, the ledge 1150 and the apron 1110 will remain bonded together due to the strong bond achieved by the reactive adhesive and the abutment of the end wall 1161 with the front surface 1111 of the apron 1110. The reactive adhesive cannot simply peel slowly away because the apron 1110 and ledge 1150 will not deform. Rather, there would need to be a complete failure of the entirety of the adhesive bond between the apron 1110 and the ledge 1150 for those two components to detach from one another, and such complete failure all at once is extremely unlikely. Upward forces will have the same result due to the interfacing surfaces of the apron 1110 and the ledge 1150 being in a multiplane direction due in part to the apron 1110 and the ledge 1150 being formed from a brittle material.

Figure 46A:
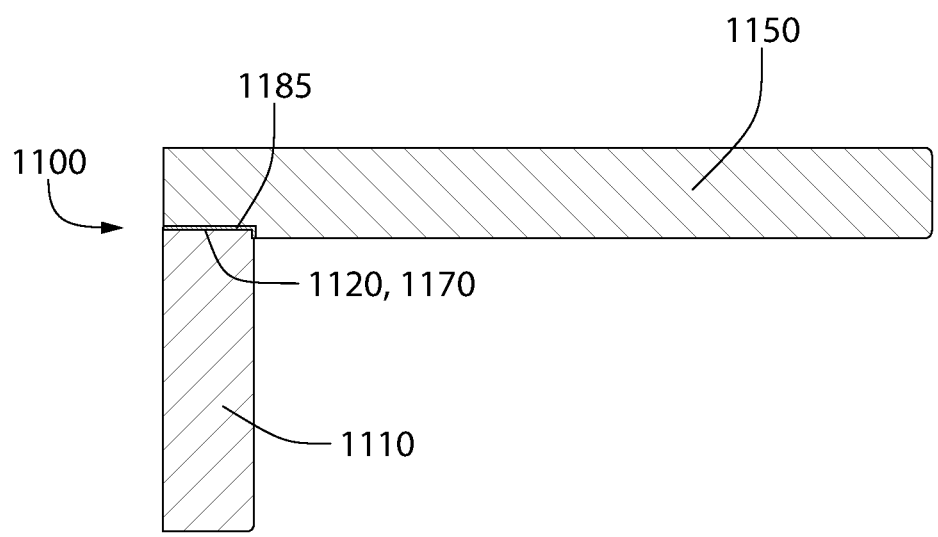
FIG. 46A is a cross-sectional view taken along line XLVI-XLVI of FIG.

FIG. 46A is a cross-sectional view which illustrates the assembled wall-mountable shelf 1100. This view best illustrates the reactive adhesive or epoxy 1120, 1170 which bonds the apron 1110 to the ledge 1150 along the multiplane interface 1185. The thickness of the reactive adhesive or epoxy 1120, 1170 may be exaggerated in FIG. 46A such that it may be thinner than that shown. Moreover, as noted above there may just be one of the coatings of the reactive adhesive 1120, 1170 rather than both.

Figure 47:
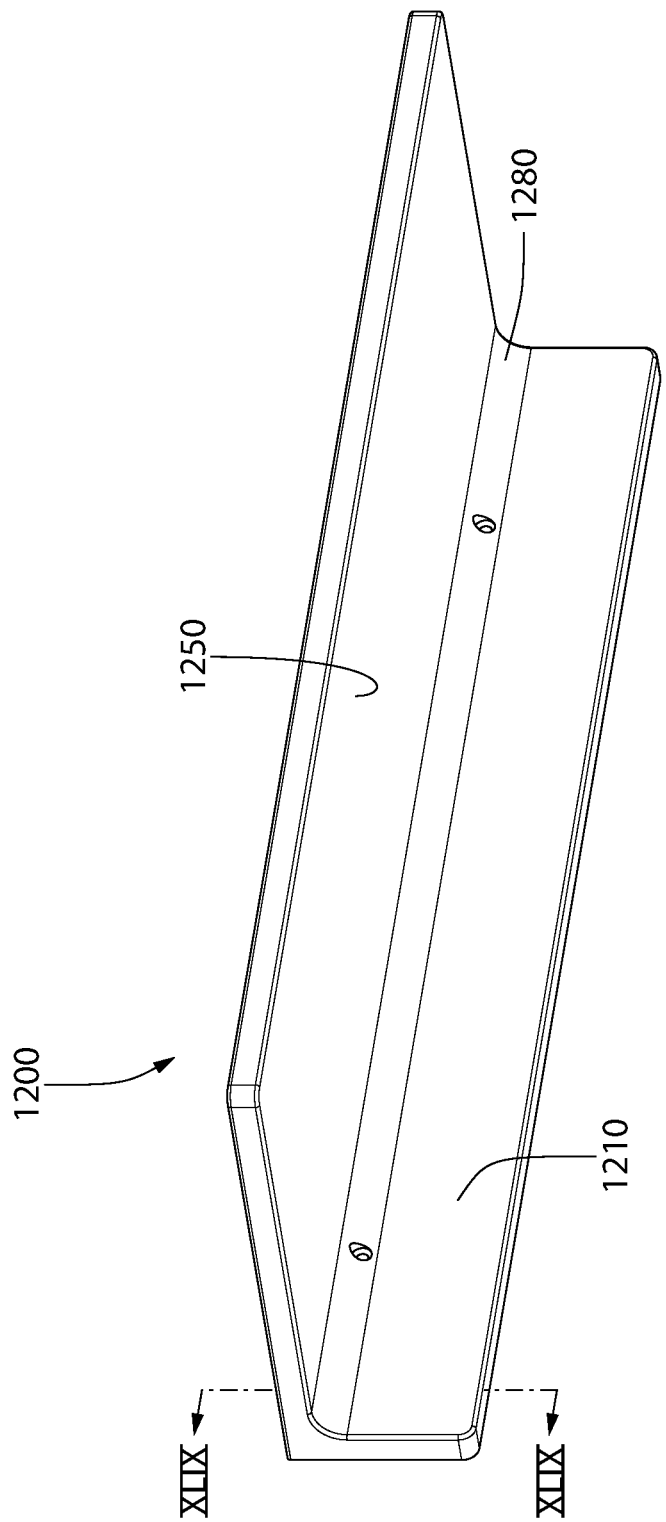
FIG. 47 is a front perspective view of a shelf in accordance with an embodiment of the present invention.
Figure 48:
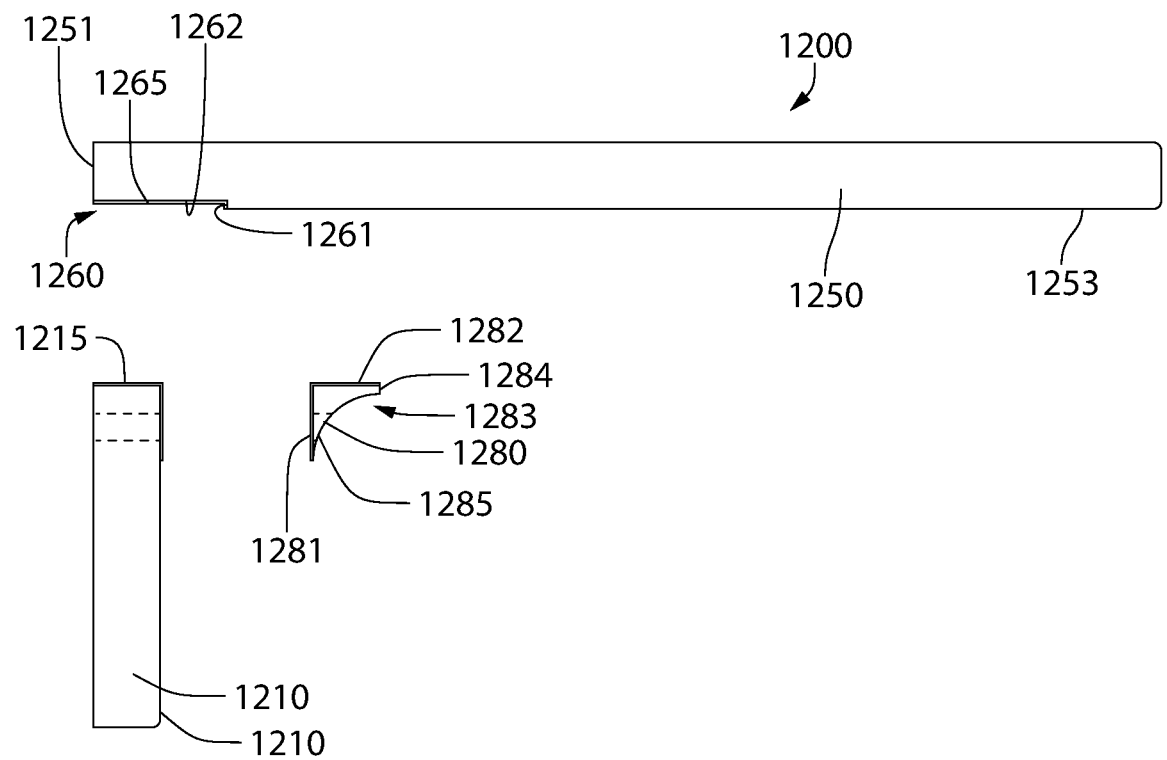
FIG. 48 is an exploded side view of the shelf of FIG. 47.
Figure 49:
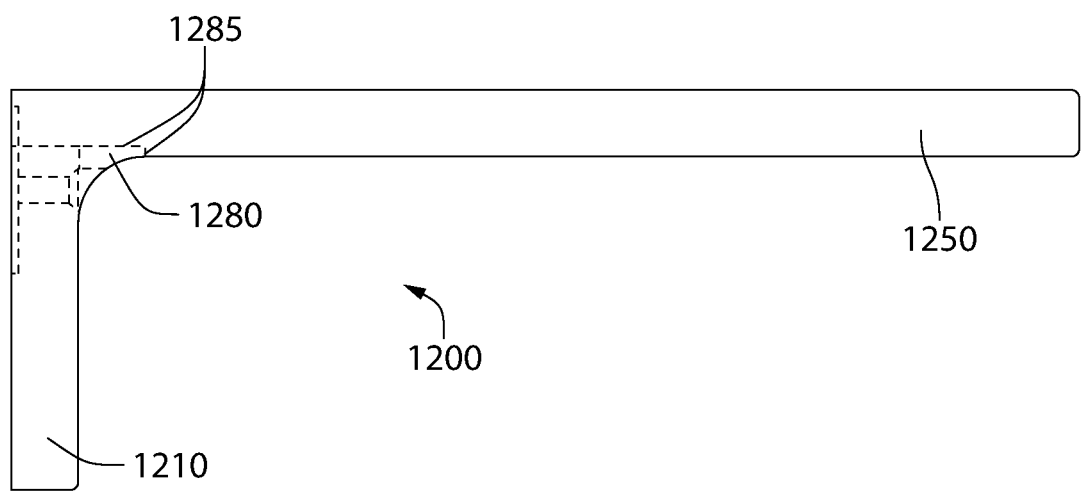
FIG. 49 is an assembled side view of the shelf of FIG. 43.

Referring to FIGS. 47-49, a wall-mountable shelf 1200 is illustrated in accordance with another embodiment of the present invention. The wall-mountable shelf 1200 is very similar to the wall-mountable shelf 1100 described above, except that the wall-mountable shelf 1200 includes an additional component which is not present in the wall-mountable shelf 1100.

In particular, the wall-mountable shelf 1200 comprises an apron 1210, a ledge 1250, and a connection member 1280 which is separate from the apron 1210 and the ledge 1250 and forms an additional bind point between the components that are coupled together. In this embodiment, the apron 1210 and the ledge 1250 are basically identical to the apron 1110 and the ledge 1150 previously described. In particular, the ledge 1250 comprises a lower surface 1253 having a recess 1260 that extends from a rear edge 1251 of the ledge 1250 to an end wall 1261. The recess 1260 is defined by a floor 1262 that is recessed relative to the lower surface 1253 of the ledge 1250 and the end wall or end wall surface 1261. In this embodiment, the thickness of the apron 1210 does not equal the length of the recess 1260 measured from the rear edge 1251 to the end wall 1261. Instead, there is space within the recess 1260 for the connection member 1280. Thus, not only does the uppermost part of the apron 1210 nest within the recess 1260, but also the uppermost portion of the connection member 1280 nests within the recess 1260.

In the exemplified embodiment, the connection member 1280 is in the shape of a half of an arch. Thus, the connection member 1280 comprises a vertical rear surface 1281, a horizontal top surface 1282, and a front surface 1283 which comprises a vertical portion 1284 adjacent to the horizontal top surface 1282 and an arcuate portion 1285 extending between the vertical portion 1284 of the front surface 1283 and the vertical rear surface 1281 (with all orientations being the orientation when the wall-mountable shelf 1200 is mounted to a wall).

As with the prior embodiment, a reactive adhesive 1265 may be coated onto the floor 1262 and the end wall 1261 of the recess 1260. Alternatively, or additionally, a reactive adhesive (not shown, but the same idea as with the prior embodiment) may be coated onto an upper edge 1215 of the apron 1210, the horizontal top surface 1282 of the connection member 1280, and the vertical portion 1282 of the front surface 1283 of the connection member 1280. Moreover, there may be a reactive adhesive 1265 located on one or both of a front surface 1211 of the apron 1210 and the vertical rear surface 1281 of the connection member 1280.

The wall-mountable shelf 1200 is assembled by positioning the upper edge 1215 of the apron 1210 into contact with the reactive adhesive 1265 located on the floor 1262 of the recess 1260 of the ledge 1250 while maintaining a rear surface 1212 of the apron 1210 flush with the rear edge 1251 of the ledge 1250. As can be seen, there is an additional space within the recess 1260 for positioning the connection member 1280. Thus, the connection member 1280 is then positioned within the recess 1260 so that the horizontal top surface 1282 of the connection member 1280 is in contact with the reactive adhesive 1265 on the floor 1261 of the recess 1260 and the vertical portion 1284 of the front surface 1284 of the connection member 1280 is in contact with the reactive adhesive 1265 on the end wall 1261 of the recess 1260. Of course, the assembly can occur on other sequences. For example, the connection member 1280 could be coupled to the ledge 1250 before the apron 1210, or the connection member 1280 and the apron 1210 could be coupled together and then placed together in the recess 1260 in the ledge 1250.

When assembled, the vertical portion 1284 of the front surface 1283 of the connection member 1280 interfaces with the end wall 1261 of the recess 1260 and the upper edge 1215 of the apron 1210 and the top surface 1282 of the connection member 1280 interface with the floor 1262 of the recess 1260 of the ledge 1250. Again, the term interfaces is used instead of contact or abutment due to the reactive adhesive being located between the surfaces of the ledge 1250 and the surfaces of the apron 1210 and connection member 1280. This connection once again creates a multiplane interface 1285 to strengthen the attachment of the components. The ledge 1250 cannot easily be separated from the connection member 1280 or the apron 1210 due to the concepts noted above. Specifically, the lack of deformation of the materials and the interaction between the end wall 1261 of the recess 1260 and the vertical surface 1284 of the connection member 1280 means that the entire reactive adhesive bond would need to fail for the parts to separate. There is no way for the components to separate to peel the adhesive bond due to the engagement or interfacing of the various surfaces of the components. As with the prior embodiment, when the epoxy cures the wall-mountable shelf 1200 may be sleek and seamless such that there are no visible lines at the interfaces between the apron 1210 and the connection member 1280 and the ledge 1250. Thus, the dotted line illustrating the multiplane interface 1285 may not actually be visible.

Figure 49A:
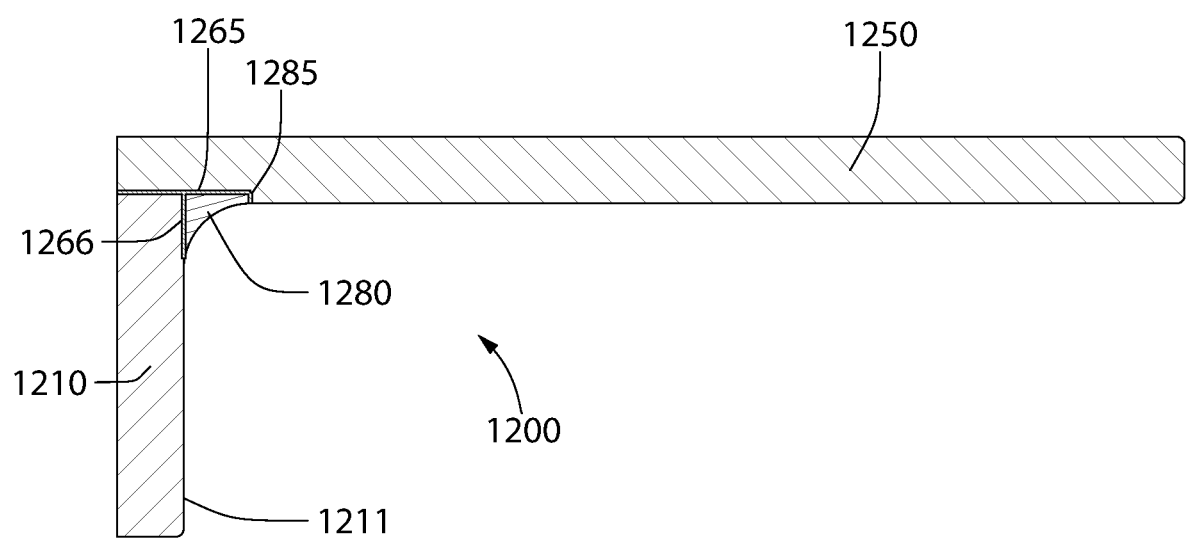
FIG. 49A is a cross-sectional view taken along line XLIX-XLIX of FIG. 47.

FIG. 49A is a cross-sectional view illustrating the apron 1210, the ledge 1250, the connection member 1280, and the various layers or coatings of adhesive. There is the multiplane adhesive 1265 which serves to bond each of the apron 1210 and the connection member 1280 to the ledge 1250. In this embodiment, there is also a layer of reactive adhesive 1266 between the vertical rear surface 1281 of the connection member 1280 and the front surface 1211 of the apron 1210. The layer of reactive adhesive 1266 may be omitted in some embodiments if the bond is sufficiently strong with the reactive adhesive 1265 only.

The various ledges and aprons described herein may be recited in the claims as first components and second components. That is, the ledge may be referred to as a first component with the apron being referred to as a second component, or the apron may be referred to as a first component with the ledge being referred to as a second component. The idea is generally that two components each formed from a brittle material (e.g., solid surface) can be bonded together effectively and capable of supporting weight when the interface between the two components is a multiplane interface. This is because brittle materials do not deform prior to failure so a complete failure of the material would be required before the two components will separate from one another. Moreover, the use of a reactive adhesive such as a two-part epoxy as described herein can be an effective adhesion material.

Figure 50:
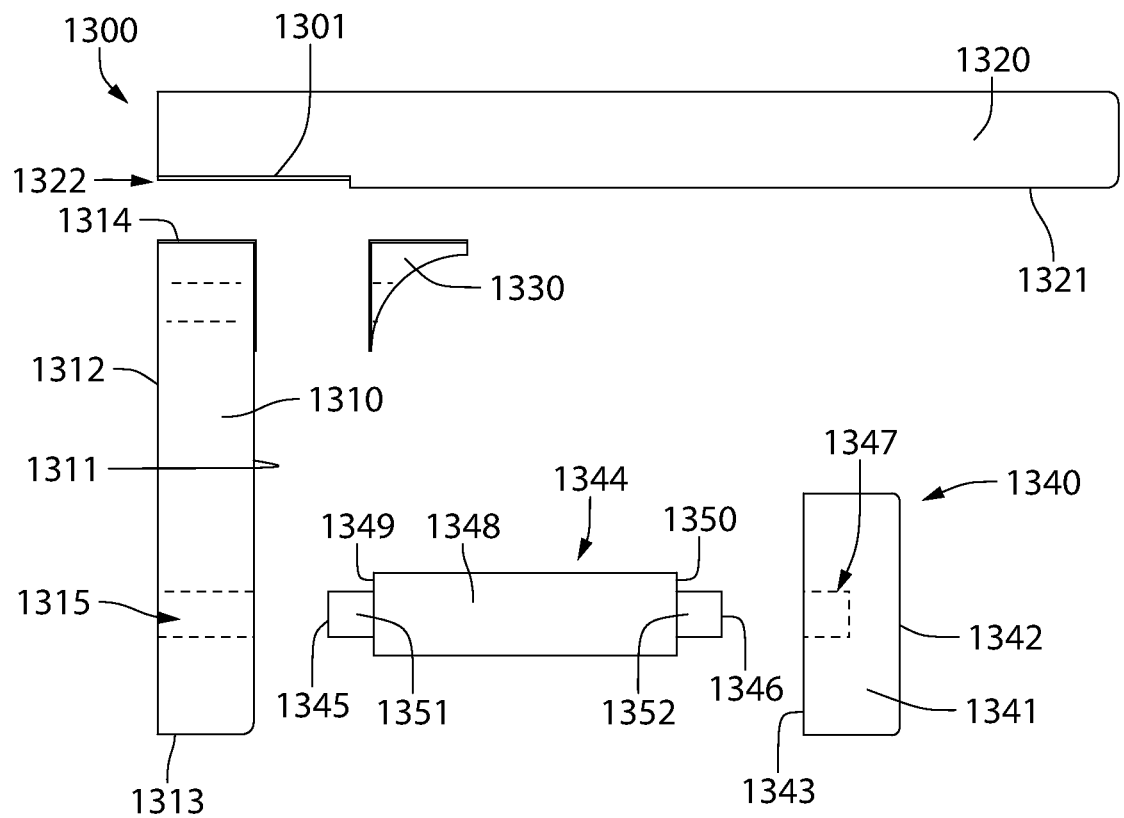
FIG. 50 is an exploded side view of the shelf of FIG. 47 with an additional hook component.
Figure 51:
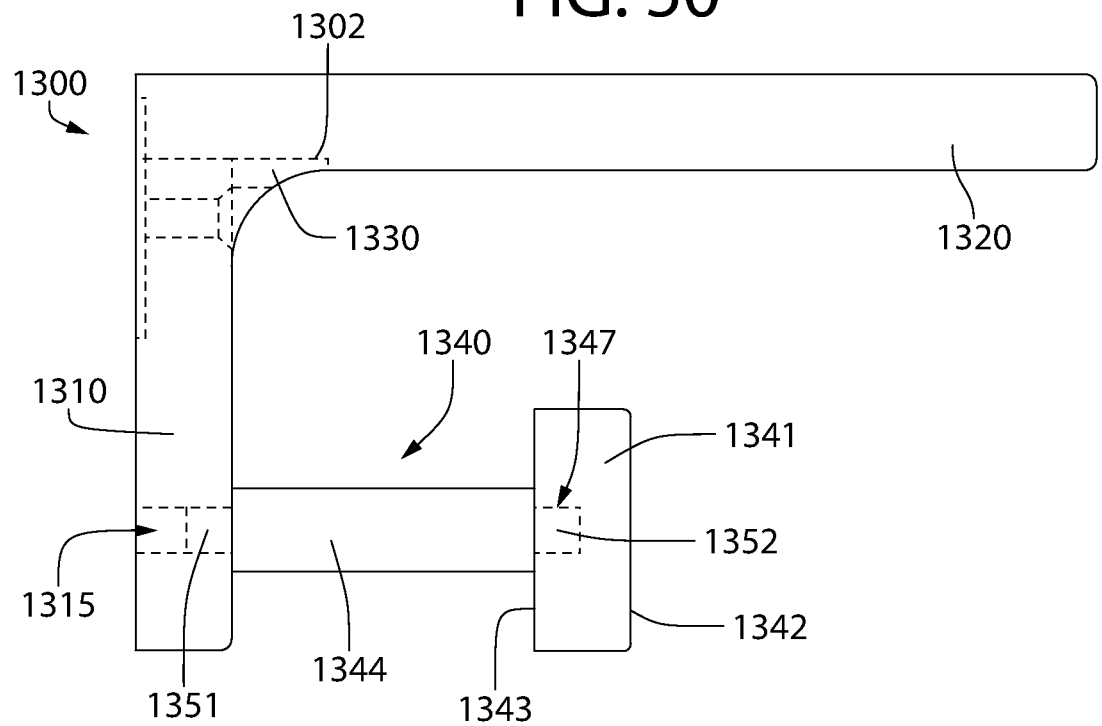
FIG. 51 is a side assembled view of the shelf of FIG. 50.
Figure 52:
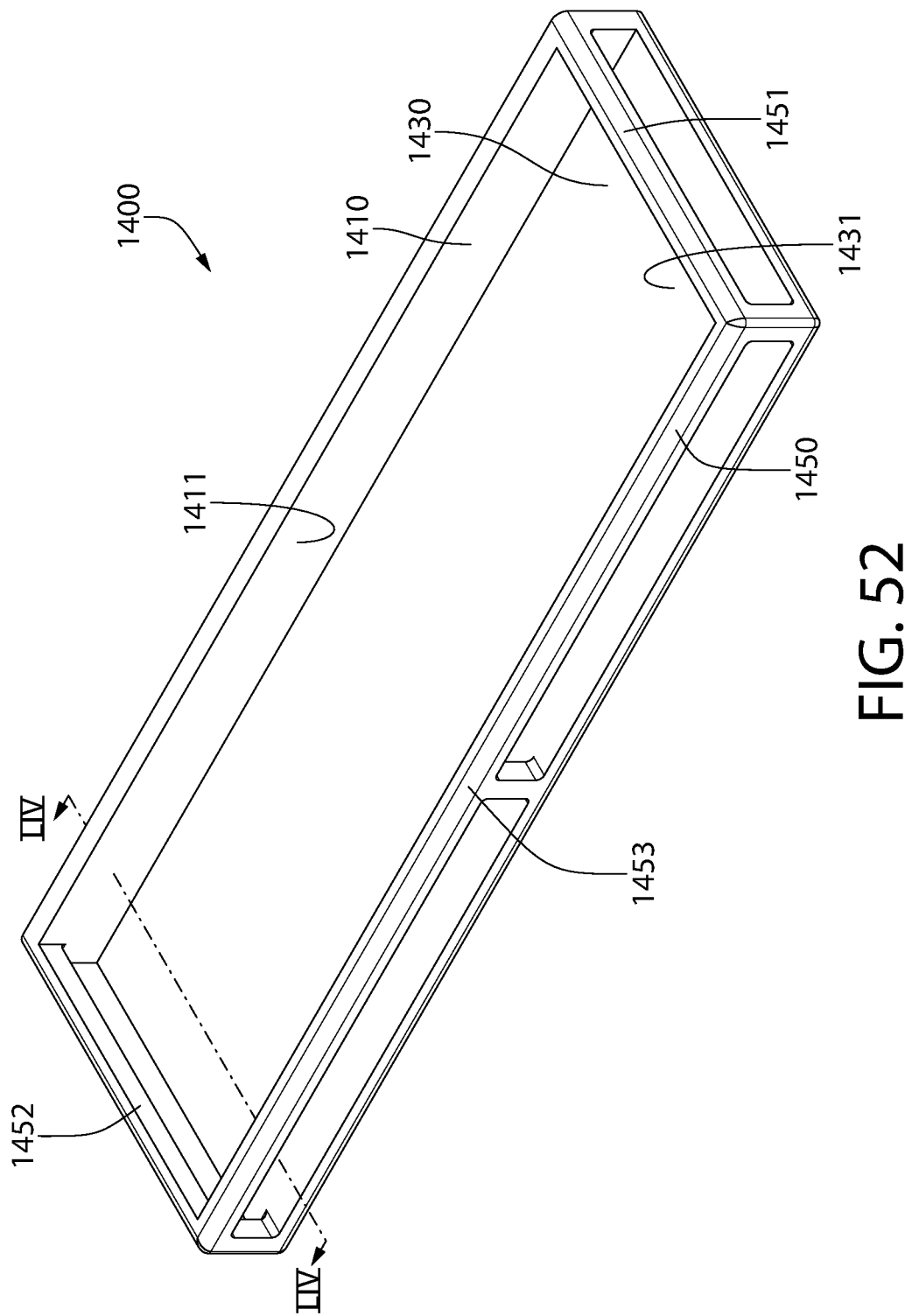
FIG. 52 is a perspective view of a shelf with a perimeter rail in accordance with an embodiment of the present invention.
Figure 53:
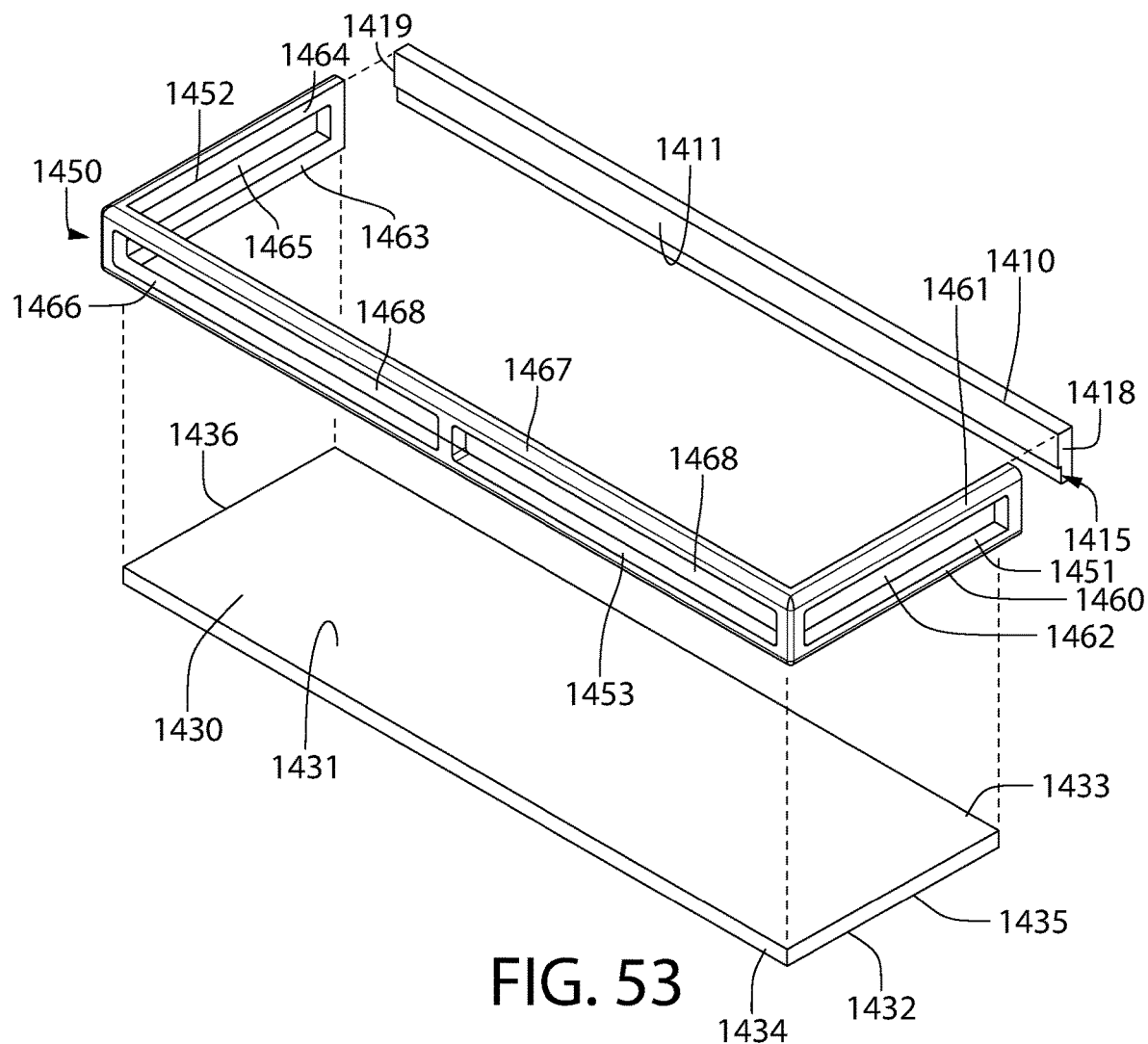
FIG. 53 is an exploded view of the shelf of FIG. 52.

FIGS. 50 and 51 illustrate a wall-mountable shelf 1300 which is identical to the wall-mountable shelf 1200 described above except for the minor additions noted herein. The wall-mountable shelf 1300 generally comprises an apron 1310, a ledge 1320, and a connection member 1330. The ledge 1320 comprises a lower surface 1321 having a recess 1322 therein. Upper portions of the apron 1310 and the connection member 1330 are located within the recess 1322 and bonded to the ledge 1320 with a reactive adhesive (e.g., a two-part epoxy adhesive) 1301. The apron 1310 and the connection member 1330 are therefore coupled to the ledge 1320 along a multiplane interface 1302 as with the prior described embodiments.

The difference between the wall-mountable shelf 1300 and the wall-mountable shelf 1200 is that the wall-mountable shelf 1300 includes a hook assembly 1340 so that articles of clothing or the like (robes, coats, hats, scarves, bags, etc.) can be hung therefrom. The hook assembly 1340 comprises a hook member 1341 having a front surface 1342 and a rear surface 1343 and a rod 1344 that is elongated between a first end 1345 and a second end 1346. The hook member 1341 and the rod 1344 may both be formed from a brittle material, including solid surface material or any of the other materials noted herein.

The rear surface 1343 of the hook member 1341 comprises a blind hole 1347. That is, in the exemplified embodiment the blind hole 1347 does not extend through the full thickness of the hook member 1340. However, the invention is not to be so limited and in other embodiments the blind hole 1347 may instead of a through-hole that extends from the front surface 1342 to the rear surface 1343. The rod 1344 comprises a main body portion 1348 that is elongated between a first end 1349 and a second end 1350, a first connection portion 1351 protruding from the first end 1349 of the main body portion 1348 to the first end 1345 of the rod 1344, and a second connection portion 1352 protruding from the second end 1350 of the main body portion 1348 to the second end 1356 of the rod 1344.

In the exemplified embodiment, the first and second connection portions 1351, 1352 have a smaller diameter than the main body portion 1348, and thus the first and second ends 1349, 1350 of the main body portion 1348 extend radially outward from the first and second connection portions 1351, 1352. In other embodiments, the rod 1344 may have a consistent diameter from the first end 1345 to the second end 1346 and the connection portions 1351, 1352 may simply be end portions of the rod 1344.

The apron 1310 has a front surface 1311, a rear surface 1312, a lower edge 1313, and an upper edge 1314. The apron 1310 further comprises a hole 1315 located adjacent to and slightly above the lower edge 1313, although the location of the hole 1315 is not to be limiting of the invention in all embodiments. In the exemplified embodiment, the hole 1315 is a through-hole that extends from the front surface 1311 to the rear surface 1312 of the apron 1310. However, the invention it not to be so limited in all embodiments and the hole 1315 could be a blind hole that extends from the front surface 1311 to a floor without extending through the full thickness of the apron 1310.

The hook assembly 1340 is mounted to the apron 1310 as follows. An adhesive (a reactive adhesive, epoxy, or the like) is coated onto the outer surface of the second connection portion 1352 of the rod 1344 and/or onto the surfaces which define the blind hole 1347 in the hook member 1341. Then, the second connection portion 1352 of the rod 1344 is inserted into the blind hole 1347 in the rod 1344 until the second end 1350 of the main body portion 1348 of the rod 1344 abuts against the rear surface 1343 of the hook member 1341. The second connection portion 1352 is maintained within the blind hole 1347 while the reactive adhesive cures or hardens to bond the rod 1344 to the hook member 1341. The rod 1344 and the hook member 1341, when bonded or otherwise coupled together, forms the hook assembly 1340. Next, an adhesive (reactive adhesive, epoxy, or the like) is coated onto the outer surface of the first connection portion 1351 of the rod 1344 and/or onto the surfaces which define the hole 1315 in the apron 1310. Then, the first connection portion 1351 of the rod 1344 is inserted into the hole 1315 in the apron 1310 and held in place as the reactive adhesive cures. This bonds the hook member 1340 to the apron 1310. The rod 1344 is positioned so that the first end 1349 of the main body portion 1348 of the rod 1344 abuts against the front surface 1311 of the apron 1310.

Thus, as seen in FIG. 51, this forms the wall-mountable shelf 1300 with an added hook assembly 1340 protruding from a lower portion of the apron 1310 so that a user can hang any of carious items therefrom. The attachment of the hook assembly 1340 and the apron 1310 is strong due to the adhesive, and particularly the reactive adhesive or two-part epoxy used for the bonding. However, other adhesives may be used in other embodiments depending on the weight bearing load needed for the hook assembly 1340. The disclosure set forth herein allows for the creation of a wall-mountable shelf 1300 with incorporated hook assembly 1340 that is made entirely from a brittle material, such as solid surface. However, because solid surface material can be made in an infinite number of colors and ornamentations, the different components can be made with different colors, patterns, or the like to create a desired end-aesthetic which is readily modifiable to allow for custom creations.

Referring to FIGS. 52-54A, a wall-mountable shelf 1400 is illustrated in accordance with another embodiment of the present invention. The wall-mountable shelf 1400 comprises an apron 1410, a ledge 1430, and a perimeter rail 1450. The perimeter rail 1450 extends along a periphery of the ledge 1430 to help retain items on the ledge 1430 so that they cannot simply roll off the edge of the ledge 1430. The apron 1410, the ledge 1430, and the perimeter rail 1450 may all be formed from a brittle material such as any of the materials described above. In some embodiments, the apron 1410, the ledge 1430, and the perimeter rail 1450 may be formed from a solid surface material.

The apron 1410 comprises a front surface 1411, a rear surface 1412, a lower edge 1413, an upper edge 1414 a first side edge 1418, and a second side edge 1419. The apron 1410 is elongated in a direction between the first and second side edges 1418, 1419. Furthermore, the front surface 1411 of the apron 1410 comprises a recess 1415 that extends from the lower edge 1413 to an end wall 1416. Thus, the recess 1415 is defined by a floor 1417 which is recessed relative to a remainder of the front surface 1411 and the end wall 1416 which extends from the floor 1417 to the front surface 1411. The recess 1415 is elongated and extends the full distance between the first and second side edges 1418, 1419 of the apron 1410. Stated another way, the recess 1415 is open at each of the first and second side edges 1418, 1419.

The ledge 1430 is a flat plate-like structure having an upper surface 1431, a lower surface 1432, a rear edge 1433, a front edge 1434, a first side edge 1435, and a second side edge 1436. The upper and lower surfaces 1431, 1432 are flat, planar surfaces to facilitate the ledge 1430 supporting items thereon. The ledge 1430 is coupled to the apron 1410 by nesting a rear-most portion of the ledge 1430 which includes the rear edge 1433 into the recess 1415. The rear edge 1433 of the ledge 1430 will interface with the floor 1417 of the recess 1415 and a rearmost portion 1435 of the upper surface 1431 of the ledge 1430 will interface with the end wall 1416 of the recess 1415, thereby creating a multiplane interface 1490. As discussed above, the term interface is used here because the various surfaces are separated from one another by a bonding agent, such as a reactive adhesive, epoxy adhesive, or the like. Thus, the various surfaces are not in direct abutment or engagement, but they interface with one another.

Figure 54:
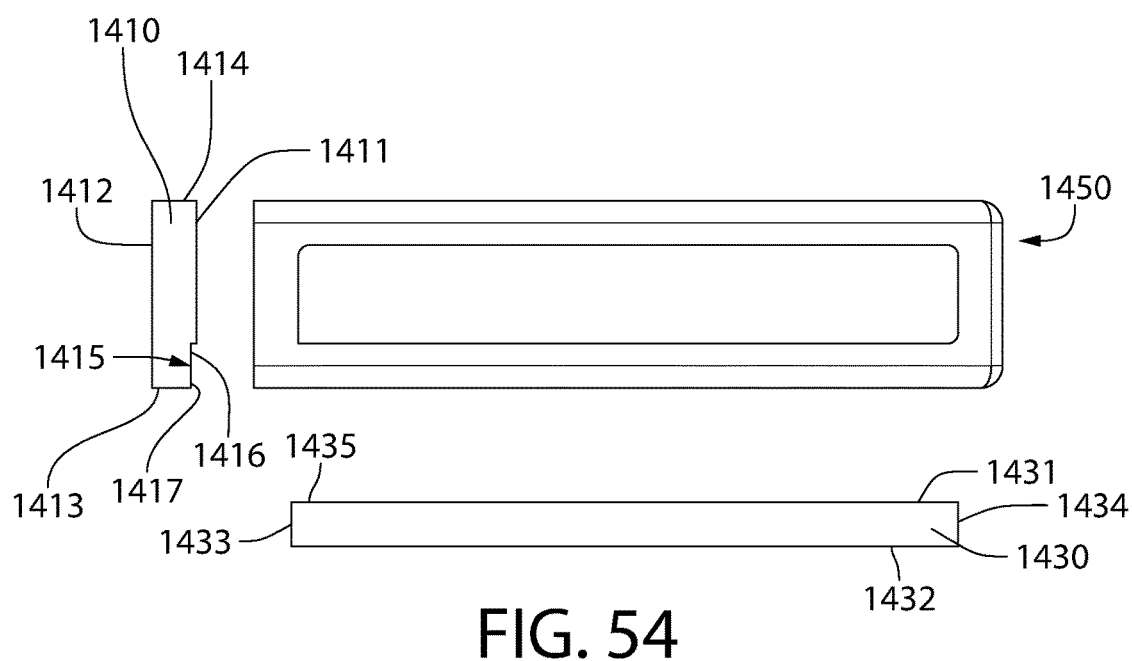
FIG. 54 is an exploded side view of the shelf of FIG. 52.
Figure 54A:
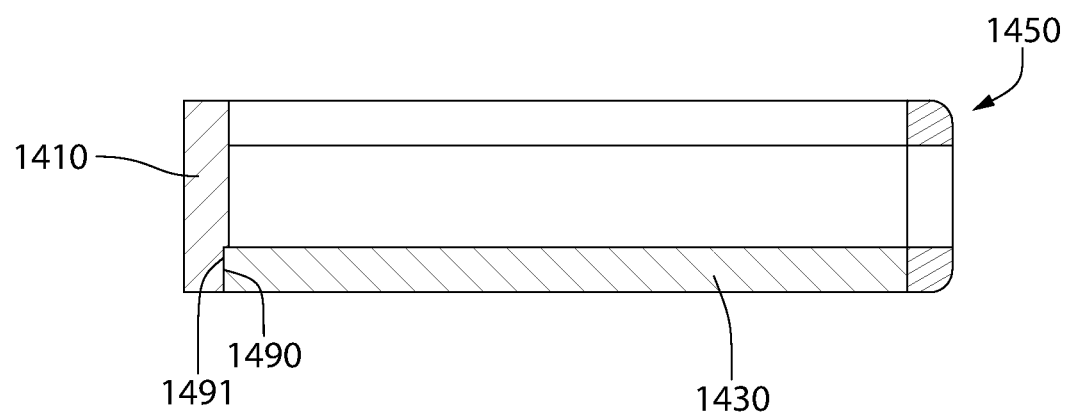
FIG. 54A is a cross-sectional view taken along line LIV-LIV of FIG. 52.

FIG. 54A illustrates the reactive adhesive or epoxy or other bonding agent 1491 positioned between the interfacing surfaces of the ledge 1430 and the apron 1410. FIG. 54A also best illustrates the multiplane interface 1490 which includes a vertical interface between the rear edge 1433 of the ledge 1430 and the floor 1417 of the recess 1415 and a horizontal interface between the rearmost portion 1435 of the upper surface 1431 of the ledge 1430 and the end wall 1416 of the recess 1415. Because the ledge 1430 and the apron 1410 are formed from a brittle material that will not deform prior to failure, a downward force on the ledge 1430 will not separate the ledge 1430 from the apron 1410 due to the engagement between the rearmost portion 1435 of the upper surface 1431 of the ledge 1430 and the end wall 1416 of the recess 1415. Thus, this structural arrangement creates an extremely strong bond that is incredibly structural and very unlikely to fail.

As noted above, this embodiment also includes the perimeter rail 1450. It should be noted that the perimeter rail 1450 could be omitted in some embodiments and the wall-mountable shelf 1400 could include only the apron 1410 and the ledge 1430. The perimeter rail 1450 comprises a first side rail 1451, a second side rail 1452, and a front rail 1453. The first side rail 1451, the second side rail 1452, and the front rail 1453 may be separate and distinct components in some embodiments, although they could be formed as a unitary part in other embodiments. In the exemplified embodiment, each of the first side rail 1451, the second side rail 1452, and the front rail 1453 is formed as a solid sheet which is then carved to create an opening therein. This gives each of the first side rail 1451, the second side rail 1452, and the front rail 1453 the appearance of being simply a single bar rather than a full rectangular piece. However, each of the first side rail 1451, the second side rail 1452, and the front rail 1453 is a rectangular piece in order to facilitate the attachment to the ledge 1430 and/or the apron 1410.

Thus, the first side rail 1451 comprises a lower rail portion 1460, an upper rail portion 1461, and an opening 1462 extending between the lower and upper rail portions 1460, 1461. The opening 1462 is elongated such that the upper and lower rail portions 1460, 1461 have a rectangular shape with a central opening. The second side rail 1452 comprises a lower rail portion 1463, an upper rail portion 1464, and an opening 1465 extending between the lower and upper rail portions 1463, 1464. The opening 1465 is elongated such that the upper and lower rail portions 1460, 1461 have a rectangular shape with a central opening. The front rail 1453 has a lower rail portion 1466, an upper rail portion 1467, and a pair of openings 1468. That is, because the front rail 1453 is longer than the side rails, an additional vertical support post is included between the pair of openings 1468. Depending on the length of the front rail 1453, the support post could be included or omitted.

The first side rail 1451 is coupled to the first side edge 1435 of the ledge 1430, the second side rail 1452 is coupled to the second side edge 1436 of the ledge 1430, and the front rail 1453 is coupled to the front edge 1434 of the ledge 1430. In the exemplified embodiment, the coupling of the rails to the ledge 1430 is achieved with an adhesive, more specifically a reactive adhesive such as epoxy or the like. However, other materials could be used including single component adhesives or the like particularly because the perimeter rail 1450 is not intended to support any loads. In the exemplified embodiment, the lower rail portions 1460, 1463, 1466 of each of the first side rail 1451, the second side rail 1452, and the front rail 1453 is bonded directly to a portion of the edge of the ledge 1430 with a bonding agent such as described herein. The first and second side rails 1451, 1452 may also be bonded to the apron 1410, and more particularly to the first and second side edges 1418, 1419 of the apron 1410.

The lower rail portions 1460, 1463, 1466 of the first side rail 1451, the second side rail 1452, and the front rail 1453 are flush with the ledge 1430 which gives a seamless appearance. Then, there are posts extending from the lower portions of the first side rail 1451, the second side rail 1452, and the front rail 1453 to the upper rail portions 1461, 1464, 1467 of the first side rail 1451, the second side rail 1452, and the front rail 1453. The upper rail portions 1461, 1464, 1467 of the first side rail 1451, the second side rail 1452, and the front rail 1453 form bars that are elevated relative to the ledge 1430 which gives the appearance that the upper rail portions 1461, 1464, 1467 and posts protrude directly from the ledge 1430. Thus, while the wall-mountable shelf 1400 is formed from several distinct components, once assembled the wall-mountable shelf 1400 is a beautiful piece with seamless lines and infinite design options due to the opportunities to make use of solid surface and other brittle materials.

Figure 55:
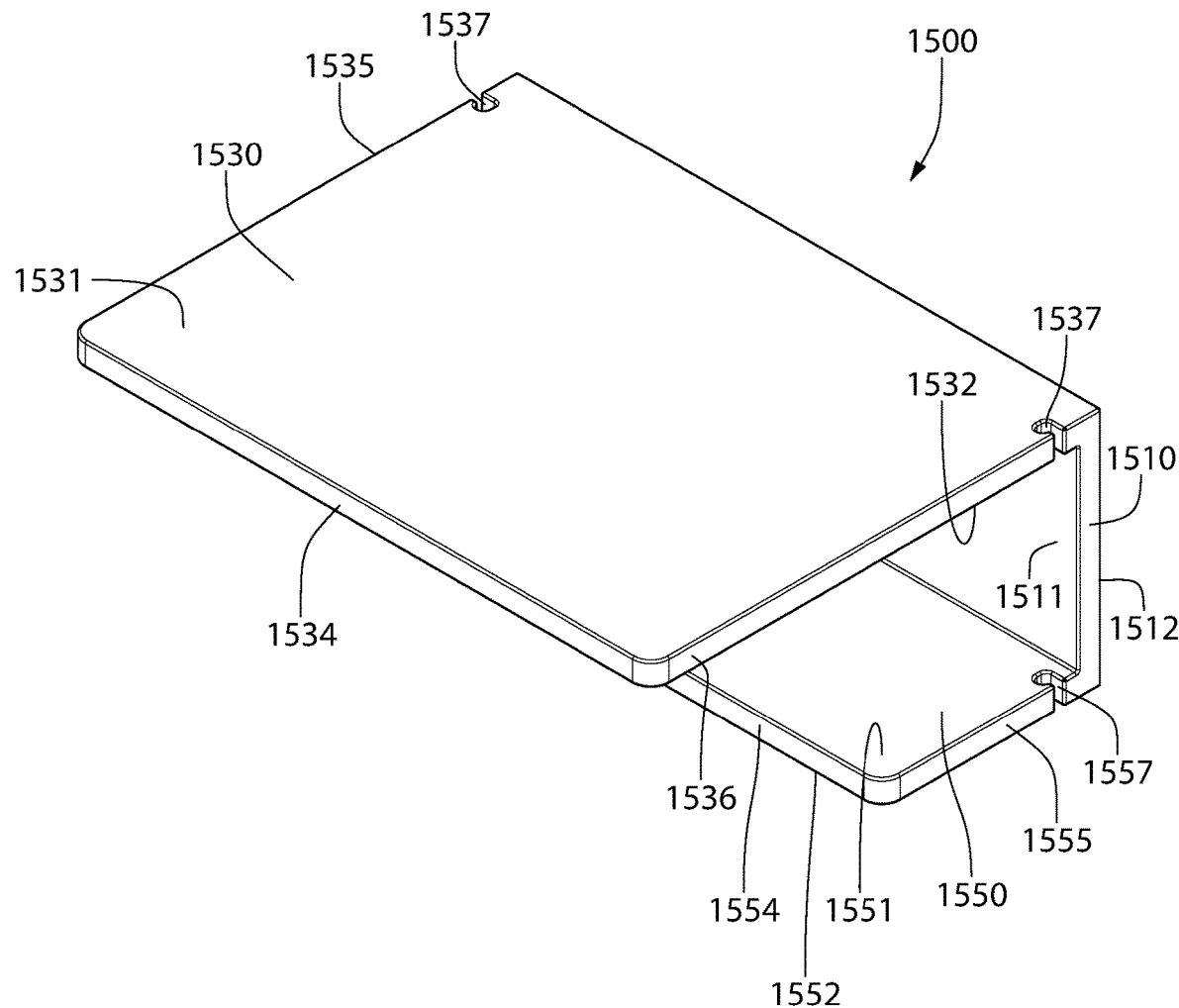
FIG. 55 is a front perspective view of a hot beverage center in accordance with an embodiment of the present invention.
Figure 56:
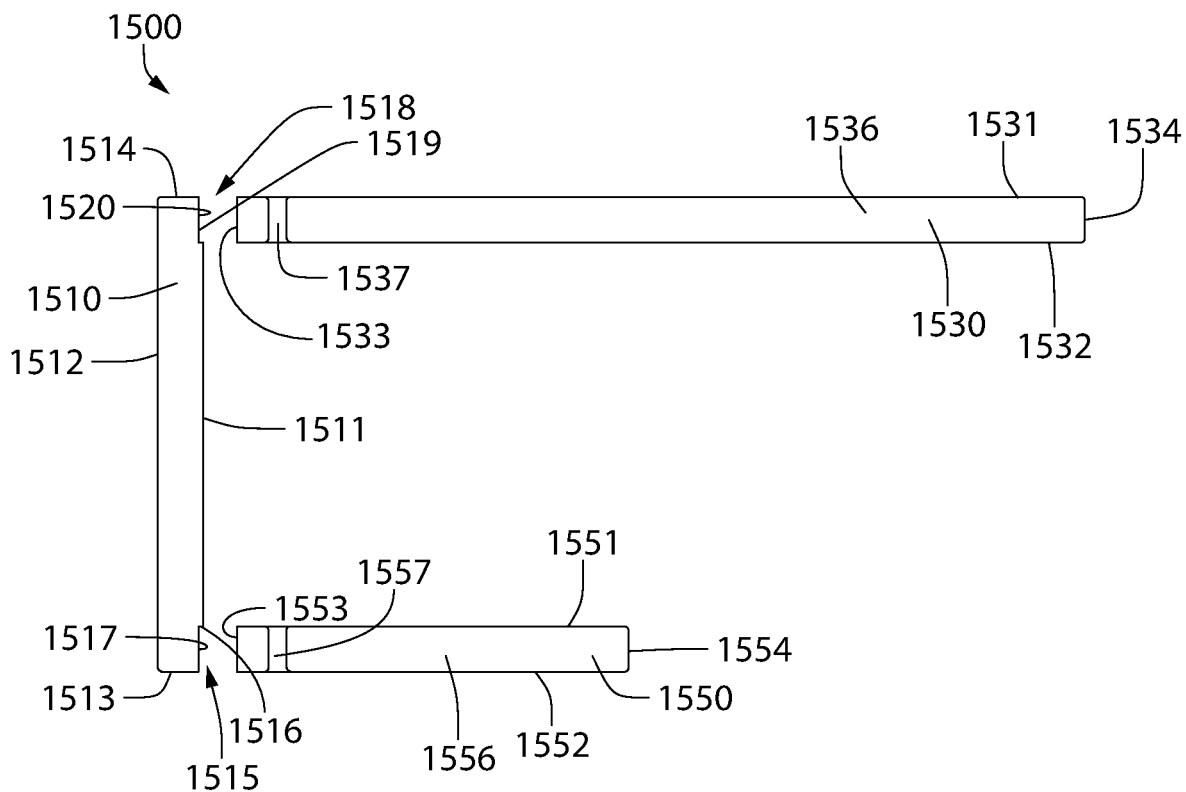
FIG. 56 is an exploded side view of the hot beverage center of FIG. 55.
Figure 57:
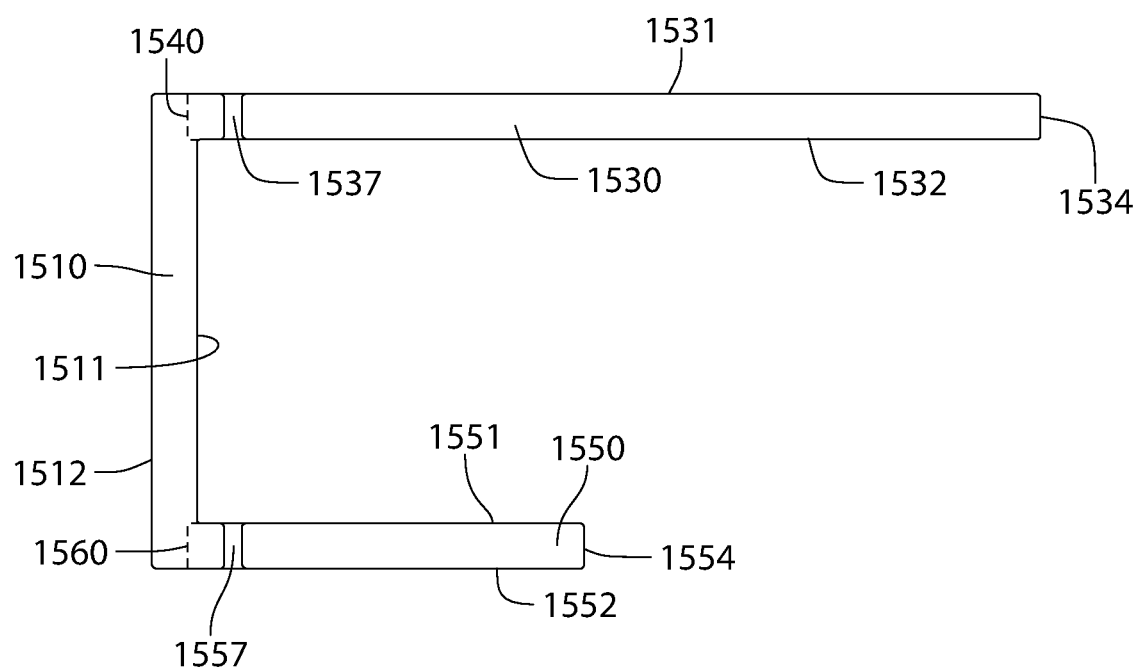
FIG. 57 is an assembled side view of the hot beverage center of FIG. 55.
Figure 58:
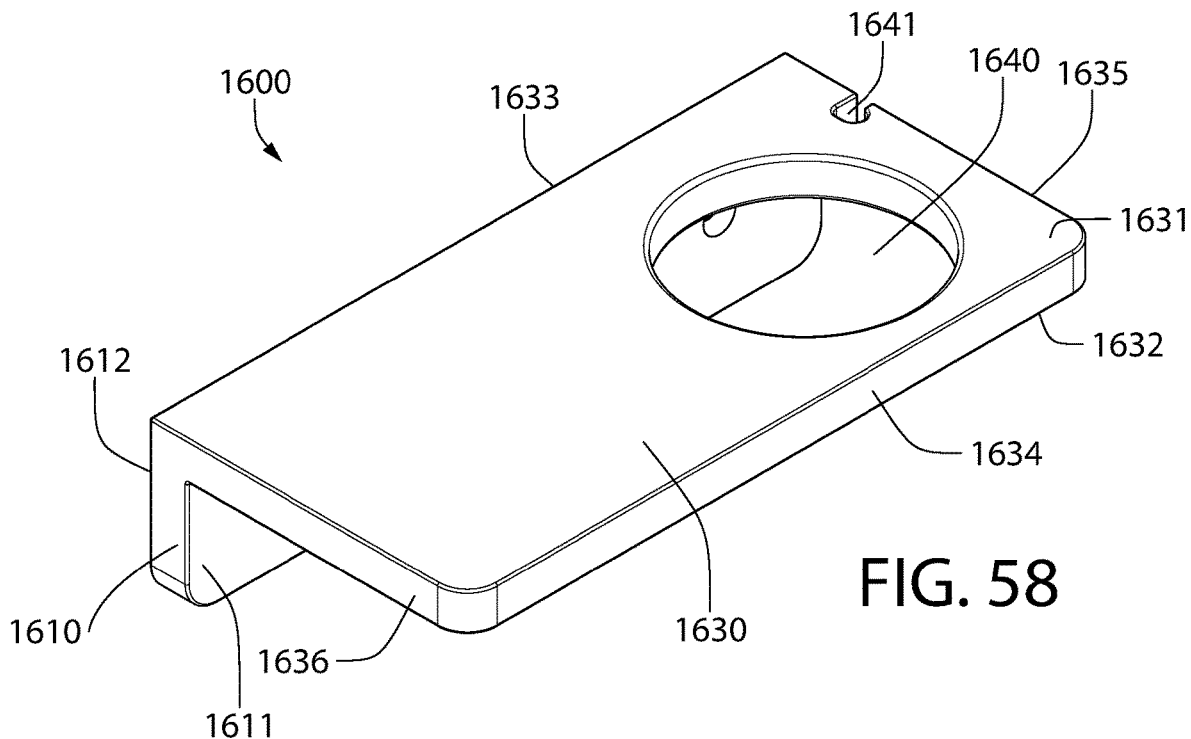
FIG. 58 is a front perspective view of a hair dryer holder in accordance with an embodiment of the present invention.
Figure 59:
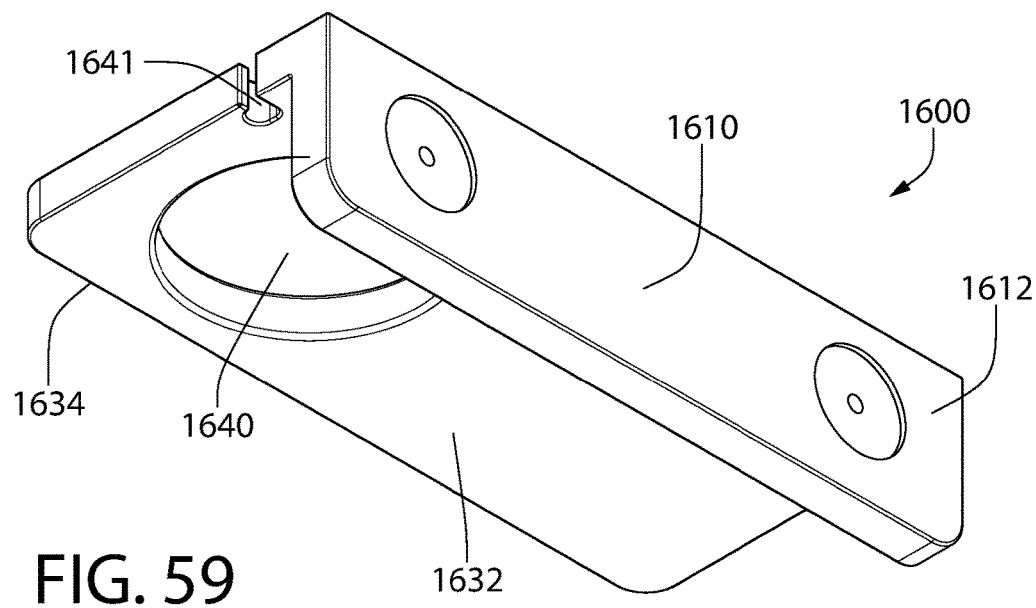
FIG. 59 is a rear perspective view of the hair dryer holder of FIG. 58.
Figure 60:
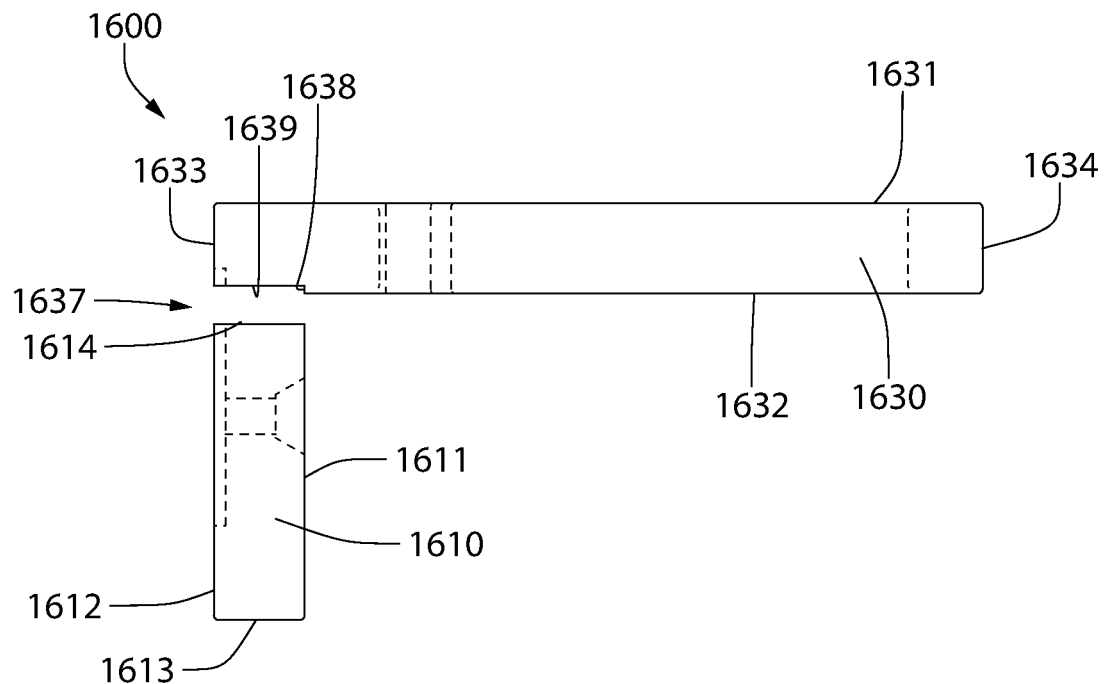
FIG. 60 is an exploded side view of the hair dryer holder of FIG. 58.
Figure 61:
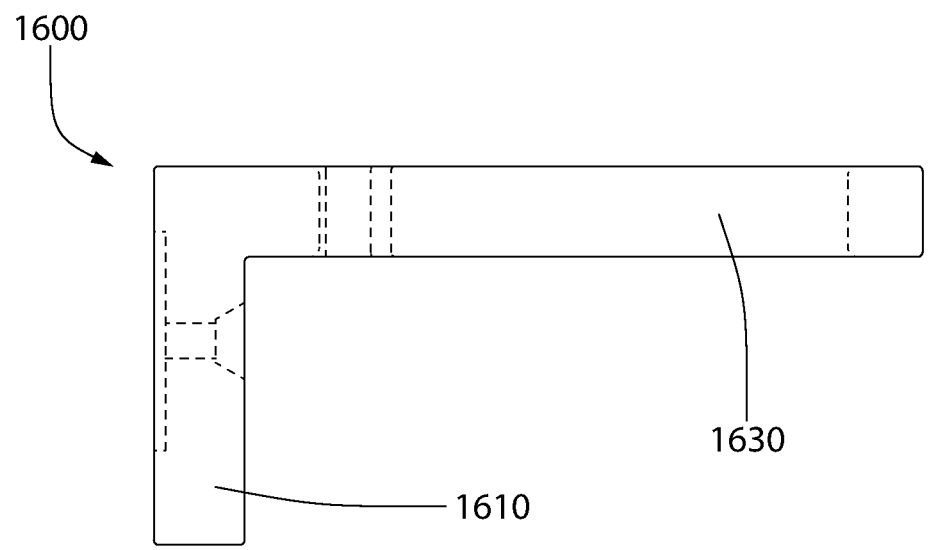
FIG. 61 is an assembled side view of the hair dryer holder of FIG. 58.

FIGS. 55-57 illustrate a wall-mountable shelf 1500 in accordance with another embodiment of the present invention. The wall-mountable shelf 1500 may function as a hot beverage center such as in a hotel or the like. That is, the wall-mountable shelf 1500 comprises an apron 1510, an upper ledge 1530, and a lower ledge 1550. The upper ledge 1530 may be configured to support a first set of items, such as a coffee maker. The lower ledge 1550 may be configured to support a second set of items, such as coffee mugs, coffee and tea ingredients, and the like. The concepts described above with reference to the wall-mountable shelves 1100, 1200, 1300, 1400 may be used for the wall-mountable shelf 1500. The apron 1510, the upper ledge 1530 and the lower ledge 1550 may each be formed from a brittle material, such as a solid surface material or any of the other materials noted herein.

In the exemplified embodiment, the apron 1510 comprises a front surface 1511, a rear surface 1512, a top edge 1513, and a bottom edge 1514. Furthermore, the apron 1510 comprises a first recess 1515 extending from the bottom edge 1514 to a first end wall 1516, the first recess 1515 having a floor 1517 which is recessed relative to the front surface 1511. The apron 1510 also comprises a second recess 1518 extending from the top edge 1513 to a second end wall 1519, the second recess 1518 having a floor 1520 which is recessed relative to the front surface 1511. Each of the first and second recesses 1515, 1518 may extend the full length of the apron 1510 between first and second side edges of the apron 1510.

The upper ledge 1530 comprises an upper surface 1531, a lower surface 1532, a rear edge 1533, a front edge 1534, a first side edge 1535, and a second side edge 1536. The first and second side edges 1535, 1536 each comprise a notch 1537 that is configured to receive a wire of an electrical appliance to maintain organization of the wire. The notch 1537 is located along the first and side edges 1535, 1536 adjacent to the rear edge 1533, although the exact location of the notch 1537 along the first and second side edges 1535, 1536 is not to be limiting in all embodiments. The positioning as shown is optimal due to electrical wires typically extending from the rear of various electrical appliances (such as coffee makers or the like).

The upper ledge 1530 is coupled to the apron 1510 is much the same manner as the previous embodiments. That is, the floor 1520 and second end wall 1519 of the recess 1518 and/or the rear edge 1533 and a rearmost portion of the lower surface 1532 of the upper ledge 1530 are coated with a reactive adhesive such as a two-part epoxy or the like. The rearmost portion of the upper ledge 1530 is then inserted into the recess 1518 so that the rear edge 1533 of the ledge 1530 interfaces with the floor 1520 of the second recess 1518 and the rearmost portion of the lower surface 1532 of the upper ledge 1530 interfaces with the second end wall 1519 of the second recess 1518. Due to the brittle nature of the materials of the components, the upper ledge 1530 will not separate from the apron 1510 without a total failure of either the upper ledge 1530, the apron 1510, or the reactive adhesive positioned between the two components to bond them together. The upper ledge 1530 is coupled to the apron 1510 along a multiplane interface 1540 as denoted in dashed lines in FIG. 57. The multiplane interface 1540 includes a vertical component and a horizontal component. The dashed line is for exemplary purposes only and is not visible in the actual assembled product which has a seamless aesthetic as shown in FIG. 55.

The lower edge 1550 comprises an upper surface 1551, a lower surface 1552, a rear edge 1553, a front edge 1554, a first side edge 1555, and a second side edge 1556. There is a notch 1557 located in each of the first and second side edges 1555, 1556, with the notch 1557 being aligned with the notch 1537 in the upper ledge 1530. The notches 1557 are also configured to receive an electrical wire of an electrical appliance to maintain organization of the wiring. The notches 1557 are located adjacent to the rear edge 1553 but could be located elsewhere along the first and second side edges 1555, 1556 in other embodiments.

The lower edge 1550 is coupled to the apron 1510 by positioning a rear portion of the lower ledge 1550 within the first recess 1515 of the apron 1510 so that the rear edge 1553 of the lower ledge 1550 interfaces with the floor 1517 o the first recess 1515 and the rearmost portion of the upper surface 1551 interfaces with the first end wall 1516 of the first recess 1515. As with the other embodiments, a reactive adhesive (e.g., a two-component epoxy or the like) is coated onto either the floor 1517 and the first end wall 1516 of the first recess 1515, the rear edge 1553 and the rearmost portion of the upper surface 1551 of the lower ledge 1550, or both. The reactive adhesive bonds the lower ledge 1550 to the apron 1510 as described above. In the exemplified embodiment, the lower ledge 1550 is bonded to the apron 1510 along a multiplane interface 1560 which includes a vertical component and a horizontal component. The multiplane interface 1560 is illustrated in dashed lines in FIG. 57. The dashed line is for exemplary purposes only and is not visible in the actual assembled product which has a seamless aesthetic as shown in FIG. 55.

FIGS. 58-61 illustrates a wall-mountable shelf 1600 in accordance with another embodiment of the present invention. The wall-mountable shelf 1600 is identical to the wall-mountable shelf 1100 except for the differences noted below. The wall-mountable shelf 1600 comprises an apron 1610 and a ledge 1630. The apron 1610 and the ledge 1630 are both preferably formed from a brittle material, such as for example without limitation a solid surface material (other possible materials are discussed throughout this document). The ledge 1630 has an upper surface 1631, a lower surface 1632, a rear edge 1633, a front edge 1634, a first side edge 1635, and a second side edge 1636. The lower surface 1632 of the ledge 1630 comprises a recess 1637 that extends from the rear edge 1633 to an end wall 1638. The recess 1637 has a floor 1639 that is recessed relative to the lower surface 1632.

The apron 1610 has a front surface 1611, a rear surface 1612, a bottom edge 1613, and a top edge 1614. The top edge 1614 and an uppermost portion of the front surface 1611 are positioned in the recess 1637 so that the top edge 1614 of the apron 1610 interfaces with the floor 1639 of the recess 1637 and the uppermost portion of the front surface 1611 of the apron 1610 interfaces with the end wall 1638 of the recess 1637. An adhesive, and more specifically a reactive adhesive such as an epoxy adhesive is positioned between the apron 1610 and the ledge 1630 to facilitate the bonding of the apron 1610 to the ledge 1630. While the reactive adhesive is not depicted in this embodiment, it should be appreciated that it is exactly as described and illustrated with reference to the wall-mountable shelf 1100.

The main difference between the wall-mountable shelf 1600 and the wall-mountable shelf 1100 previously described is that the ledge 1630 comprises an aperture 1640 that extends from the upper surface 1631 to the lower surface 1632. The aperture 1640 has a diameter that is sufficient to enable a blower portion of a hair dryer to fit therethrough. Thus, the ledge 1630 is specifically configured for holding a hair dryer, and thus the wall-mountable shelf 1600 may be configured to function as a hair dryer holder. Furthermore, the first side edge 1635 comprises a notch

1641 so that a wire of the hair dryer can nest therein to maintain organization of the wire as it extends from the hair dryer to an outlet or plug. The aperture 1640 is located closer to the first side edge 1635 than to the second side edge 1636.

Figure 62:
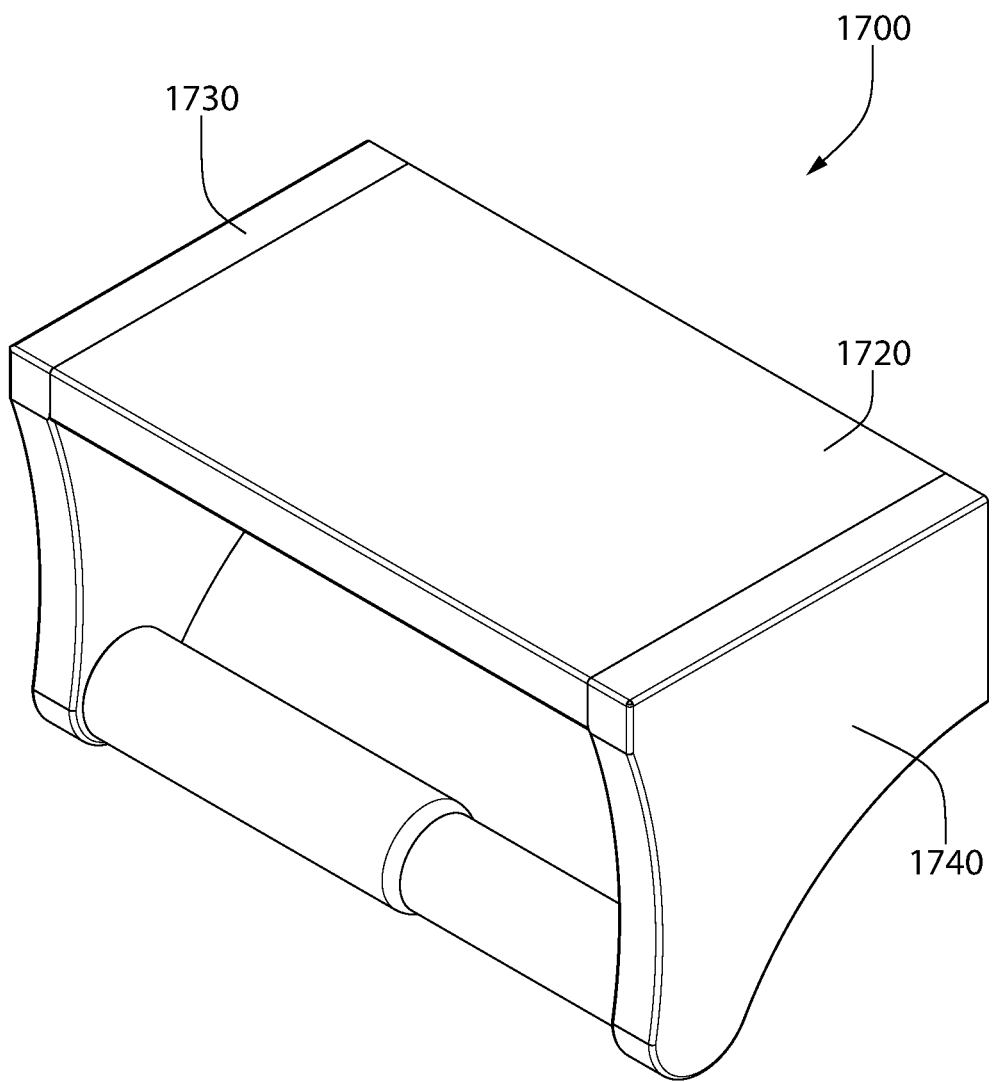
FIG. 62 is a front perspective view of a toilet paper holder in accordance with an embodiment of the present invention.
Figure 63:
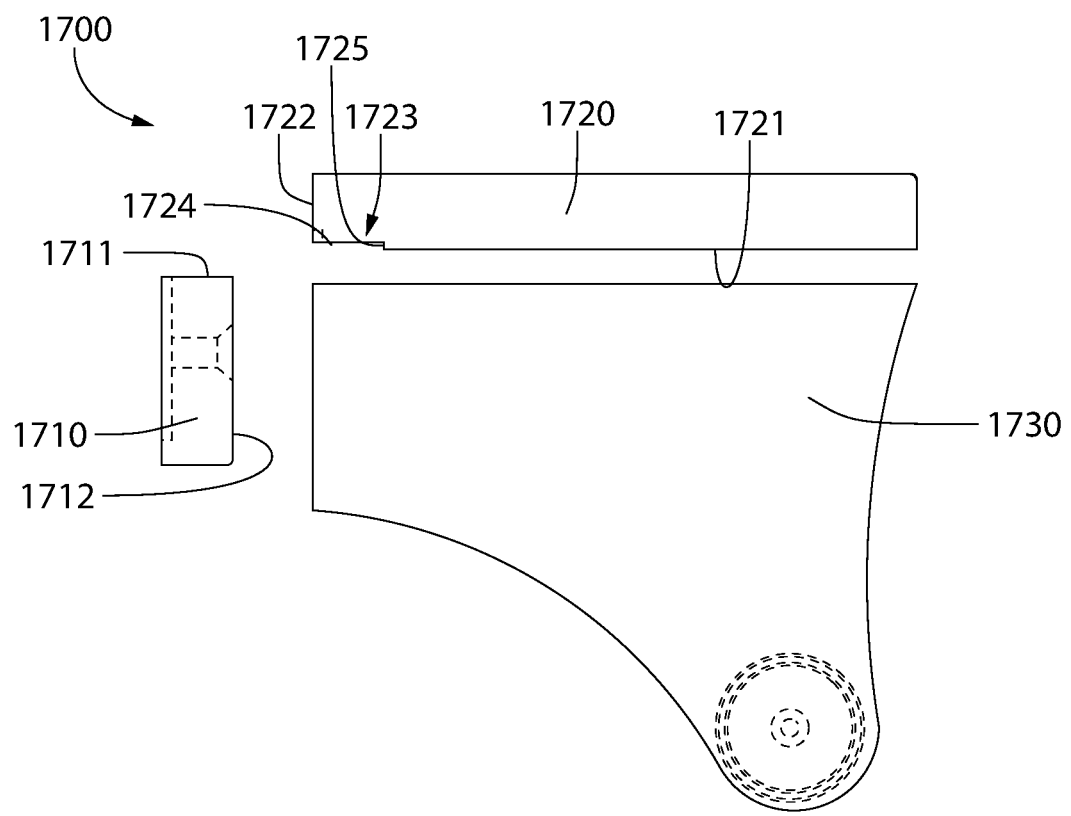
FIG. 63 is an exploded side view of the toilet paper holder of FIG. 62.
Figure 64:
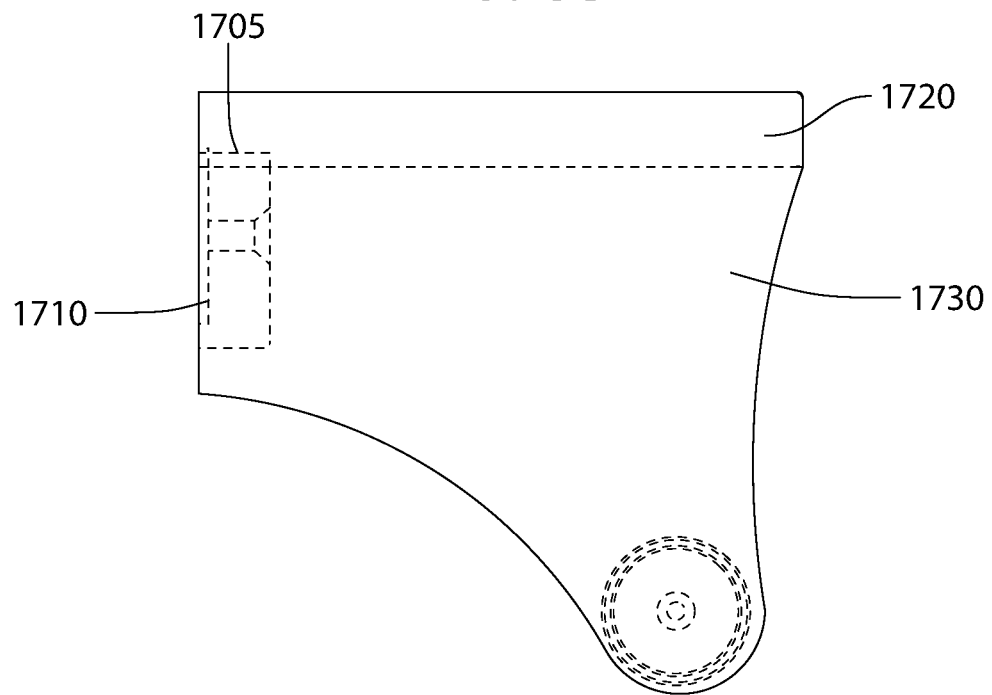
FIG. 64 is an assembled side view of the toilet paper holder of FIG. 62.

Referring to FIGS. 62-64, a wall-mountable shelf or accessory 1700 is illustrated in accordance with another embodiment of the present invention. The wall-mountable shelf or accessory 1700 is configured as a toilet paper holder with a shelf that can function as a phone tray or support for other small items as may be desired. The wall-mountable shelf or accessory 1700 generally comprises an apron 1710, a ledge 1720, a first sidewall 1730, and a second sidewall 1740. Each of the apron 1710, the ledge 1720, and the first and second sidewalls 1730, 1740 may be formed from a brittle material such as a solid surface material or the like as described herein. The various components may be coupled together with a reactive adhesive such as a two-part epoxy adhesive as described above with reference to the earlier described embodiments.

In this embodiment, the ledge 1720 comprises a lower surface 1721, a rear edge 1722, and a recess 1723 in the lower surface 1721 adjacent to the rear edge 1722. The recess 1723 is defined by a floor 1724 and an end wall 1725. An upper portion of the apron 1710 nests within the recess 1723 such that an upper edge 1711 of the apron interfaces with the floor 1724 of the recess 1723 and an uppermost portion of a front surface 1712 of the apron 1710 interfaces with the end wall 1725 of the recess 1723. The floor 1724 and end wall 1725 of the recess 1723 may be coated with an adhesive such as a reactive adhesive (e.g., epoxy) and/or the upper edge 1711 and the uppermost portion of the front surface 1712 of the apron 1710 may be coated with a reactive adhesive to facilitate bonding of the apron 1710 to the ledge 1720.

In this embodiment, the first and second sidewalls 1730, 1740 are bonded to opposing side edges of the ledge 1720 so that upper surfaces of the first and second sidewalls 1730, 1740 are flush with the upper surface of the ledge 1720. Moreover, a spring-loaded toilet paper roller is coupled to and extends between inner surfaces of the first and second sidewalls 1730, 1740. Thus, the wall-mountable shelf or accessory 1700 functions as a toilet paper holder, but also has a shelf or ledge for storing items thereon. The concepts described herein with regard to the brittle material lacking deformation prior to failure ensures that the apron 1710 and ledge 1720 remain bonded together even when the ledge 1720 is supporting a load. The apron 1720 and the ledge 1720 are bonded together along a multiplane interface 1705 which includes a vertical component and a horizontal component and is best shown in FIG. 64.

Figure 65:
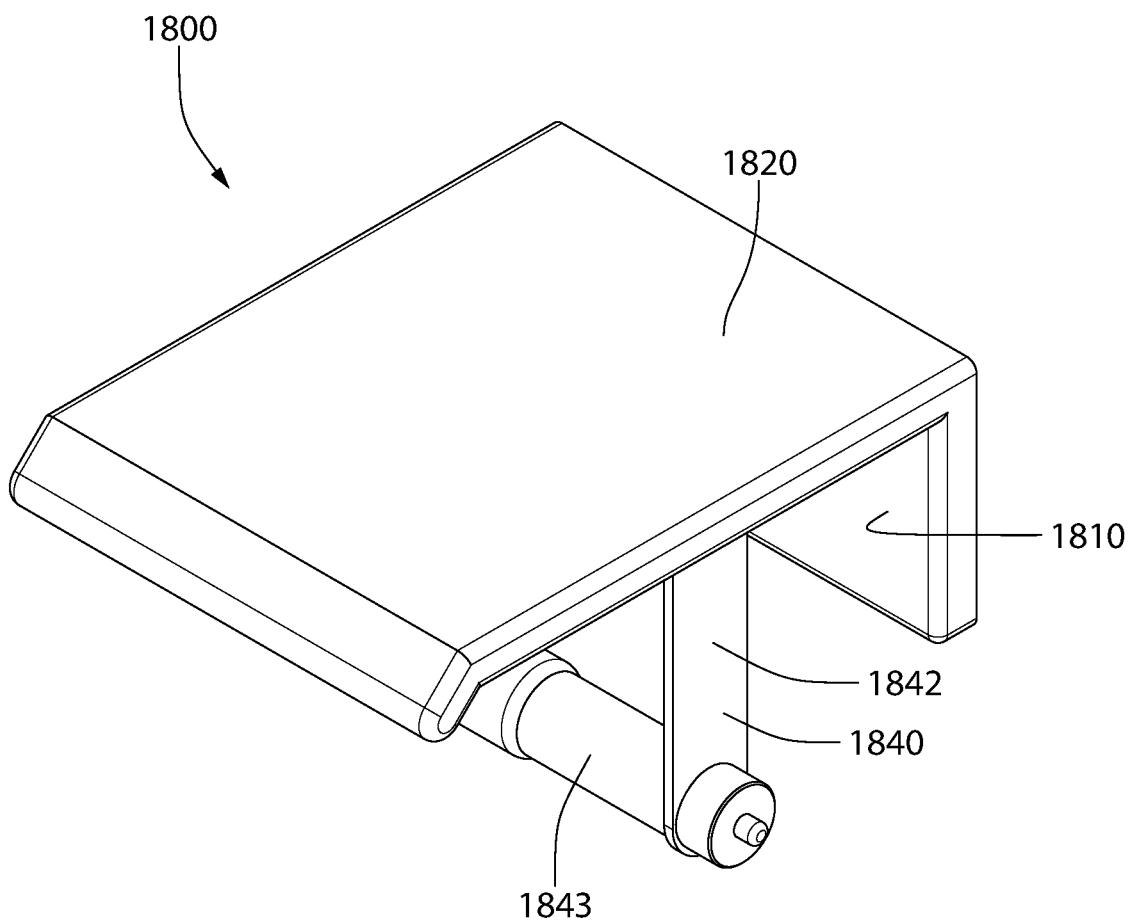
FIG. 65 is a front perspective view of a toilet paper holder in accordance with another embodiment of the present invention.
Figure 66:
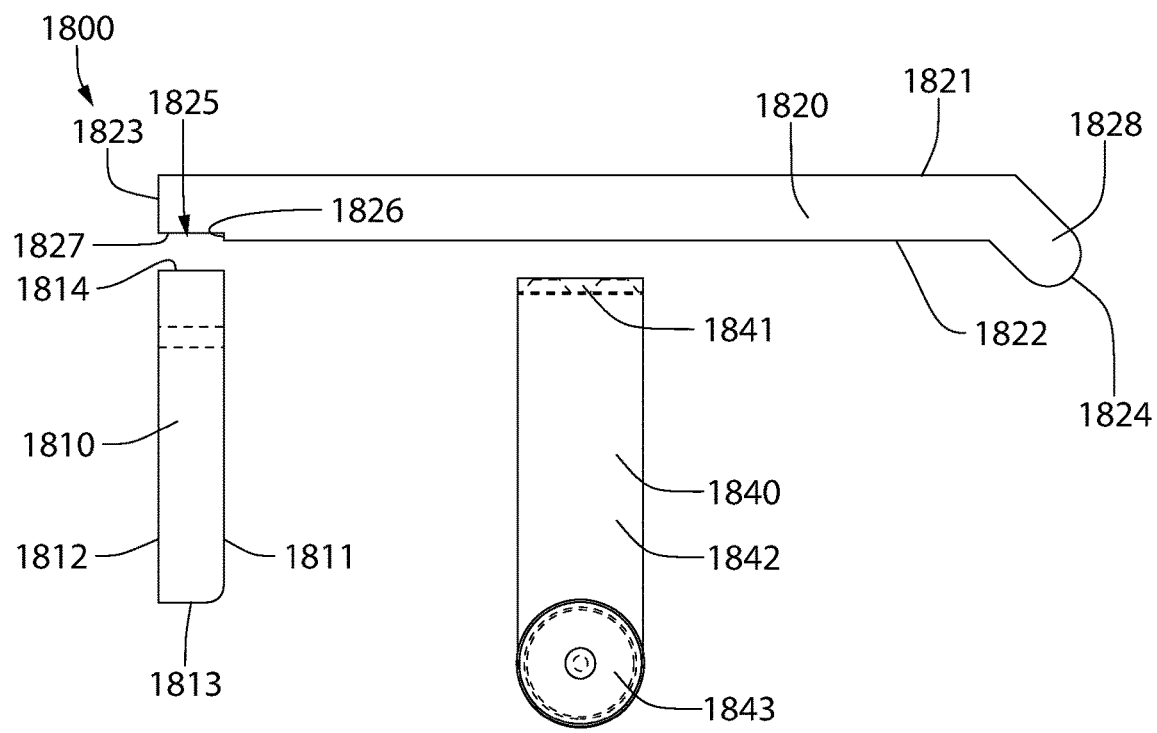
FIG. 66 is an exploded side view of the toilet paper holder of FIG. 65.
Figure 67:
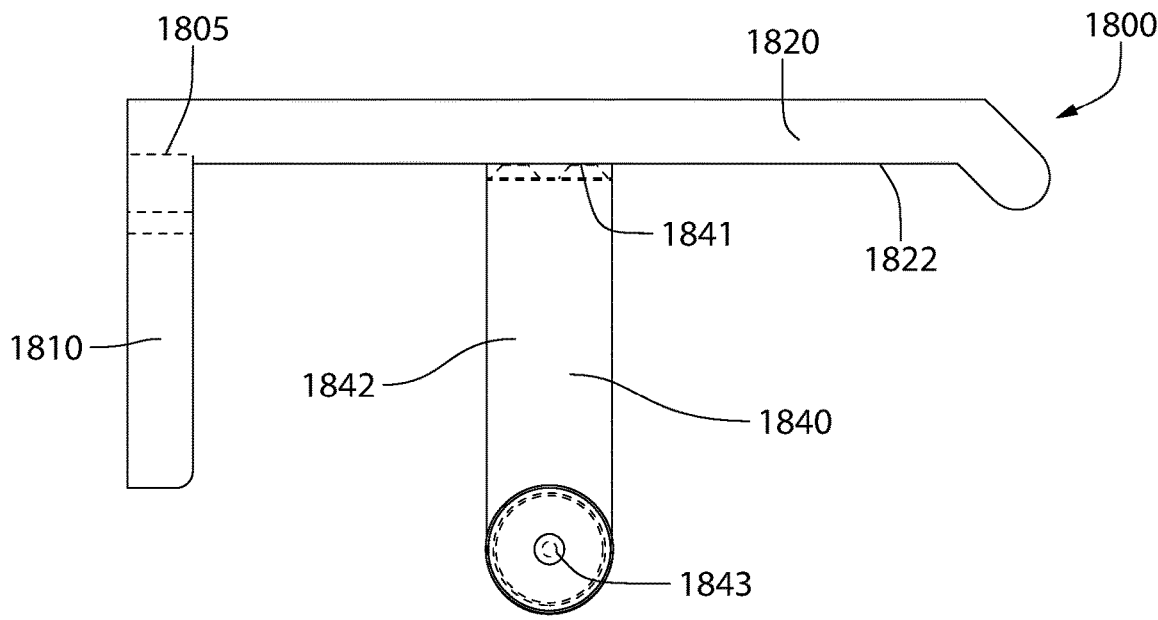
FIG. 67 is an assembled side view of the toilet paper holder of FIG. 65.

FIGS. 65-67 illustrate another embodiment of a wall-mountable shelf or accessory 1800, which is again in the form of a toilet paper holder which includes a shelf. In this embodiment, the wall-mountable shelf or accessory 1800 includes an apron 1810, a ledge 1820, and a toilet paper holder assembly 1840. The apron 1810 and the ledge 1820 may be made from brittle material (e.g., solid surface material or the like). The toilet paper holder assembly 1840 may be made from stainless steel or other metals or plastics or the like.

The ledge 1820 comprises an upper surface 1821, a lower surface 1822, a rear edge 1823, and a front edge 1824. Furthermore, there is a recess 1825 in the lower surface 1822 which extends from the rear edge 1823 to an end wall 1826. The recess 1825 is defined by a floor 1827 which is recessed relative to the lower surface 1822 and the end wall 1826. The recess 1825 extends the full length of the ledge 1820 between its opposing side edges that extend between the front and rear edges 1823, 1824. In this embodiment, the ledge 1820 comprises a downwardly angled distal portion 1828, although this can be omitted in some embodiments.

The apron 1810 comprises a front surface 1811, a rear surface 1812, a bottom edge 1813, and a top edge 1814. A top portion of the apron 1810 which includes the top edge 1814 is positioned within the recess 1825 of the ledge 1820 to couple the apron 1810 to the ledge 1720. That is, the top portion of the apron 1810 is positioned in the recess 1825 so that the top edge 1814 of the apron 1810 interfaces with the floor 1827 of the recess 1825 and an uppermost portion of the front surface 1811 of the apron 1810 interfaces with the end wall 1826 of the recess 1825. The end wall 1826 of the recess 1825 therefore overlies a portion of the front surface 1811 of the apron 1810 to generate a strong structural connection between the apron 1810 and the ledge 1820. As with the prior described embodiments, a reactive adhesive is disposed between the apron 1810 and the ledge 1820 to facilitate the coupling of the apron 1810 to the ledge 1820.

The ledge 1820 and the apron 1810 are coupled together along a multiplane interface 1805. The multiplane interface 1805 is illustrated in dashed lines in FIG. 67, although the dashed lines are not visible in the final product because the coupling of the various components together is accomplished in a seamless manner. The multiplane interface 1805 has a horizontal portion where the top edge 1814 of the apron 1810 interfaces with the floor 1827 of the recess 1825 and a vertical portion where the uppermost portion of the front surface 1811 of the apron 1810 interfaces with the end wall 1826 of the recess 1825.

The toilet paper holder assembly 1840 comprises an upper portion 1841 that is coupled directly to the lower surface 1822 of the ledge 1820 and two sidewalls 1842 that extend from the upper portion 1841 to a roller 1843 that is configured to hold toilet paper in the conventional manner. Although only one sidewall 1842 is illustrated in the figures, it should be appreciated that an identical sidewall exists on the opposite end of the upper portion 1841.

Figure 68:
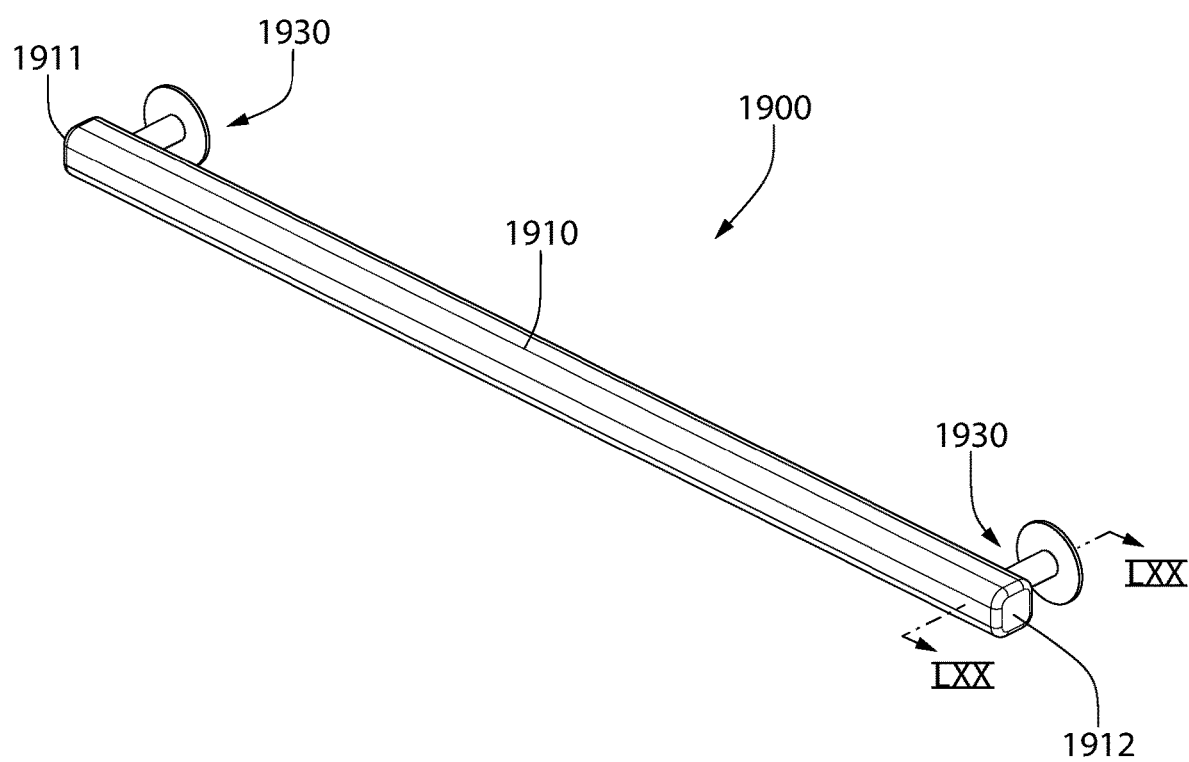
FIG. 68 is a front perspective view of a wall-mountable accessory in accordance with another embodiment of the present invention.
Figure 69:
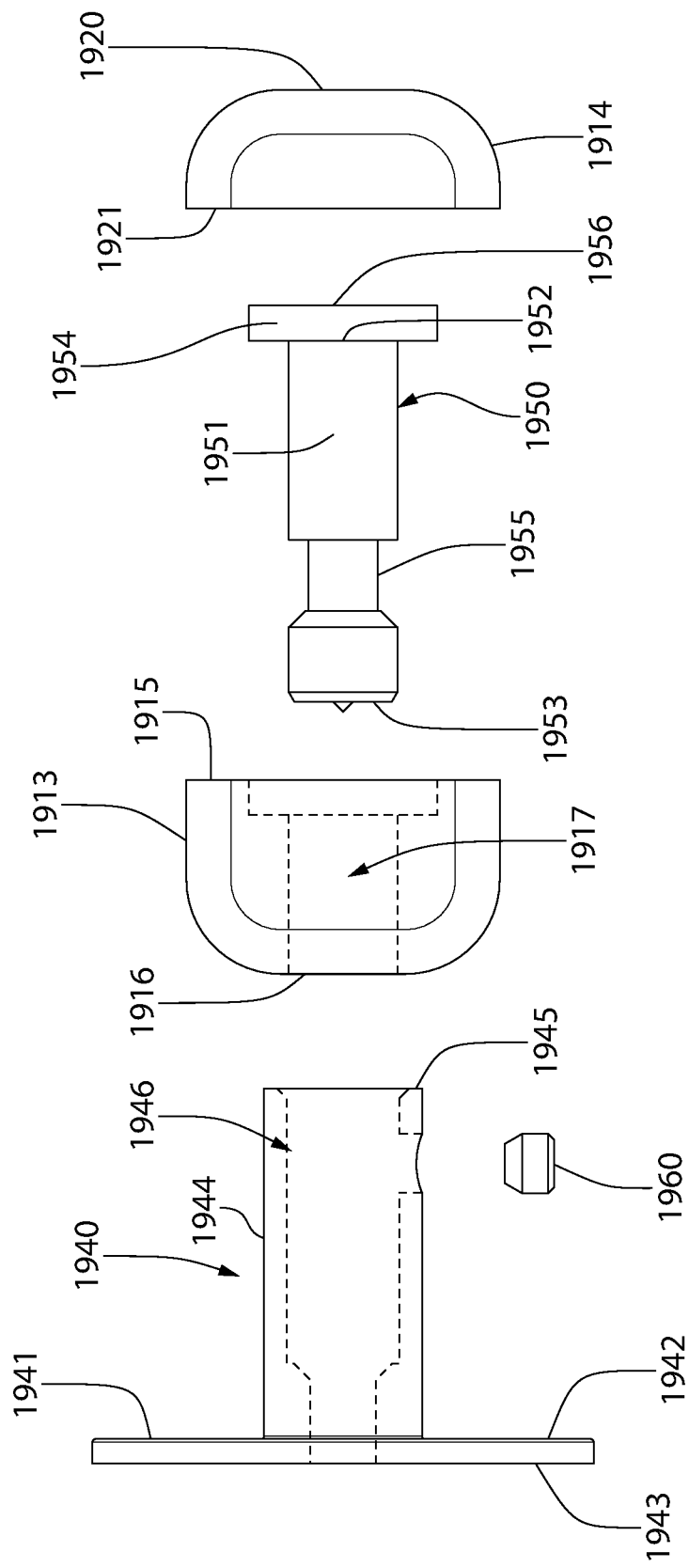
FIG. 69 is an exploded side view of the wall-mountable accessory of FIG. 68.
Figure 70:
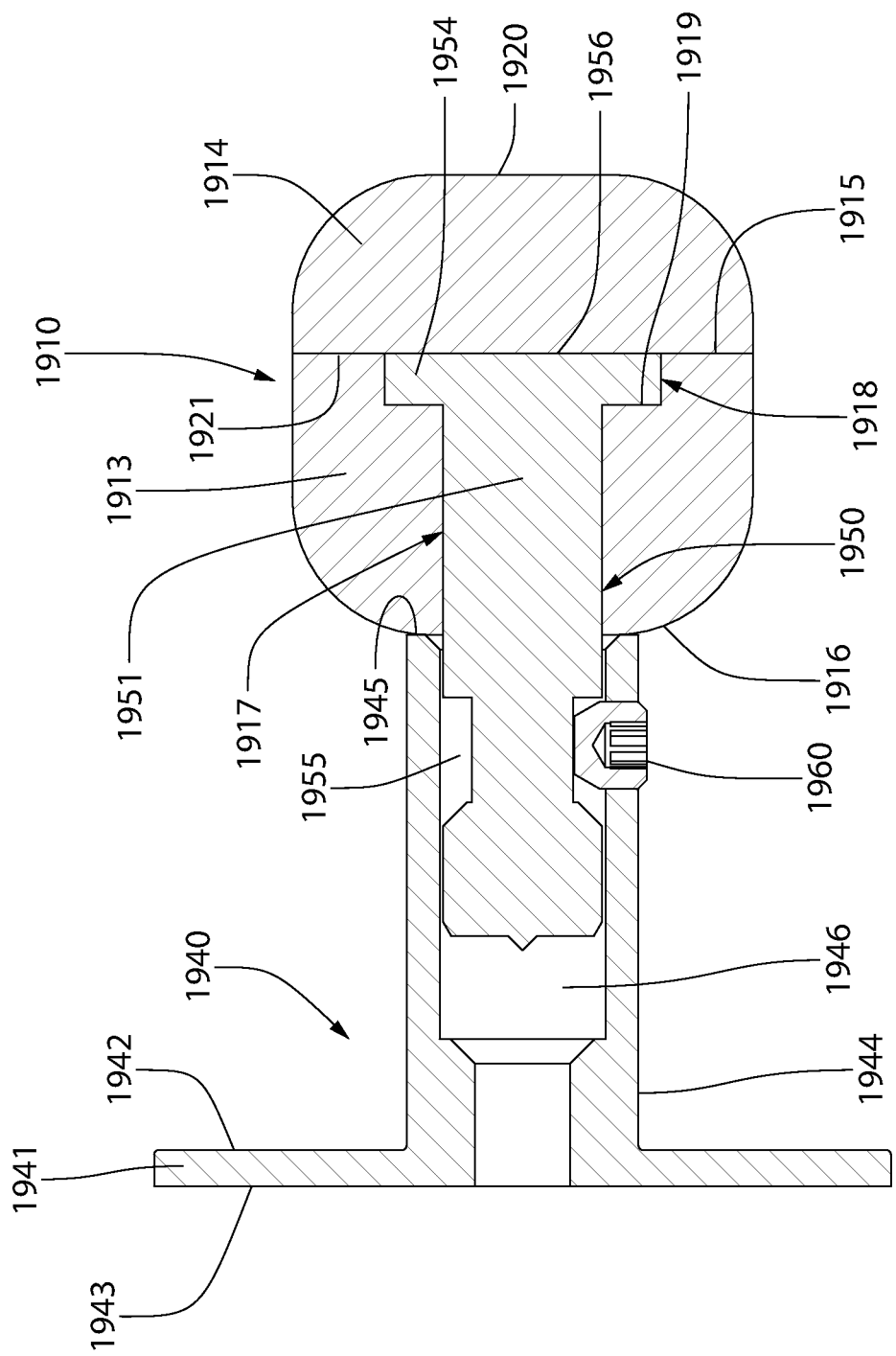
FIG. 70 is a cross-sectional view taken along line LXX-LXX of FIG. 68.

Finally, referring to FIGS. 68-70, a wall-mountable accessory 1900 is illustrated in accordance with an embodiment of the present invention. The wall-mountable accessory 1900 is a grab bar or towel bar or the like and it has similarities to the grab bars and towel bars previously described, with the main difference being that the fastening pin flange is hidden from view rather than forming a portion of the viewable exterior surface of the apparatus.

The wall-mountable accessory 1900 generally comprises a solid body 1910 that is elongated between a first end 1911 and a second end 1912 and a mounting assembly 1930 for mounting the solid body 1910 to a wall. The solid body 1910 is preferably formed from a brittle material, such as a solid surface material although other brittle materials as described herein may be used as well. The mounting assembly 1930 has various components that may be formed from metal such as stainless steel, solid surface material, or the like as described herein.

In this embodiment, the solid body 1910 comprises a main body component 1913 and an end cap 1914. The main body component 1913 has a front surface 1915, a rear surface 1916, and a through-hole 1917 extending from the front surface 1915 to the rear surface 1916. The front surface 1915 of the main body component 1913 further comprises a recess 1918 having a floor 1919. The floor 1919 may be considered to form a part of the front surface 1915 of the main body component 1913. Furthermore, the recess 1918 may be considered to form a part of the through-hole 1917, but the recess 1918 has a greater diameter than the remainder of the through-hole 1917. As such, the floor 1919 of the recess 1918 extends radially from the remainder of the through-hole 1917 to form a shoulder that faces the front surface 1915 of the main body component 1913.

The end cap 1914 comprises a front surface 1920 and a rear surface 1921. In the exemplified embodiment, the end cap 1914 is solid and has no recess or hollow areas, although the invention is not to be so limited in all embodiments. In some alternative embodiments there may be a recess in the rear surface 1921 of the end cap 1914. The end cap 1914 is configured to mate with the main body component 1913 and be bonded thereto to form the solid body 1910. In particular, the rear surface 1921 of the end cap 1914 is configured to interface or mate with the front surface 1915 of the main body portion 1913 to form the solid body 1910. An adhesive such as a reactive adhesive or epoxy may be coated onto one or both of the front surface 1915 of the main body portion 1913 and the rear surface 1921 of the end cap 1914 to facilitate the coupling of the end cap 1914 to the main body portion 1913. However, the end cap 1914 is not coupled to the main body portion 1913 until after some other assembly is completed as described below.

The mounting assembly 1930 comprises a standoff 1940 configured to be coupled to a wall and a fastening pin 1950 that engages with the standoff 1940 to mount the solid body 1910 to the standoff 1940. In the exemplified embodiment there are two of the standoffs 1940 and two of the fastening pins 1950 due to the length of the solid body 1910. However, in other embodiments there could be just a single standoff 1940 and fastening pin 1950 or more than two of each as needed to accommodate the length of the solid body 1910. In some embodiments, the concepts described with reference to the wall-mountable accessory 1900 could be used on a hook like the one shown in FIGS. 1-4 as the wall-mountable accessory 100. In such embodiments, a single standoff 1940 and fastening pin 1950 may be sufficient, but the additional concepts for hiding the fastening pin 1950 from view disclosed below can be incorporated into the wall-mountable accessory 100 and any of the other apparatuses described throughout this disclosure.

The standoff 1940 comprises a plate portion 1941 having a rear surface 1942 configured to abut against the wall when the standoff 1940 is mounted to the wall and a front surface 1943 opposite the rear surface 1942. The standoff 1940 also comprises a stem portion 1944 extending from the front surface 1943 of the plate portion 1941. In the exemplified embodiment, the plate portion 1941 and the stem portion 1944 are integrally formed as a monolithic part. More specifically, in the exemplified embodiment the entire standoff 1940 is formed from metal such as stainless steel. However, in other embodiments the plate portion 1941 may be formed from a brittle material such as solid surface and the stem portion 1944 may be formed from metal such as stainless steel such that the stem portion 1944 is a separate component from the plate portion 1941, as described above with regard to a previously described embodiment. In either situation, the stem portion 1944 extends from the front surface 1943 of the plate portion 1941 to a distal end 1945. The standoff 1940 comprises an internal passageway 1946 that extends from the distal end 1945 of the stem portion 1944 to the rear surface 1942 of the plate portion 1941.

The fastening pin 1950 comprises a tubular portion 1951 having a first end 1952 and a second end 1953 and a flange portion 1954 that extends radially outwardly at the first end 1952. The tubular portion 1951 may be solid or hollow in various different embodiments. Moreover, the tubular portion 1951 has an annular or semi-annular recess portion 1955 located therealong for engagement with a set screw 1960 as described below.

The manner of assembling the wall-mountable accessory 1900 will not be described. First, the tubular portion 1951 of the fastening pin 1950 is inserted into and through the through-hole 1917 in the main body component 1913 of the solid body 1910 until the flange portion 1954 of the fastening pin 1950 abuts against the floor 1919 of the recess 1918 in the front surface 1915 of the main body portion 1913 of the solid body 1910. When so positioned, a portion of the tubular portion 1951 of the fastening pin 1950 nests within the through-hole 1917 and a distal portion of the tubular portion 1951 of the fastening pin 1950 protrudes from the rear surface 1916 of the main body component 1913. The fastening pin 1950 is prevented from being pushed further into the through-hole 1917 due to the engagement between the flange portion 1954 and the floor 1919 of the recess 1918.

In the exemplified embodiment when the fastening pin 1954 is fully nested in the through-hole 1917 of the main body component 1913 of the solid body 1910, a front or outer surface 1956 of the flange portion 1954 is flush with the front surface 1915 of the main body component 1913. However, in other embodiments the front surface 1956 of the flange portion 1954 may be recessed relative to the front surface 1915 of the main body component 1913. In still other embodiments, the front surface 1956 of the flange portion 1954 may protrude from the front surface 1915 of the main body component 1913. In such embodiments, the rear surface 1921 of the end cap 1914 may have a recess to accommodate any protruding part of the flange portion 1954 of the fastening pin 1950 However, since in the exemplified embodiment the front surface 1956 of the flange portion 1954 is flush with the front surface 1915 of the main body component 1913, there is no such recess in the end cap 1914.

Next, the end cap 1914 may be coupled (bonded, adhered, or the like) to the main body component 1913 to form the solid body 1910. That is, an adhesive (i.e., a reactive adhesive, a two-part epoxy, or the like) may be coated onto any of one or more of the front surface 1915 of the main body component 1913, the outer surface 1956 of the flange 1954, and the rear surface 1921 of the end cap 1914. The adhesive may be applied after milling of the front surface 1915 of the main body component 1913 and/or the rear surface 1921 of the end cap 1914 to facilitate a more effective bonding between the two components. Next, the rear surface 1921 of the end cap 1914 is moved so as to interface with the front surface 1915 of the main body component 1913. The rear surface 1921 of the end cap 1914 and the front surface 1915 of the main body component 1913 would be abutted against one another except for the fact that an adhesive is disposed between those two surfaces to facilitate the bonding of the end cap 1914 to the main body component 1913.

Once the end cap 1914 is bonded or adhered or coupled to the main body component 1913, the flange portion 1954 of the fastening pin 1950 is entirely embedded within the interior of the solid body 1910. As such, no portion of the flange portion 1954 of the fastening pin 1950 is visible. The entirety of the flange portion 1954 is hidden from view within an interior of the solid body 1910. This creates a nice aesthetic whereby only the solid body 1910 is visible to a user despite the existence of the fastening pin 1950 within the interior of the solid body 1910 to couple the solid body 1910 to the standoff 1940. This is a difference from the prior embodiments and it results in a different aesthetic that is cleaner, although both aesthetics may be desired by different end users. The fastening pin 1950 also cannot be removed or separated from the solid body 1910. That is, the fastening pin 1950 is prevented from moving in the direction of the rear surface 1916 due to the flange portion 1954 abutting against the floor 1919 of the recess 1918. The fastening pin 1950 is prevented from moving in the direction of the front surface 1920 due to the flange portion 1954 abutting against the rear surface 1921 of the end cap 1914.

Next, the distal portion of the tubular portion 1951 of the fastening pin 1950 which is protruding from the rear surface 1916 of the solid body 1910 is inserted into the internal passageway 1946 of the standoff 1940 through the opening in the distal end 1945 of the stem portion 1944 of the standoff 1940. The combined fastening pin 1950 and solid body 1910 is translated towards the plate portion 1941 of the standoff 1940 until the distal end 1945 of the stem portion 1944 of the standoff 1940 abuts against the rear surface 1916 of the main body component 1913 of the solid body 1910 such that no further movement of the solid body 1910 and fastening pin 1950 relative to the standoff 1940 is possible. Finally, the set screw 1960 may be inserted into an opening in the stem portion 1944 of the standoff 1940 and screwed in until it contacts the portion of the tubular portion 1951 of the fastening pin 1950 that is nesting within the internal passageway 1946 of the standoff 1940. The set screw 1960 may nest within the annular or semi-annular recess portion 1955 noted above. The set screw 1960 thereby locks the fastening pin 1950 to the standoff 1940, and the fastening pin 1950 is permanently affixed to the solid body 1910 as described above.

Of course, prior to coupling the fastening pin 1950 to the standoff 1940, the standoff 1940 should be mounted to the wall at the desired location. This is achieved in the conventional manner, by inserting a fastener (screw or the like) into the internal passageway 1946 until the shank or threaded portion of the fastener protrudes from the rear surface 1943 of the plate portion 1941 of the standoff 1940. That portion of the shank or threaded portion of the fastener can then be inserted into a pre-drilled hole in the wall, thereby mounting the standoff 1940 to the wall.

This same concept of hiding the flange of the fastening pin within the interior of the solid body may be utilized in any of the embodiments described herein. For example, with regard to the wall-mountable accessory of FIGS. 1-4, the solid body 110 may be formed from two components that are bonded together such that the flange of the fastening pin is located between the two components so that it is located within the interior of the solid body and therefore not visible to a user. In fact, many of the concepts described herein with regard to any one embodiment may be combined with the other embodiments described herein. Variations, modifications, and combinations of this type would be readily appreciated by persons skilled in the art.

The invention has been described herein with reference to mounting of various embodiments of wall-mountable accessories to a wall. As used herein, the term wall is not limited to a wall which bounds a room and is formed generally from drywall or plaster (although those types of walls are included in the meaning of the term wall). The term wall as used for this purpose could also include wood walls and/or cabinets which are already mounted to a wall. Thus, for example, a cabinet or other type of fixture may be coupled to the wall with the cabinet or fixture having a vertical outer surface. The wall-mountable accessories described herein may then be coupled to the outer surface of the cabinet or fixture, and this scenario is included in the meaning of the term "wall."

Moreover, the invention described herein allows for brittle materials such as solid surface to be combined with metal materials such as stainless steel to make decorative accessories for the bathroom or elsewhere within a home, office, hotel, or other environment. Such brittle materials, which includes solid surface materials and other materials as described in detail herein, have hundreds of styles and designs to choose from, thereby providing a purchaser with countless options to beautify an interior space while mounting functional items therein. Because brittle materials are, by their nature, subject to fracturing and/or cracking when under stress, there is a need to hold such brittle materials under a stable compressive force to provide structural stability and avoid such fracturing and/or cracking to prolong the life cycle of the product. The invention described herein achieves this with a satisfying aesthetic and structural soundness.

The invention described herein enables the use of brittle materials in a structural nature to ensure stability. This may be accomplished by holding a solid body formed from the brittle material under compression. Materials that are considered brittle (such as, for example without limitation, solid surface, glass, acrylic, concrete, etc.) have significant structural capabilities that can be extracted by creating stable compressive forces. The term stable as used in this sense means that there are no individual point forces and the brittle material is maintained in a consistent environment. The stable compressive forces may be direct forces, indirect forces, or internal forces, and examples of each of these scenarios has been described herein.

The disclosure and drawings represent exemplary embodiments of the present disclosure. It will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents. In addition, all combinations of any and all of the features described in the disclosure, in any combination, are part of the invention.

What is claimed is:

1. A wall-mountable shelf comprising:
   an apron comprising a rear surface configured to abut against a wall, a front surface opposite the rear surface, and an upper edge;
   a ledge comprising a rear edge configured to abut against a wall, an upper surface, and a lower surface, the lower surface comprising a recess that extends from the rear edge to an end wall, the recess being defined by a floor that is recessed relative to the lower surface of the ledge and the end wall that extends from the floor to the lower surface of the ledge, the end wall being perpendicular to the floor;

wherein an upper portion of the apron nests within the recess in the lower surface of the ledge and is adhesively bonded to the ledge such that the upper edge of the apron interfaces with the floor of the recess and the end wall of the recess interfaces with an upper-most portion of the front surface of the apron while a lower portion of the front surface of the apron protrudes beyond the lower surface of the ledge;

wherein the apron is a first monolithic component and the ledge is a second monolithic component; and wherein the apron and the ledge are configured to be adhesively bonded together to form the wall-mountable shelf prior to mounting the wall-mountable shelf to the wall.

2. The wall-mountable shelf according to claim 1 wherein the apron and the ledge are formed from a brittle material selected from the group consisting of solid surface, glass, concrete, ceramic, cast marble, quartz, graphite, and acrylic, the brittle material excluding wood and metal.

3. The wall-mountable shelf according to claim 1 wherein the upper-most portion of the front surface of the apron is covered by the ledge and a remainder of the front surface of the apron remains uncovered and exposed.

4. The wall-mountable shelf according to claim 1 wherein the ledge comprises a first side edge and a second side edge that extend from the rear edge to a distal end of the ledge, and wherein the recess extends from the first side edge of the ledge to the second side edge of the ledge such that the recess is open at both of the first and second side edges of the ledge, wherein the apron comprises first and second side surfaces that extend between the front and rear surfaces, and wherein the first side surface of the apron is flush with the first side edge of the ledge and the second side surface of the apron is flush with the second side edge of the ledge.

5. The wall-mountable shelf according to claim 1 further comprising a reactive adhesive located at an interface between the apron and the ledge to adhesively bond the apron to the ledge.

6. The wall-mountable shelf according to claim 5 wherein surfaces of the apron and the ledge that interface with one another are milled prior to application of the reactive adhesive thereon.

7. The wall-mountable shelf according to claim 1 further comprising a connection member comprising a vertical rear surface, a horizontal top surface, and a front surface comprising a vertical portion adjacent to the horizontal top surface and an arcuate portion extending between the vertical portion of the front surface and the vertical rear surface, wherein the connection member is positioned with the recess such that the horizontal top surface of the connection member interfaces with the floor of the recess, the vertical portion of the front surface interfaces with the end wall of the recess, and the vertical rear surface of the connection member interfaces with the front surface of the apron, wherein the connection member is adhesively bonded to at least one of the apron and the ledge with a reactive adhesive, wherein each of the apron, the ledge, and the connection member is formed from a brittle material selected from the group consisting of solid surface, glass, concrete, ceramic, cast marble, quartz, graphite, and acrylic, and wherein the reactive adhesive is an epoxy adhesive that is brittle once cured.

8. The wall-mountable shelf according to claim 1 wherein the upper edge of the apron is planar between the front and rear surfaces of the apron, wherein the floor of the recess of the ledge is planar from the end wall of the recess to the rear edge of the ledge, and wherein the end wall of the recess is planar from the floor of the recess to the lower surface of the ledge.

9. The wall-mountable shelf according to claim 1 further comprising:

the apron comprising a hole extending from the front surface of the apron to the rear surface of the apron;

a hook member comprising a front surface and a rear surface having a hole formed therein; and a rod comprising a first connection portion at a first end of the rod that nests within the hole in the apron to couple the rod to the apron and a second connection portion at a second end of the rod that nests within the hole in the hook member to couple the rod to the hook member, the rod and hook member forming a hook configured to support an article.

10. A wall-mountable shelf comprising:

a first monolithic component formed from a first brittle material and comprising a first surface having a recess that is defined by an interface surface, the interface surface comprising a planar floor surface and a planar end wall surface that is perpendicular to the planar floor surface;

a second monolithic component formed from a second brittle material and comprising a front surface and an engagement surface, the engagement surface comprising a planar top edge of the second component;

a reactive adhesive located on at least one of the interface surface of the first monolithic component and the engagement surface of the second monolithic component; and wherein the engagement surface of the second monolithic component is positioned within the recess of the first monolithic component and the planar end wall surface of the first monolithic component extends over an upper-most part of the front surface of the second monolithic component to adhesively bond the engagement surface of the second monolithic component to the interface surface of the recess, thereby coupling the first monolithic component to the second monolithic component to form the wall-mountable shelf; and wherein the first and second brittle materials are selected from the group consisting of solid surface, glass, concrete, ceramic, cast marble, quartz, graphite, and acrylic, the first and second brittle materials excluding wood and metal.

11. The wall-mountable shelf according to claim 10 wherein the interface surface of the first monolithic component and the engagement surface of the second monolithic component are milled prior to application of the reactive adhesive thereon.

12. The wall-mountable shelf according to claim 10 wherein the reactive adhesive is an epoxy that is brittle once cured.

13. The wall-mountable shelf according to claim 10 wherein the first and second brittle materials are solid surface material comprising acrylic, resins, and pigments.

14. The wall-mountable shelf according to claim 10 wherein one of the first and second monolithic components is configured to be mounted directly to a wall and the other one of the first and second monolithic components is configured to protrude perpendicularly from the wall to form a ledge.

15. A wall-mountable shelf comprising:
an apron comprising a top edge, a front surface comprising an upper-most part that is adjacent to the top edge, and a rear surface opposite the front surface, the apron configured to be mounted to a wall with the rear surface facing the wall;
a ledge comprising a rear edge that is configured to face the wall when the wall-mountable shelf is mounted to the wall and a lower surface having a recess defined by a floor and an end wall that extends perpendicularly from the floor to the lower surface;
wherein the apron and the ledge are configured to be coupled together along a multiplane interface comprising the floor of the recess of the ledge interfacing with the top surface of the apron and the end wall of the recess of the ledge interfacing with the upper-most part of the front surface of the apron such that the ledge covers the upper-most part of the front surface of the apron while a remainder of the front surface of the apron is exposed;
wherein an epoxy adhesive coating is applied onto at least one of the apron and the ledge along the multiplane interface; and
wherein the apron and the shelf are formed from a brittle material, the brittle material excluding wood and metal.

16. The wall-mountable shelf according to claim 15 wherein the brittle material is a solid surface material.

17. The wall-mountable shelf according to claim 15 wherein the multiplane interface extends along two planes that are perpendicular to one another.

18. The wall-mountable shelf according to claim 15 wherein wherein the top edge of the apron is planar between the front and rear surfaces of the apron, and wherein the floor of the recess is planar between the end wall of the recess and the rear edge of the ledge.

19. The wall-mountable shelf according to claim 10 wherein the first and second monolithic components are adhesively bonded to one another to form the wall-mountable shelf as a unitary structure that is configured to be mounted to a wall.

* * * * *